US012668438B2

(12) United States Patent     (10) Patent No.:   US 12,668,438 B2

Williams et al.                  (45) Date of Patent:      Jun. 30, 2026

---

(54) DROP-DOWN DEVICE

(71) Applicant: Altria Client Services LLC, Richmond, VA (US)

(72) Inventors: Dwight David Williams, Powhatan, VA (US); Dremere Kevon Woods, Tuscaloosa, AL (US)

(73) Assignee: Altria Client Services LLC, Richmond, VA (US)

( * ) Notice: Subject to any disclaimer, the term of this patent is extended or adjusted under 35 U.S.C. 154(b) by 133 days.

(21) Appl. No.: 18/792,191

(22) Filed: Aug. 1, 2024

(65) Prior Publication Data

US 2025/0042678 A1      Feb. 6, 2025

Related U.S. Application Data

(60) Provisional application No. 63/530,568, filed on Aug. 3, 2023.

(51) Int. Cl.
| | |
|---|---|
| *B65G 65/46* | (2006.01) |
| *B65B 1/06* | (2006.01) |
| *B65B 1/12* | (2006.01) |
| *B65G 47/19* | (2006.01) |

(52) U.S. Cl.
CPC ................ *B65G 65/46* (2013.01); *B65B 1/06* (2013.01); *B65B 1/12* (2013.01); *B65G 47/19* (2013.01)

(58) Field of Classification Search
CPC .... B65G 65/46; B65G 47/19; B65G 65/4881; B65G 47/18; B65B 1/06; B65B 1/12; B65B 37/02
USPC ............................................ 222/56, 71, 564
See application file for complete search history.

(56) References Cited

U.S. PATENT DOCUMENTS

| | | | |
|---|---|---|---|
| 3,800,508 A | | 4/1974 | Zenz |
| 4,378,897 A | * | 4/1983 | Kattelmann ........... B65D 90/48 222/64 |
| 4,867,343 A | * | 9/1989 | Ricciardi ............. G01G 13/248 222/64 |

(Continued)

FOREIGN PATENT DOCUMENTS

| | | |
|---|---|---|
| CN | 107243400 A | 10/2017 |
| CN | 208824998 U | 5/2019 |

OTHER PUBLICATIONS

International Search Report and Written Opinion thereof dated Nov. 20, 2024 for corresponding International Application No. PCT/US2024/040555.

(Continued)

*Primary Examiner* — David J Walczak

(74) *Attorney, Agent, or Firm* — Harness, Dickey & Pierce, P.L.C.

(57) ABSTRACT

A dosing apparatus includes a doser mechanism that discharges an index amount of a granular material based on drawing the granular material from an intake hopper. A drop-down device is coupled between the intake hopper and a supply hopper and enables enable a flow of the granular material from the supply hopper to the intake hopper through a conduit. The drop-down device restricts a flow rate of the flow of granular material through the conduit based on directing the flow around a slat extending into the conduit. The slat has an upper slat surface that is angled downwards at an inclination angle that may correspond to an angle of repose of the granular material.

20 Claims, 21 Drawing Sheets

(56)                 References Cited

U.S. PATENT DOCUMENTS 6,472,615 B1 *   10/2002   Carlson ................ G01G 13/024
                                              177/60
2011/0289887 A1    12/2011   Garthaffner et al.
2022/0312821 A1    10/2022   Liu et al.

OTHER PUBLICATIONS

International Preliminary Report on Patentability dated Feb. 3, 2026 for corresponding International Application No. PCT/US2024/040555.

* cited by examiner

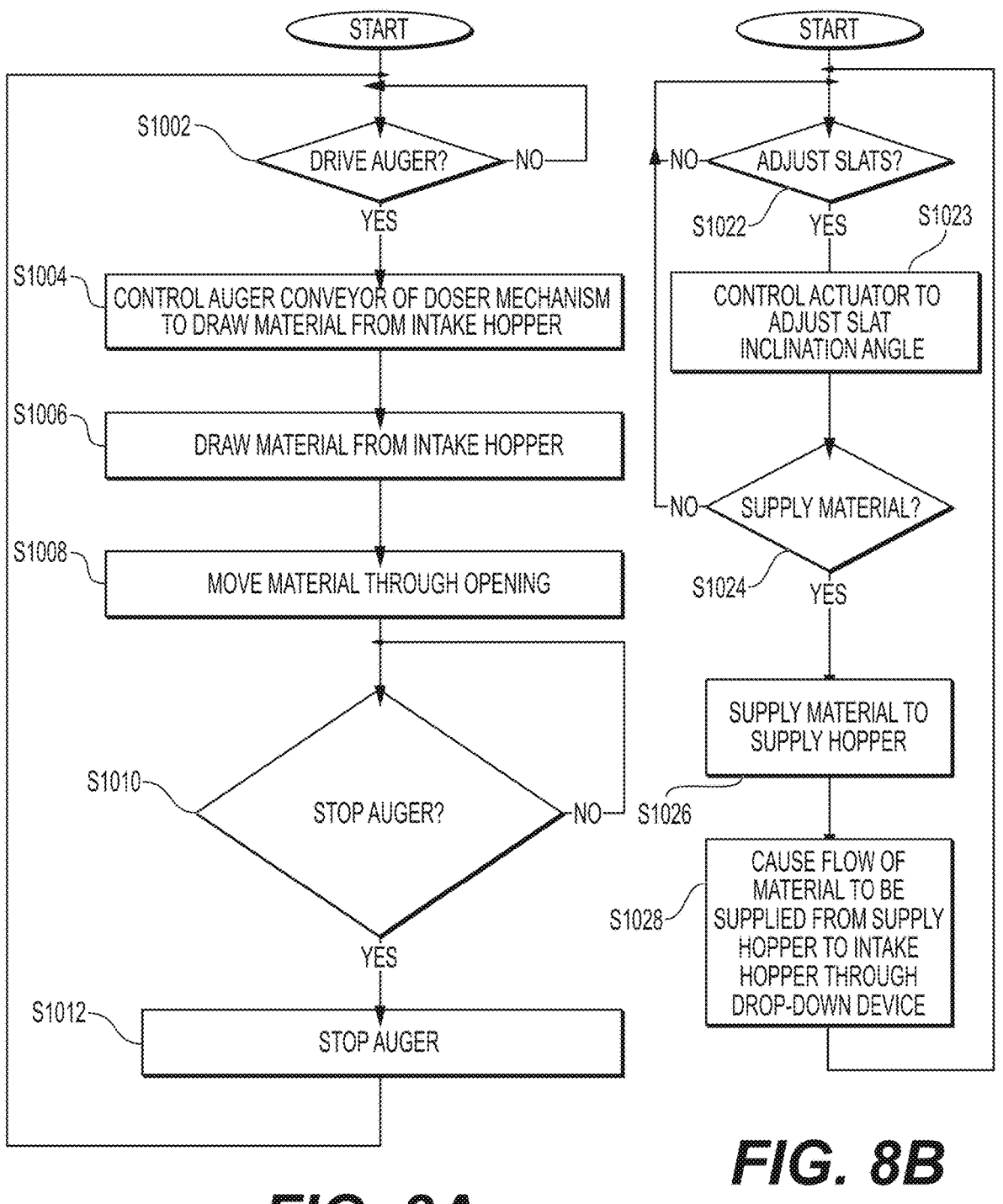

START

S1002 — DRIVE AUGER? — NO

YES

S1004 — CONTROL AUGER CONVEYOR OF DOSER MECHANISM TO DRAW MATERIAL FROM INTAKE HOPPER

S1006 — DRAW MATERIAL FROM INTAKE HOPPER

S1008 — MOVE MATERIAL THROUGH OPENING

S1010 — STOP AUGER? — NO — S1026

YES

S1012 — STOP AUGER

*FIG. 8A*

START

NO — ADJUST SLATS?

S1022 — YES — S1023

CONTROL ACTUATOR TO ADJUST SLAT INCLINATION ANGLE

NO — SUPPLY MATERIAL?

S1024 — YES

SUPPLY MATERIAL TO SUPPLY HOPPER

S1028 — CAUSE FLOW OF MATERIAL TO BE SUPPLIED FROM SUPPLY HOPPER TO INTAKE HOPPER THROUGH DROP-DOWN DEVICE

*FIG. 8B*

DROP-DOWN DEVICE

CROSS-REFERENCE TO RELATED APPLICATION

This application claims priority to and the benefit of U.S. Provisional Patent Application No. 63/530,568 filed in the United States Patent and Trademark Office on Aug. 3, 2023, the entire contents of which are incorporated herein by reference.

BACKGROUND

Field

The present inventive concepts relate to portioning of granular materials, including powder materials, and more particularly to controlling a pressure of granular material acting on a doser mechanism configured to convey and supply particular amounts (e.g., portions, doses, indexes, etc.) of granular material based on controlling a flow rate of granular material supplied to a hopper from which the doser mechanism draws the granular material, to provide improved reliability and consistency of supply of amounts of granular material having a controllable volume.

Description of Related Art

Some products, including some consumer goods, include packaged portions ("portioned instances") of a granular material (also referred to herein as simply a "material"). In some cases, such portioned instances may be produced ("provided," "manufactured," etc.) based on portioning (e.g., dividing) and/or supplying a relatively large ("bulk") instance of the material into multiple smaller portioned instances (e.g., doses, indexes, dose amounts, index amounts, or the like), and packaging the portioned instances.

SUMMARY

According to some example embodiments, a dosing apparatus may include an intake hopper, a doser mechanism, a supply hopper, and a drop-down device. The intake hopper may be configured to hold an amount of a granular material. The intake hopper may be configured to receive the granular material through an intake hopper inlet opening at a top end of the intake hopper. The doser mechanism may be coupled to the intake hopper. The doser mechanism may include an auger conveyor extending into the intake hopper. The doser mechanism may be configured to discharge an index amount of the granular material based on operation of the auger conveyor to draw a portion of the granular material from the intake hopper. The supply hopper may be configured to hold a supply amount of the granular material. The supply hopper may be configured to supply the granular material through a supply hopper outlet opening at a bottom end of the supply hopper. The drop-down device may be coupled between the supply hopper and the intake hopper. The drop-down device may include a conduit structure configured to define a conduit extending along a central longitudinal axis in flow communication between the supply hopper outlet opening and the intake hopper inlet opening to enable a flow of the granular material from the supply hopper to the intake hopper through the conduit. The drop-down device may be configured to restrict a flow rate of the flow of granular material through the conduit based on directing the flow of the granular material around a slat extending into the conduit. The slat may have an upper slat surface that is angled downwards from a first end that is proximate to an inner surface of the conduit structure to a second end that is distal to the inner surface at an inclination angle. The inclination angle may correspond to an angle of repose of the granular material.

The upper slat surface may be a planar surface that extends along a plane that is angled at the inclination angle.

The drop-down device may include a plurality of slats extending into the conduit. The plurality of slats may include the slat.

The plurality of slats may include at least two slats that are offset from each other in a vertical direction extending parallel to the central longitudinal axis of the conduit.

The at least two slats may at least partially overlap in the vertical direction.

The at least two slats may extend into the conduit from opposite side ends of the conduit.

The at least two slats may be exposed from each other in the vertical direction.

The plurality of slats may be offset from each other in the vertical direction and vertically adjacent slats of the plurality of slats may extend into the conduit from opposite side ends of the conduit.

The slat may be configured to adjustably pivot to adjustably control the inclination angle of the upper slat surface.

The slat may be pivotably coupled to the conduit structure.

The drop-down device may include at least one slot opening extending through a thickness of the conduit structure, the slat extending through the slot opening into the conduit through the thickness of the conduit structure.

The conduit structure may define the conduit as having a cross-sectional area, extending perpendicular to the central longitudinal axis and which continuously changes in area magnitude along the central longitudinal axis between a rectangular cross-sectional area to a circular cross-sectional area.

The dosing apparatus may further include a plurality of doser mechanisms, a plurality of intake hoppers coupled to separate, respective doser mechanisms of the plurality of doser mechanisms, and a plurality of drop-down devices coupled between the supply hopper and separate, respective intake hoppers of the plurality of intake hoppers. The plurality of doser mechanisms may include the doser mechanism. The plurality of doser mechanisms may be configured to supply separate, respective amounts of the granular material in parallel. The plurality of intake hoppers may include the intake hopper. The plurality of drop-down devices may include the drop-down device. The plurality of drop-down devices may be configured to supply multiple, parallel flows of the granular material from the supply hopper to separate, respective intake hoppers of the plurality of intake hoppers.

According to some example embodiments, a packaging machine may include the dosing apparatus, a packaging supply device, a sealing device, and a cutting device. The packaging supply device may be configured to supply a strip of packaging material that is folded to establish a folded strip of packaging material that defines an open enclosure having an enclosure opening. The dosing apparatus may be configured to discharge the index amount of the granular material into the open enclosure through the enclosure opening to at least partially fill a distal portion of the open enclosure with the index amount of the granular material. The sealing device may be configured to join opposing surfaces of the folded strip of packaging material to isolate the distal portion of the open enclosure from a remainder of the open enclosure that includes the enclosure opening such that the isolated distal portion of the open enclosure establishes a sealed enclosure that contains the index amount of the granular material in the folded strip of packaging material. The cutting device may be configured to separate the sealed enclosure from a remainder of the folded strip of packaging material to establish an article of packaging that contains the index amount of the granular material.

According to some example embodiments, a method of operating the dosing apparatus may include controlling the auger conveyor of the doser mechanism to operate to draw the granular material out of the intake hopper and to discharge the index amount of the granular material via a doser mechanism outlet opening and causing a flow of the granular material to be supplied from the supply hopper to the intake hopper via the conduit of the drop-down device. The slat of the drop-down device may restrict the flow rate of the flow through the conduit based on at least the portion of the flow of the granular material accumulating on the upper slat surface of the slat.

The method may further include adjusting the angle of inclination of the slat to adjust the flow rate of the flow through the conduit.

According to some example embodiments, a dosing apparatus may include a doser mechanism, an intake hopper, a supply hopper, and a drop-down device. The doser mechanism may include a cylindrical shell and an auger conveyor. The cylindrical shell may have a doser inlet opening and a doser outlet opening. The auger conveyor may extend through the cylindrical shell and further extend through the doser inlet opening. The intake hopper may include an intake hopper structure defining an intake hopper enclosure, an intake hopper inlet opening extending through a top wall of the intake hopper structure, and an intake hopper outlet opening extending through the intake hopper structure at a location that is below the intake hopper inlet opening. The doser mechanism may be coupled to the intake hopper such that the auger conveyor extends through both the doser inlet opening and the intake hopper outlet opening into the intake hopper enclosure. The supply hopper may include a supply hopper structure defining a supply hopper enclosure, a supply hopper outlet opening extending through a bottom wall of the supply hopper structure. The drop-down device may be coupled between the supply hopper outlet opening and the intake hopper inlet opening. The drop-down device may include a conduit structure and a slat. The conduit structure may define a conduit having a central longitudinal axis and extending along the central longitudinal axis between a drop-down inlet opening at a top end of the conduit structure and a drop-down outlet opening at a bottom end of the conduit structure. The slat may have a first end that is proximate to at least one inner surface of the conduit structure and a second end that is distal to the at least one inner surface of the conduit structure in relation to the first end and is proximate to the drop-down outlet opening in relation to the first end. The slat may include an upper slat surface extending from the first end of the slat to the second end of the slat such that the upper slat surface is angled toward the drop-down outlet opening from the first end at an inclination angle.

The upper slat surface may be a planar surface that extends along a plane that is angled at the inclination angle.

The inclination angle may be about 35 degrees.

The drop-down device may include a plurality of slats extending from one or more inner surfaces of the conduit structure into the conduit, the plurality of slats including the slat.

The plurality of slats may include at least two slats that are offset from each other in a vertical direction extending parallel to the central longitudinal axis of the conduit.

The at least two slats may at least partially overlap in the vertical direction.

The at least two slats may extend into the conduit from opposite side ends of the conduit.

The at least two slats may be exposed from each other in the vertical direction.

The plurality of slats may be offset from each other in the vertical direction and vertically adjacent slats of the plurality of slats may extend into the conduit from opposite side ends of the conduit.

The slat may be pivotably coupled to the conduit structure.

The drop-down inlet opening may be a rectangular opening and the drop-down outlet opening may be a circular opening.

The drop-down device may include a slot opening extending through a thickness of the conduit structure, the slat extending through the slot opening into the conduit through the thickness of the conduit structure.

The conduit structure may define the conduit as having a cross-sectional area, extending perpendicular to the central longitudinal axis and which continuously changes in area magnitude along the central longitudinal axis between a rectangular cross-sectional area at the drop-down inlet opening to a circular cross-sectional area at the drop-down outlet opening.

The dosing apparatus may further include a plurality of doser mechanisms, a plurality of intake hoppers coupled to separate, respective doser mechanisms of the plurality of doser mechanisms, and a plurality of drop-down devices coupled between the supply hopper and separate, respective intake hoppers of the plurality of intake hoppers. The plurality of doser mechanisms may include the doser mechanism. The plurality of intake hoppers may include the intake hopper. The plurality of drop-down devices may include the drop-down device.

The drop-down device may further include a sleeve structure configured to receive and horizontally surround the supply hopper outlet opening to establish fluid communication between the conduit of the drop-down device and the supply hopper.

According to some example embodiments, a packaging machine may include the dosing apparatus, a packaging supply device, a sealing device, and a cutting device. The packaging supply device may be configured to supply a strip of packaging material that is folded to establish a folded strip of packaging material that defines an open enclosure having an enclosure opening. The dosing apparatus may be configured to discharge an index amount of a granular material into the open enclosure through the enclosure opening to at least partially fill a distal portion of the open enclosure with the index amount of the granular material. The sealing device may be configured to join opposing surfaces of the folded strip of packaging material to isolate the distal portion of the open enclosure from a remainder of the open enclosure that includes the enclosure opening such that the isolated distal portion of the open enclosure establishes a sealed enclosure that contains the index amount of the granular material in the folded strip of packaging material. The cutting device may be configured to separate the sealed enclosure from a remainder of the folded strip of packaging material to establish an article of packaging that contains the index amount of the granular material.

According to some example embodiments, a method of operating the dosing apparatus may include: controlling the auger conveyor of the doser mechanism to operate to draw a granular material out of the intake hopper via the doser inlet opening and to be discharged via the doser outlet opening, and causing a flow of the granular material to be supplied from the supply hopper to the intake hopper via the conduit of the drop-down device. The slat of the drop-down device may restrict a flow rate of the flow through the conduit based on at least a portion of the flow of the granular material accumulating on the upper slat surface of the slat.

The method may further include adjusting the inclination angle of the slat to adjust the flow rate of the flow through the conduit.

BRIEF DESCRIPTION OF THE DRAWINGS

The various features and advantages of the non-limiting example embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 8A is a flowchart illustrating a method of operating a doser mechanism of a dosing apparatus to implement a single index operation, according to some example embodiments.

FIG. 8B is a flowchart illustrating a method of controlling a flow of granular material from a supply hopper to an intake hopper through a drop-down device, according to some example embodiments.

DETAILED DESCRIPTION

Figure 1A:
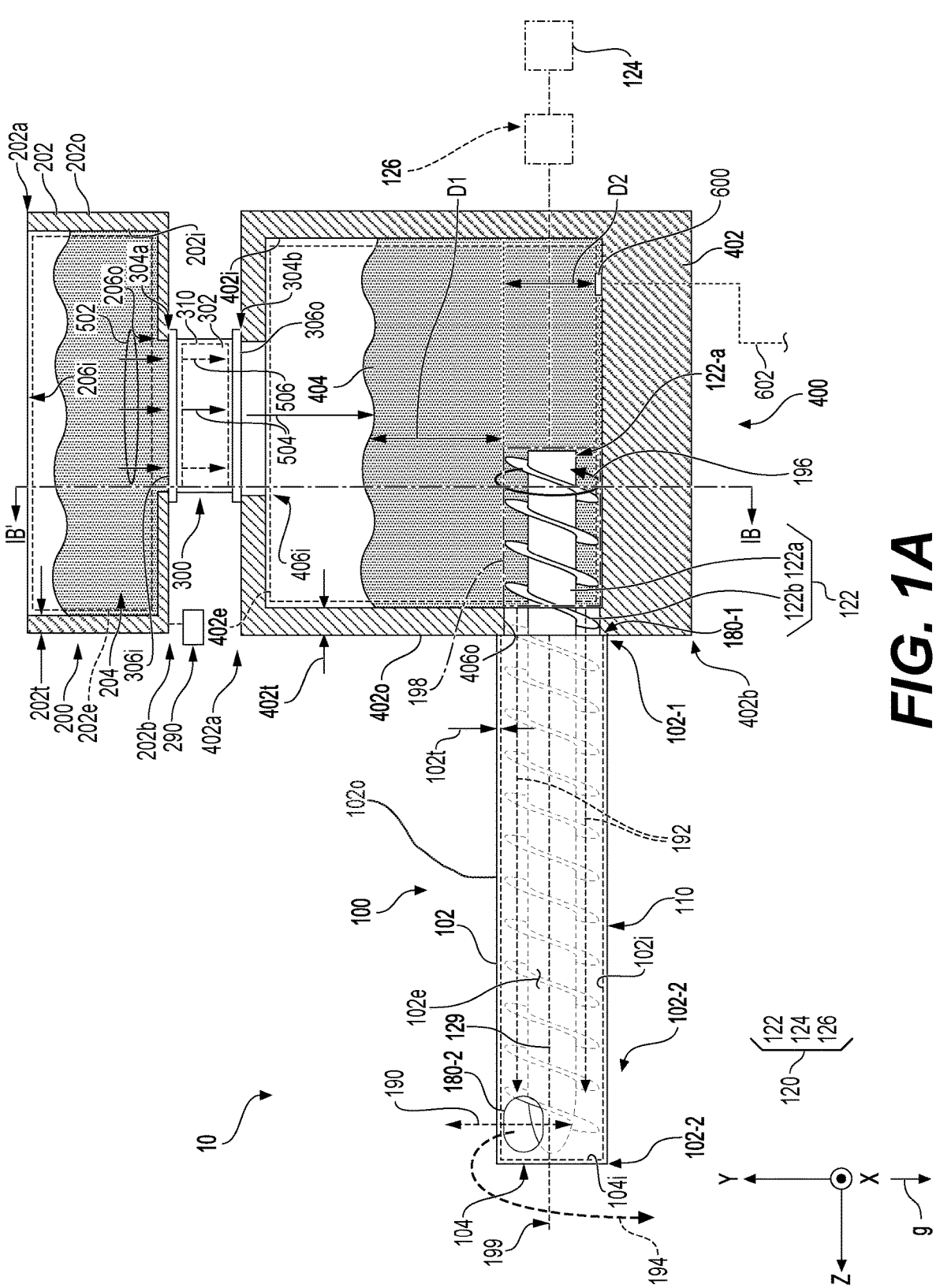
FIG. 1A is a cross-sectional view of a dosing apparatus according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

It will be understood that elements and/or properties thereof (e.g., structures, surfaces, directions, or the like), which may be referred to as being "perpendicular," "parallel," "flush," or the like with regard to other elements and/or properties thereof (e.g., structures, surfaces, directions, or the like) may be "perpendicular," "parallel," "flush," or the like or may be "substantially perpendicular," "substantially parallel," "substantially flush," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially flush" with regard to other elements and/or properties thereof will be understood to be "flush" with regard to the other elements and/or properties thereof within manufacturing tolerances and/or material tolerances and/or have a deviation in magnitude and/or angle from "flush," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Figure 1B:
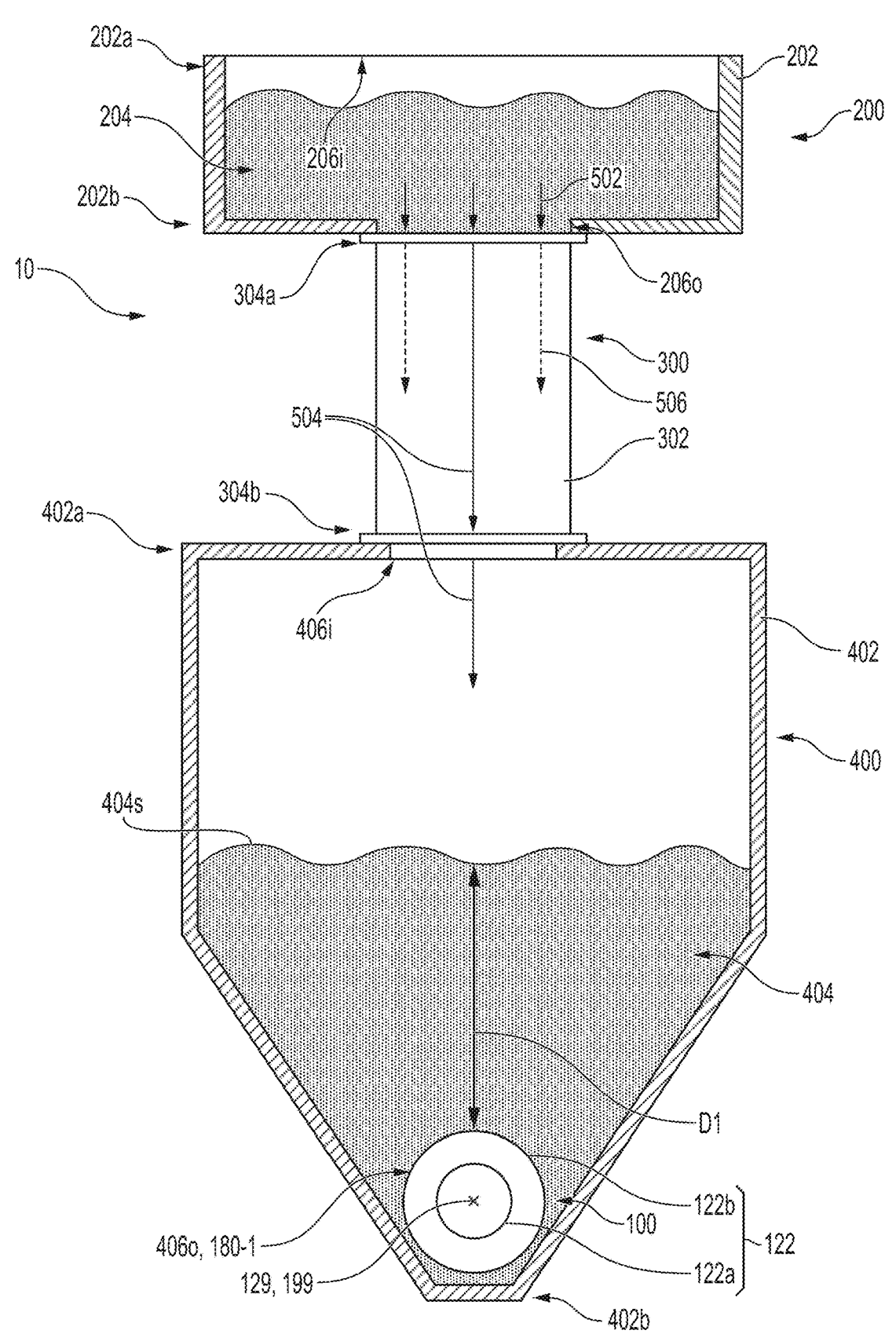
FIG. 1B is a cross-sectional view of the packaging machine of FIG. 1A along cross-sectional view line IB-IB' of FIG. 1A, according to some example embodiments.

FIG. 1A is a cross-sectional view of a dosing apparatus 10 including a doser mechanism 100, a supply hopper 200, a drop-down device 300, and an intake hopper 400. FIG. 1B is a cross-sectional view of the dosing apparatus of FIG. 1A along cross-sectional view line IB-IB' of FIG. 1A, according to some example embodiments.

Referring to FIGS. 1A and 1B, in some example embodiments, the doser mechanism 100 may include a cylindrical shell 110. As shown in FIGS. 1A and 1B, the hollow cylinder 102 may extend between opposite first and second ends 102-1 and 102-2. The hollow cylinder 102 may have an inner cylinder surface $102i$ that may at least partially define an open internal enclosure, referred to as enclosure $102e$, having a central longitudinal axis 199 that extends between the first and second ends 102-1 and 102-2 of the hollow cylinder 102.

As shown in at least FIGS. 1A and 1B, the hollow cylinder 102 may at least partially define a doser inlet opening 180-1 into the enclosure 102e at the first end 102-1 of the hollow cylinder 102 such that the central longitudinal axis 199 intersects the doser inlet opening 180-1. As shown in at least FIGS. 1A and 1B, the central longitudinal axis 199 may extend through a center of the doser inlet opening 180-1 and may be the same as the central axis of the doser inlet opening 180-1.

The cylindrical shell 110 further include an end cap 104 (also referred to herein as an end plate) having an inner surface 104i, and the hollow cylinder 102 and the end cap 104 (e.g., the respective inner surfaces 102i and 104i thereof) may collectively define the enclosure 102e. The end cap 104 may be attached (e.g., bolted, welded, adhered, etc.) to the second end 102-2 of the hollow cylinder 102 so as to cover (e.g., close, seal, etc.) the second end 102-2 to isolate the enclosure 102e from an exterior of the cylindrical shell 110 through the second end 102-2 of the hollow cylinder 102. The enclosure 102e may be defined by at least the hollow cylinder 102 and the end cap 104 to be open at the first end 102-1 and closed at the second end 102-2 in a direction that is parallel to the central longitudinal axis 199 (e.g., the Z direction as shown in FIGS. 1A and 1B).

Still referring to FIGS. 1A and 1B, the hollow cylinder 102 may further define a doser outlet opening 180-2 into the enclosure 102e through a thickness 102t of the hollow cylinder 102 between the inner cylinder surface 102i and an outer cylinder surface 102o of the hollow cylinder 102. Because the doser outlet opening 180-2 may be defined by a conduit that extends through the thickness 102t of the hollow cylinder 102, the doser outlet opening 180-2 that is defined by the hollow cylinder 102 thus may have a central axis 190 that is different from the central longitudinal axis 199. In particular, as shown, the central axis 190 of the doser outlet opening 180-2 may be perpendicular to a longitudinal axis that is parallel (e.g., paraxial) to the central longitudinal axis 199, and thus the central axis 190 may be perpendicular to the central longitudinal axis 199. The doser outlet opening 180-2 may be proximate to an opposite end of the cylindrical shell 110 from the doser inlet opening 180-1.

In some example embodiments, the hollow cylinder 102 and the end cap 104 may comprise one or more materials, including one or more metal materials (e.g., stainless steel, aluminum, etc.), one or more plastic materials (e.g., Nalgene®, polyether ether ketone (PEEK) plastic, liquid crystal polymer (LCP), Acetal, etc.), or the like. In some example embodiments, the hollow cylinder 102 and the end cap 104 may comprise any metal material. In some example embodiments, the hollow cylinder 102 and the end cap 104 comprise a same material (e.g., stainless steel, aluminum, plastic, etc.).

It will be understood that, in some example embodiments, the end cap 104 may be omitted from the cylindrical shell 110 such that the hollow cylinder 102 may define the doser outlet opening 180-2 at the second end 102-2 as being intersected by the central longitudinal axis 199.

Still referring to FIGS. 1A and 1B, in some example embodiments, the doser mechanism 100 may include an auger conveyor 120. The auger conveyor 120 may include one or more augers 122 (which may include a shaft 122a and a helical screw blade 122b) that at least partially extend through the enclosure 102e between the first end 102-1 and the second end 102-2 in a direction that is parallel with the central longitudinal axis 199, such that the one or more augers 122 extend through the cylindrical shell 110 and further extend through the doser inlet opening 180-1 into an exterior of the cylindrical shell 110. As shown in at least FIG. 1A, the one or more augers 122 may extend along the entire distance, or substantially the entire distance, between the first and second ends 102-1 and 102-2 through the enclosure 102e, but example embodiments are not limited thereto. For example, the one or more augers 122 may extend, from the first end 102-1, paraxially with (e.g., along, parallel with, parallel to, etc.) the central longitudinal axis 199, about 90% of the distance between the first and second ends 102-1 and 102-2, about 95% of the distance between the first and second ends 102-1 and 102-2, about 99% of the distance between the first and second ends 102-1 and 102-2, or the like. The one or more augers 122 may have one or more various diameters of shaft 122a and/or helical screw blade 122b may comprise any material, including stainless steel, plastic (e.g., e.g., Nalgene®, polyether ether ketone (PEEK) plastic, liquid crystal polymer (LCP), Acetal, etc.), or the like.

The one or more augers 122 may include multiple augers that extend in parallel through the enclosure 102e, but example embodiments are not limited thereto and in some example embodiments the auger conveyor 120 may include a single auger 122.

The one or more augers 122 may further extend, from the enclosure 102e, through the doser inlet opening 180-1 and to an exterior of the cylindrical shell 110. As shown, the auger conveyor 120 may include a drive motor 124 and a drive transmission 126. The one or more augers 122 may be mechanically coupled to the drive motor 124 (e.g., an electric motor, such as a servomotor), via the drive transmission 126 (e.g., a gear box, a drive belt, a set of meshed gears, or the like) such that the auger conveyor 120 is configured to cause the one or more augers 122 to rotate 196 around their respective longitudinal axes 129 (which may extend in parallel to and/or may be the same as the central longitudinal axis 199) based on operation of the drive motor 124. The drive motor 124 may include a servomotor. In some example embodiments, the drive transmission 126 is absent from the auger conveyor 120 such that the drive motor 124 is mechanically coupled to at least one of the one or more augers 122 directly (e.g., as a direct drive mechanism). In some example embodiments, the drive transmission 126 is mechanically coupled between the one or more augers 122 and the drive motor 124 and is configured to transmit the rotation of a driveshaft of the drive motor 124 to the one or more augers 122 via the drive transmission 126. In some example embodiments, the drive transmission 126 is configured to transmit the drive motor 124 driveshaft rotation to each of the one or more augers 122 to cause the one or more augers 122 to rotate 196 via the drive transmission 126.

Figure 5:
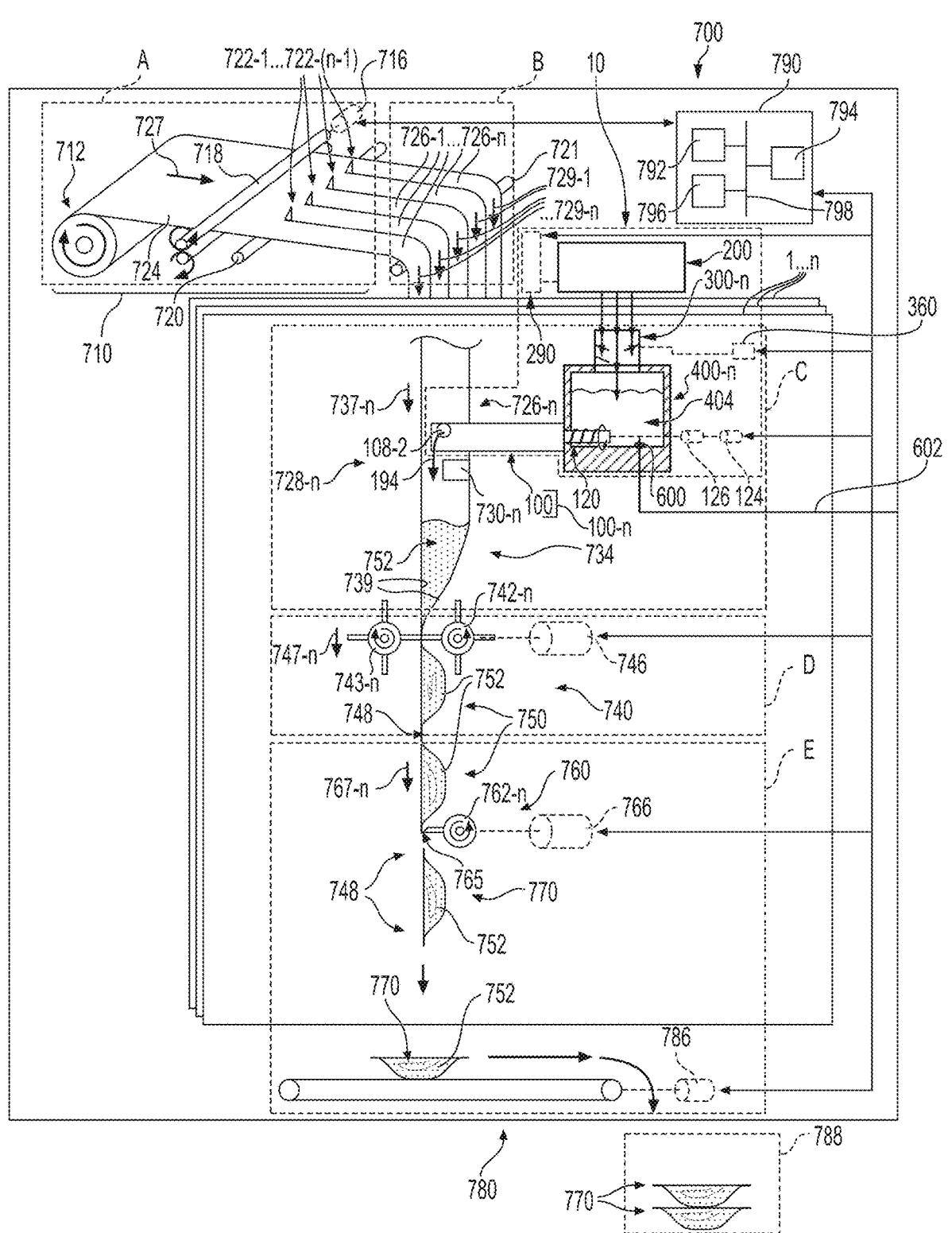
FIG. 5 is a schematic view of a packaging machine that includes at least one dosing apparatus, according to some example embodiments.

It will be understood that the drive motor 124 may be communicatively coupled (e.g., via a wired or wireless electronic communication link) to a control device as described herein (e.g., control device 790 shown in FIG. 5). The control device may be configured to control the drive motor 124 (e.g., control activation/deactivation timing of drive motor 124 driveshaft rotation, rotation duration, rotation count, and/or rate of rotation) to control operation of the auger conveyor 120, for example to selectively activate and deactivate rotation 196 of the one or more augers 122 at particular times and to further control the rate of rotation 196 of the one or more augers 122, to control the timing and/or rate of movement, supply, etc. of granular material by the doser mechanism 100. In some example embodiments, the control device that is configured to control the drive motor 124 may be considered to be a part of the doser mechanism

100. In some example embodiments, the control device may be considered to be separate from the doser mechanism 100.

In some example embodiments, the drive motor 124 may be a servomotor (which will be understood to have a driveshaft that may be controllably caused to rotate) that may be controlled by a control device as described herein (e.g., control device 790 as shown in FIG. 5) to switch the auger conveyor 120 to the "on" operating state at a particular time to cause the one or more augers 122 to each rotate 196 at a particular rate of rotation (which may be the same rate or different rate for each of the one or more augers 122) for a particular period of time (e.g., a particular duration) and then to stop rotating 196 (e.g., switch the auger conveyor 120 to the "off" operating state) so that the one or more augers 122 move (e.g., discharge) a particular amount of granular material 194 out of the doser outlet opening 180-2 during the particular period of time following the particular time at which the auger conveyor 120 is first switched to the "on" operating state and ending at the next time at which the auger conveyor 120 switched to the "off" operating state. Such a particular amount of granular material may be considered to be an "index" or "dose" of granular material that is supplied by the doser mechanism 100. The operation of the drive motor 124 to cause the doser mechanism 100 to supply the particular amount of granular material (e.g., the "index" or "dose" of granular material) out of the doser outlet opening 180-2 due to causing the one or more augers 122 to rotate 196 for a particular period of time at respective particular rates of rotation (e.g., based on causing the drive motor 124 to rotate the driveshaft thereof at a particular rate of rotation for a particular period of time) may be referred to as causing the doser mechanism 100 to execute an "index" operation.

In some example embodiments, the drive motor 124 may be a servomotor that may be controlled by a control device as described herein (e.g., control device 790 as shown in FIG. 5) to rotate a driveshaft thereof for a particular number of times at a particular rate of rotation, to rotate the drive-shaft thereof for a particular period of time at a particular rate of rotation, or the like. Such controlled rotation of the drive motor 124 driveshaft may correspond to causing the one or more augers 122 to each rotate 196 for a particular number of times at a particular rate of rotation, to each rotate 196 for a particular period of time at a particular rate of rotation, or the like.

Such controlled rotation of the drive motor 124 driveshaft may therefore correspond to causing the auger conveyor 120, and thus the doser mechanism 100, to supply a particular amount of granular material. A relationship between driveshaft rotation duration, rotation rate, rotation count, amount and/or rate of electrical power supplied to drive motor, and the resulting amount of granular material supplied by the doser mechanism 100 may be stored in a database (e.g., an empirically generated look-up table). The control device may be configured to access the database (e.g., where the database is stored in a memory of the control device) to enable the control device to drive the drive motor 124 in such a way as to control the doser mechanism 100 to supply a particular amount of granular material at a particular time, at a particular period in time, or the like. As a result, the amount of granular material that is moved by the auger 122 through the enclosure 102e and through the doser outlet opening 180-2 may be more precisely controlled based on controlling the operation of the drive motor 124.

In some example embodiments, the doser mechanism 100 is configured to controllably convey (e.g., supply, feed, move, force, discharge, flow, etc.) a granular material (also referred to herein as simply a "material") from the doser inlet opening 180-1 into the enclosure 102e of the cylindrical shell 110. Restated, the doser mechanism 100 may be configured to draw a granular material 192 into the enclosure 102e via the doser inlet opening 180-1 based on operation of the auger conveyor 120. The doser mechanism 100 may be configured to convey (e.g., supply, feed, move, force, discharge, flow, etc.) the granular material 192 through the enclosure 102e from the doser inlet opening 180-1 toward the doser outlet opening 180-2. The doser mechanism 100 may be further configured to convey (e.g., supply, feed, move, force, discharge, flow, etc.) the granular material through the doser outlet opening 180-2 and thus out of the doser mechanism 100 as granular material 194. The movement, or conveyance, of the granular material through the doser mechanism 100 and through the doser outlet opening 180-2 may be controlled based at least on controlled (e.g., selectively activated and/or deactivated) operation of the auger conveyor 120, to thus cause the doser mechanism 100 to supply a particular amount (e.g., volume and/or mass) of granular material 194, also referred to herein as an "index" or "dose" of granular material, which may be sealed in packages (e.g., articles of packaging) to provide a dis-crete, consistently-sized amount of granular material in each package.

Still referring to FIGS. 1A and 1B, the intake hopper 400 (also referred to herein interchangeably as a "bottom hop-per", "doser hopper," or the like) may include an intake hopper structure 402 (e.g., a hopper bin, one or more wall structures, etc.) having one or more inner surfaces 402i that at least partially define an intake hopper enclosure 402e (also referred to as an intake reservoir enclosure, an intake reservoir space, or the like). The intake hopper structure 402 may have a top wall 402a at a top end of the intake hopper structure 402 and at least partially defining a top boundary of the intake hopper enclosure 402e. The intake hopper structure 402 may define an intake hopper inlet opening 406i that extends through the top wall 402a of the intake hopper structure 402. The intake hopper structure 402 may define an intake hopper outlet opening 406o extending through a thickness 402t of the intake hopper structure 402, between an inner surface 402i and an opposing outer surface 402o thereof, at a location that is below the intake hopper inlet opening 406i. For example, as shown in FIG. 1A, the intake hopper structure 402 may define an intake hopper outlet opening 406o extending through a thickness 402t of a sidewall of the intake hopper structure 402 that is located between a top wall 402a defining a top end of the intake hopper structure 402 and a bottom wall 402b defining a bottom end of the intake hopper structure 402.

As shown in FIGS. 1A and 1B, the intake hopper 400 may be configured to hold an amount (e.g., an intake amount) of granular material 404 within the intake hopper enclosure 402e, for example based on the intake hopper 400 receiving a flow 504 of granular material into the intake hopper enclosure 402e via the intake hopper inlet opening 406i that may be at a top end of the intake hopper 400.

Still referring to FIGS. 1A and 1B, the doser mechanism 100 may be coupled to the intake hopper 400 so that the doser inlet opening 180-1 of the cylindrical shell 110 is in fluid communication with the intake hopper enclosure 402e via the intake hopper outlet opening 406o. The hollow cylinder 102 may be attached to one or more portions of the intake hopper structure 402, for example based on the hollow cylinder 102 being welded, adhered, bonded, and/or fastened to a bracket plate that is itself welded or fastened to the outer surface 402o of the intake hopper structure 402.

The hollow cylinder 102 may be attached to one or more portions of the intake hopper structure 402, for example based on the hollow cylinder 102 itself being directly adhered, welded, fastened, or the like to the outer surface 4020, or any combination thereof. As shown, when the doser mechanism 100 is coupled to the intake hopper 400, the doser inlet opening 180-1 may be directly adjacent to the intake hopper outlet opening 4060 and aligned to overlap the intake hopper outlet opening 4060 (e.g., in a horizontal direction that is the Z direction).

As shown in FIGS. 1A and 1B, at least a portion of the auger conveyor 120, specifically at least a portion of one or more augers 122 thereof, may extend from the enclosure 102e of the cylindrical shell 110, through both the doser inlet opening 180-1 and the intake hopper outlet opening 4060, and into the intake hopper enclosure 402e based on the doser mechanism 100 being coupled to the intake hopper 400. Accordingly, the auger conveyor 120 will be understood to extend into the intake hopper 400 based on the doser mechanism 100 being coupled to the intake hopper 400. In such a configuration, the auger conveyor 120 may be configured to operate (e.g., cause the one or more augers 122 to rotate 196 around their respective longitudinal axes) to move (e.g., draw, convey) at least some of the granular material in the intake hopper enclosure 402e (e.g., at least a portion of the intake amount of granular material), as granular material 192, from the intake hopper enclosure 402e and into the enclosure 102e via the intake hopper outlet opening 4060 and the doser inlet opening 180-1, and to further convey said granular material 192 through the enclosure 102e from the doser inlet opening 180-1 to the doser outlet opening 180-2 and further move (e.g., supply, discharge) an amount (e.g., an index amount, an index, a dose amount, a dose, etc.) of said granular material through the doser outlet opening 180-2 and out of the doser mechanism 100 as an index amount (e.g., an index, a dose, etc.) of granular material 194. In some example embodiments, the doser outlet opening 180-2 may be located at an upper side of the hollow cylinder 102, such that the central axis 190 of the doser outlet opening 180-2 is at least partially extending in the +Y direction and the granular material 194 that is supplied through the doser outlet opening 180-2 may fall along the outer cylinder surface 1020 and further fall away from the doser mechanism 100 in the direction of gravity "g" (e.g., the −Y direction). However, it will be understood that example embodiments are not limited thereto and the doser outlet opening 180-2 may be located at and/or extend through any portion of the cylindrical shell 110.

Still referring to FIGS. 1A and 1B, the supply hopper 200 (also referred to herein interchangeably as a "top hopper", "bulk hopper," "feed hopper," "bulk feed hopper," or the like) may include a supply hopper structure 202 (e.g., a hopper bin, one or more wall structures, etc.) having one or more inner sidewall surfaces 202i that at least partially define a supply hopper enclosure 202e (also referred to as a supply reservoir enclosure, a supply reservoir space, or the like). The supply hopper structure 202 may have an open top end defining a supply hopper inlet opening 206i at a top end of the supply hopper structure 202. The supply hopper structure 202 may define a supply hopper outlet opening 2060 extending through a thickness 202t of the supply hopper structure 202, between an inner sidewall surface 202i and an opposing outer sidewall surface 2020 thereof, at a bottom wall end 202b of the supply hopper structure 202. As shown in FIGS. 1A and 1B, the supply hopper 200 may hold an amount (e.g., a supply amount) of granular material 204 within the supply hopper enclosure 202e, for example based on the supply hopper 200 receiving granular material into the supply hopper enclosure 202e via the supply hopper inlet opening 206i. In some example embodiments, granular material may be supplied into the supply hopper enclosure 202e via the supply hopper inlet opening 206i via operation of a supply mechanism (e.g., a conveyor device), based on manual operation (e.g., a human operator manually adding granular material into the supply hopper enclosure 202e via the supply hopper inlet opening 206i), or any combination thereof.

As shown, the supply hopper 200 may be coupled (e.g., at the bottom wall end 202b of the supply hopper structure 202) to a vibration device 290 that is configured to operate to cause at least a bottom portion of the supply hopper 200 to vibrate, to thereby induce movement of at least a portion of the supply amount of granular material 204 out of the supply hopper 200 via the supply hopper outlet opening 2060. The vibration device 290 may include a magnetic vibration device that is attached to a hopper mounting base that may be coupled to the supply hopper 200, for example may be rubber mounted to supply hopper 200.

Still referring to FIGS. 1A and 1B, and further referring to FIGS. 2A to 4C, the drop-down device 300 (also referred to herein as an angle of repose drop-down, a drop-down, or the like) may be coupled between the supply hopper outlet opening 2060 and the intake hopper inlet opening 406i. The drop-down device 300 may include a conduit structure 302 at least partially defining a conduit 310 (also referred to herein as a conduit space) having a central longitudinal axis 380 and extending along the central longitudinal axis 380 between a drop-down inlet opening 306i at a top end 304a of the conduit structure 302 and a drop-down outlet opening 3060 at a bottom end 304b of the conduit structure 302. Accordingly, the drop-down device 300 may be configured to establish fluid communication between the supply hopper 200 and the intake hopper 400, where the conduit 310 extends along the central longitudinal axis 380 in flow communication between the supply hopper outlet opening 2060 and the intake hopper inlet opening 406i. As a result, the drop-down device 300 may be configured to enable a flow 504 of granular material to be supplied from the supply hopper 200 (e.g., from granular material 204) to the intake hopper 400 (e.g., to granular material 404), from which granular material 192 may be drawn by a doser mechanism 100 to be supplied as a particular amount (e.g., a dose or index amount) of supply granular material 194.

Still referring to FIGS. 1A and 1B and further referring to FIGS. 2A to 4C, in some example embodiments the drop-down device 300 may be configured to restrict (e.g., constrict) the flow 504 of granular material from the supply hopper 200 to the intake hopper 400 via the conduit 310, for example based on at least a portion of the granular material 502 entering the conduit 310 via the drop-down inlet opening 306i being retained within the conduit 310 as retention granular material 506, such that a flow 504 (e.g., discharge flow) of granular material from the drop-down outlet opening 3060 and through the intake hopper inlet opening 406i into the intake hopper enclosure 402e is a limited portion of a maximum discharge flow that may be possible through an unobstructed conduit having a cross-sectional flow area defined exclusively by the one or more inner surfaces 302s of the conduit structure 302 the conduit 310. The granular material that is retained in the conduit 310 of the drop-down device 300 may be referred to as retention granular material 506. As described herein the drop-down device 300 may be configured to restrict the flow 504 through the conduit 310 based on directing the flow 504 around at least one slat 320

(also referred to herein interchangeably as a louver) extending into, through, and/or within the conduit 310, where the at least one slat 320 has an upper slat surface that is angled downwards from a first end 384a that is proximate to an inner surface 302s of the conduit structure to a second end 384b that is distal to the inner surface 302s at an inclination angle 390, where the inclination angle 390 corresponds to an angle of repose of the granular material 204, 404, 192, 194.

Based on the drop-down device 300 restricting the flow of granular material 502 from the supply hopper 200 to the intake hopper 400 via the conduit 310, a depth D1 of granular material 404 in the intake hopper enclosure 402e above the one or more augers 122 may be maintained within a certain range, optimized, reduced, minimized, or the like. As a result, a magnitude of pressure the granular material 404 at the depth D1 on the one or more augers 122 (also referred to herein as a head pressure of the granular material 404 at the depth D1) may be controlled to be maintained within a certain range, optimized, reduced, minimized, or the like. Based on such controlled head pressure of the granular material 404 at the depth D1 of the one or more augers 122 in the granular material 404, which may be based on the drop-down device restricting the flow 504 of granular material from the supply hopper 200 to the intake hopper 400, the operation of the doser mechanism 100 to reliably supply a particular index amount (e.g., "dose" amount) of granular material 194 with reduced, minimized, or prevented restriction, interruption, or variation in the induced flow of granular material 192 that is drawn from the intake hopper 400 based on operation the one or more augers 122 may be improved. As a result, the drop-down device 300 may be configured to improve operational reliability, and thus improve the functionality, of the dosing apparatus 10 based on restricting the flow rate of the flow 504 of granular material from the supply hopper 200 to the intake hopper 400.

For example, as shown in at least FIG. 1B, the intake hopper structure 402 may taper (e.g., narrow) in horizontal cross section from at least a certain height toward the bottom wall 402b of the intake hopper structure 402, and the one or more augers 122 may extend into the intake hopper enclosure 402e and thus be located within the enclosure 402e at the bottom, horizontally narrowest portion of the enclosure 402e (e.g., adjacent to the bottom wall 402b), so that granular material 404 in the intake hopper enclosure 402e is directed by the intake hopper structure 402 towards the one or more augers 122 under force of pressure and gravity on the granular material 404. As a result, a pressure at the augers 122, located a depth D1 under the top surface 404s of the granular material 404 in the intake hopper enclosure 402e, may be at or near a maximum pressure in the intake hopper enclosure 402e. In some example embodiments, where the depth D1 of the granular material 404 above the one or more augers 122 is above a certain threshold magnitude, the resultant head pressure of granular material 404 at least at the depth D1 above the one or more augers 122 may lead to "ratholing" in the granular material 404 around the one or more augers 122, during operation of the one or more augers 122 (e.g., rotation 196 of the one or more augers 122 around respective longitudinal axes 129) wherein the head pressure of the granular material 404 at the depth D1 causes the granular material 404 at the depth D1 to at least partially become so tightly packed that a flow of granular material 404 into a space 198 through which the one or more augers 122 rotate 196 to draw granular material 192 from the enclosure 402e (e.g., a flow into space 198 to replace or backfill granular material removed from space 198 by the one or more augers 122) may be restricted (e.g., reduced, inhibited, or stopped) due to ratholing of the granular material at depth D1. As a result, the space 198 may become a void once granular material 404 already present in the space 198 is drawn out of the enclosure 402e as granular material 192 based on operation of the one or more augers 122 and the tightly packed granular material 404 surrounding space 198 does not flow into (e.g., backfill) space 198 to replace the removed granular material 192 due to ratholing. Based on generation of such a void around the one or more augers 122 in the space 198 through which the one or more augers 122 rotate, the ability of the one or more augers 122 to draw granular material 192 from the intake hopper 400 may be reduced, inhibited, or stopped. As a result, the dosing apparatus 10 may be inhibited from providing index amounts of granular material 194 with reliable timing, amounts (e.g., consistency) or the like due to ratholing of the granular material 404 as a result of excess head pressure of the depth D1 of granular material 404 above the one or more augers 122 in the enclosure 402e.

In some example embodiments, the drop-down device 300 may be configured to control (e.g., optimize, reduce, minimize, etc.) the magnitude of depth D1 of granular material 404 above the one or more augers 122 or maintain the magnitude of the depth D1 at a certain low magnitude, based on restricting the flow rate of the flow 504 of granular material into the intake hopper 400 while the doser mechanism 100 may draw granular material 192 out of the intake hopper 400 (e.g., draw granular material 404 in space 198 out of the intake hopper 400 as granular material 192) at a particular rate, where the drop-down device 300 may restrict the flow rate of the flow 504 to match and/or be within a margin (e.g., 10% margin, 20% margin, etc.) of the effective flow rate of the granular material 192 being drawn out of the intake hopper 400 by the doser mechanism 100.

In some example embodiments, based on the drop-down device 300 enabling improved control (e.g., reduction, optimization, minimization, etc.) of the depth D1 of granular material 404 over the one or more augers 122 based on restricting the flow 504 of granular material into the intake hopper 400, the head pressure of the depth D1 of granular material 404 on the one or more augers 122 may be controlled (e.g., reduced, optimized, minimized, etc.) to reduce, minimize, or prevent head pressure-induced ratholing of the granular material 404 at depth D1, which may thus enable flow of granular material 404 into the space 198 to replace (e.g., backfill) granular material 192 drawn out of the space 198 by the one or more augers 122. Thus, ratholing-induced restrictions in the flow of granular material 192 drawn out of the intake hopper 400 by the one or more augers 122 of the doser mechanism 100 may be reduced, minimized, or prevented. As a result, the drop-down device 300 may improve functionality of the dosing apparatus 10, and for example a packaging machine including same as shown in FIG. 5, to reliably supply one or more index amounts of granular material 194 based on operation of at least the doser mechanism 100.

In addition, in some example embodiments, the vibration device 290 may generate vibration waves to cause vibration of at least a portion of the supply hopper 200, where at least a portion of the vibration waves generated by the vibration device 290 may be transmitted to the intake hopper 400 via at least a portion of the drop-down device 300. In some example embodiments, vibration waves transmitted to the intake hopper 400 may induce internal movement of granular material 404 within the enclosure 402e, which may at least partially compensate for (e.g., mitigate, relieve, etc.)

effects of excessive head pressure of the granular material 404 on the one or more augers 122 at depth D1 (e.g., at least partially reduce ratholing in the granular material at depth D1). Such internal movement of the granular material 404 induced by the transmitted vibration waves may thereby facilitate continued operation of the one or more augers 122 to continue to draw granular material 192 from the intake hopper enclosure 402e, despite the one or more augers 122 potentially being at an excessive depth D1 of granular material 404 that would otherwise result in ratholing of the granular material 404 to restrict flow of granular material 192 drawn by the one or more augers 122. However, in some example embodiments, operation of the vibration device 290 to generate a sufficient amount (e.g., magnitude, frequency, duration, any combination thereof) of vibration waves to be transmitted to the intake hopper to induce internal movement of the granular material 404 and thus facilitate the continued reliable operation of the one or more augers 122 may result in the vibration device 290 generating a greater amount (e.g., magnitude, frequency, duration, any combination thereof) of vibration at the supply hopper 200 than required to induce flow of granular material 502 out of the supply hopper 200 to the drop-down device 300. Such a greater amount of vibration may lead to an elevated probability of mechanical failures of various devices, structures, equipment, or the like included in and/or mechanically coupled with the dosing apparatus 10 (e.g., one or more portions of a packaging machine 700 that includes the dosing apparatus 10 as shown in FIG. 5). As a result, operation of the vibration device 290 to generate sufficient vibrations at the supply hopper 200 to mitigate effects of excess head pressure of granular material 404 at depth D1 in the intake hopper 400, based on vibration wave transmission to the intake hopper 400 via at least the drop-down device 300, may result in an increased possibility of mechanical failures of the dosing apparatus 10 and/or equipment mechanically coupled thereto (e.g., any part of the packaging machine 700 shown in FIG. 5) resulting from vibration waves being transmitted from the vibration device to various portions of the dosing apparatus 10 and/or any equipment mechanically coupled thereto (e.g., any part of the packaging machine 700 to which vibration waves generated by the vibration device 290 may be transmitted). Such an increased possibility of vibration-induced mechanical failures may result in an increased frequency and/or duration of down-time of the dosing apparatus 10 and any mechanically coupled equipment for maintenance, inspection, and/or repair, a reduction in the operational lifetime of the dosing apparatus 10 and any mechanically coupled equipment, increased lifetime maintenance and/or equipment costs associated with the dosing apparatus 10 and any mechanically coupled equipment, or the like.

In some example embodiments, based on drop-down device 300 being configured to restrict the flow 504 of granular material into the intake hopper 400 to thereby control the depth D1 of granular material 404 and thus to reduce the likelihood of operational faults of the doser mechanism 100 due to ratholing-induced restriction in the flow of granular material 192 drawn by the one or more augers 122, the doser apparatus 10 may be configured to facilitate continued reliable operation of the one or more augers 122 with a reduced or an eliminated transmission of vibration waves from the vibration device 290 to the intake hopper 400. As a result, in a dosing apparatus 10 that includes the drop-down device 300 configured to restrict the flow 504, the vibration device 290 may be configured to generate a smaller amount of vibration (e.g., reduced magnitude, frequency, and/or duration of vibration) such that transmission of vibration waves to equipment external to the supply hopper 200 may be reduced, minimized, or prevented without reduction in reliable operation of the dosing apparatus 10 due to head pressure of granular material 404 on the one or more augers 122 in the intake hopper enclosure 402e. As a result, reliability of the dosing apparatus 10 and any mechanically coupled equipment (e.g., any part of packaging machine 700 shown in FIG. 5) may be improved, and production down-time, lifetime maintenance and/or equipment costs, or the like associated with the dosing apparatus 10 and/or any mechanically coupled equipment (e.g., any part of packaging machine 700 shown in FIG. 5) that may otherwise result from transmission of vibrations generated by the vibration device 290 may be reduced, minimized or prevented.

Still referring to FIGS. 1A and 1B, the dosing apparatus 10 may include one or more pressure sensors 600 that may be configured to generate sensor data indicating a head pressure at a particular location within the intake hopper enclosure 402e. The pressure sensor 600 may be any known pressure sensor configured to generate a signal (e.g., sensor data) indicating a magnitude of a pressure acting on the pressure sensor 600, for example a piezoelectric pressure sensor. The pressure sensor 600 may be communicatively coupled to a control device (e.g., control device 790 as described with reference to at least FIG. 5) and may be configured to transmit sensor data generated by the pressure sensor to the control device. The pressure sensor 600 may be coupled (e.g., physically attached) to an inner surface 402i of the intake hopper structure 402 so that the pressure sensor is located at a particular, known depth D2 in the vertical direction (Y direction) from a reference location of the one or more augers 122 from which depth D1 may be calculated (e.g., a top end of the one or more augers 122 as shown in FIGS. 1A and 1B). When the intake hopper enclosure 402e is filled with granular material 404 so that the one or more augers 122 are under a depth D1 of the granular material 404 below the top surface 404s, the pressure sensor 600 may be at a combined depth D1+D2 under the top surface 404s of the granular material 404, where the magnitude D2 may be a known (e.g., predetermined) value that may be stored at a memory of a control device. As a result, the pressure measured by the pressure sensor 600 (e.g., the pressure indicated by sensor data generated by the pressure sensor 600) may be used by the control device to calculate a pressure of granular material 404 acting on the one or more augers 122, a magnitude of the depth D1 of the granular material 404 above the one or more augers 122, or the like. A control device may utilize such calculations to adjust one or more aspects of the dosing apparatus 10 (e.g., adjust a magnitude and/or frequency of vibration by the vibration device 290, adjust an inclination angle of one or more slats 320 in the drop-down device 300, etc.) to adjustably control the flow rate of the flow 504 of granular material into the intake hopper 400 to adjustably control the depth D1 and thus control the pressure of granular material 404 acting on the one or more augers 122. The control device may operate to cause the pressure of granular material 404 acting on the one or more augers 122 to approach and/or match a target magnitude that is associated with improved and/or optimal operation of the one or more augers 122 to draw a consistent, reliable flow of granular material 192 out of the intake hopper 400 to be discharged as index amounts of granular material 194 having a uniform mass and/or volume.

As shown in FIGS. 1A and 1B, the depth D1 is illustrated to extend vertically (e.g., in the Y direction) from a top surface of the granular material 404 in the enclosure 402*e* to a top edge (in the Y direction) of the one or more augers 122, but example embodiments are not limited thereto. For example, the depth D1 may extend vertically (e.g., in the Y direction) from a top surface 404*s* of the granular material 404 in the enclosure 402*e* to a longitudinal axis 129 of the one or more augers 122.

As described herein, a "granular material" may be referred to interchangeably as a "material" and may include particulate matter comprising particles. The granular material may be a powder-like substance that may flow freely when shaken or tilted. In some example embodiments, the granular material may have a particle size (e.g., particle diameter) between about 0.1 μm to about 500 μm. In some example embodiments, the granular material may have a particle size (e.g., particle diameter) between about 0.1 μm to about 200 μm. In some example embodiments, the granular material may have a particle size between about 0.5 mm to about 1 mm, about 0.25 mm to about 0.5 mm, about 125 μm to about 250 μm, about 60 μm to about 125 μm, about 4 μm to about 60 μm, about 1 μm to about 4 μm, any combination thereof, or the like.

In some example embodiments, the granular material may have an average particle size of about 50 μm. In some example embodiments, the granular material may have an average particle size of about 200 μm. In some example embodiments, the granular material may have an average particle size of about 400 μm.

The granular material may partially or entirely comprise particles having a maximum diameter that is between about 0.1 μm to about 1 μm. The granular material may partially or entirely comprise particles having a maximum diameter that is equal to or greater than 1 μm.

The granular material may contain and/or partially or completely comprise at least one substance. In some example embodiments, the at least one substance is a consumer product.

In some example embodiments, the at least one substance and/or the consumer product is an inert powder material. In some example embodiments, the granular material may contain and/or partially or completely comprise a substance that is microcrystalline cellulose (MCC).

In some example embodiments, the at least one substance and/or the consumer product includes (e.g., partially or completely comprises) an oral product.

In some example embodiments, the oral product is an oral tobacco product, an oral non-tobacco product, an oral cannabis product, or any combination thereof. The oral product may be in a form of loose material (e.g., loose cellulosic material), shaped material (e.g., plugs or twists), pouched material, tablets, lozenges, chews, gums, films, any other oral product, or any combination thereof.

The oral product may include chewing tobacco, snus, moist snuff tobacco, dry snuff tobacco, other smokeless tobacco and non-tobacco products for oral consumption, or any combination thereof.

Where the oral product is an oral tobacco product including smokeless tobacco product, the smokeless tobacco product may include tobacco that is whole, shredded, cut, granulated, reconstituted, cured, aged, fermented, pasteurized, or otherwise processed. Tobacco may be present as whole or portions of leaves, flowers, roots, stems, extracts (e.g., nicotine), or any combination thereof.

In some example embodiments, the oral product includes a tobacco extract, such as a tobacco-derived nicotine extract, and/or synthetic nicotine. The oral product may include nicotine alone or in combination with a carrier (e.g., white snus), such as a cellulosic material. The carrier may be a non-tobacco material (e.g., microcrystalline cellulose) or a tobacco material (e.g., tobacco fibers having reduced or eliminated nicotine content, which may be referred to as "exhausted tobacco plant tissue or fibers"). In some example embodiments, the exhausted tobacco plant tissue or fibers can be treated to remove at least 25%, 40%, 50%, 60%, 70%, 75%, 80%, 85%, 90%, or 95% of the nicotine. For example, the tobacco plant tissue can be washed with water or another solvent to remove the nicotine.

In other example embodiments, the oral product may include cannabis, such as cannabis plant tissue and/or cannabis extracts. In some example embodiments, the cannabis material includes leaf and/or flower material from one or more species of cannabis plants and/or extracts from the one or more species of cannabis plants. The one or more species of cannabis plants may include *Cannabis sativa, Cannabis indica,* and/or *Cannabis ruderalis.* In some example embodiments, the cannabis may be in the form of fibers. In some example embodiments, the cannabis may include a cannabinoid, a terpene, and/or a flavonoid. In some example embodiments, the cannabis material may be a cannabis-derived cannabis material, such as a cannabis-derived cannabinoid, a cannabis-derived terpene, and/or a cannabis-derived flavonoid.

The oral product (e.g., the oral tobacco product, the oral non-tobacco product, or the oral cannabis product) may have various ranges of moisture. In some example embodiments, the oral product is a dry oral product having a moisture content ranging from 5% by weight to 10% by weight. In some example embodiments, the oral product has a medium moisture content, such as a moisture content ranging from 20% by weight to 35% by weight. In some example embodiments, the oral product is a wet oral product having a moisture content ranging from 40% by weight to 55% by weight.

In some example embodiments, oral product may further include one or more elements such as a mouth-stable polymer, a mouth-soluble polymer, a sweetener (e.g., a synthetic sweetener and/or a natural sweetener), an energizing agent, a soothing agent, a focusing agent, a plasticizer, mouth-soluble fibers, an alkaloid, a mineral, a vitamin, a dietary supplement, a nutraceutical, a coloring agent, an amino acid, a chemesthetic agent, an antioxidant, a food-grade emulsifier, a pH modifier, a botanical, a tooth-whitening agent, a therapeutic agent, a processing aid, a stearate, a wax, a stabilizer, a disintegrating agent, a lubricant, a preservative, a filler, a flavorant, flavor masking agents, a bitterness receptor site blocker, a receptor site enhancers, other additives, or any combination thereof.

In some example embodiments, the granular material may contain any product or substance. For example, the granular material may contain confectionary products, food products, medicines, or any other product.

Figure 2A:
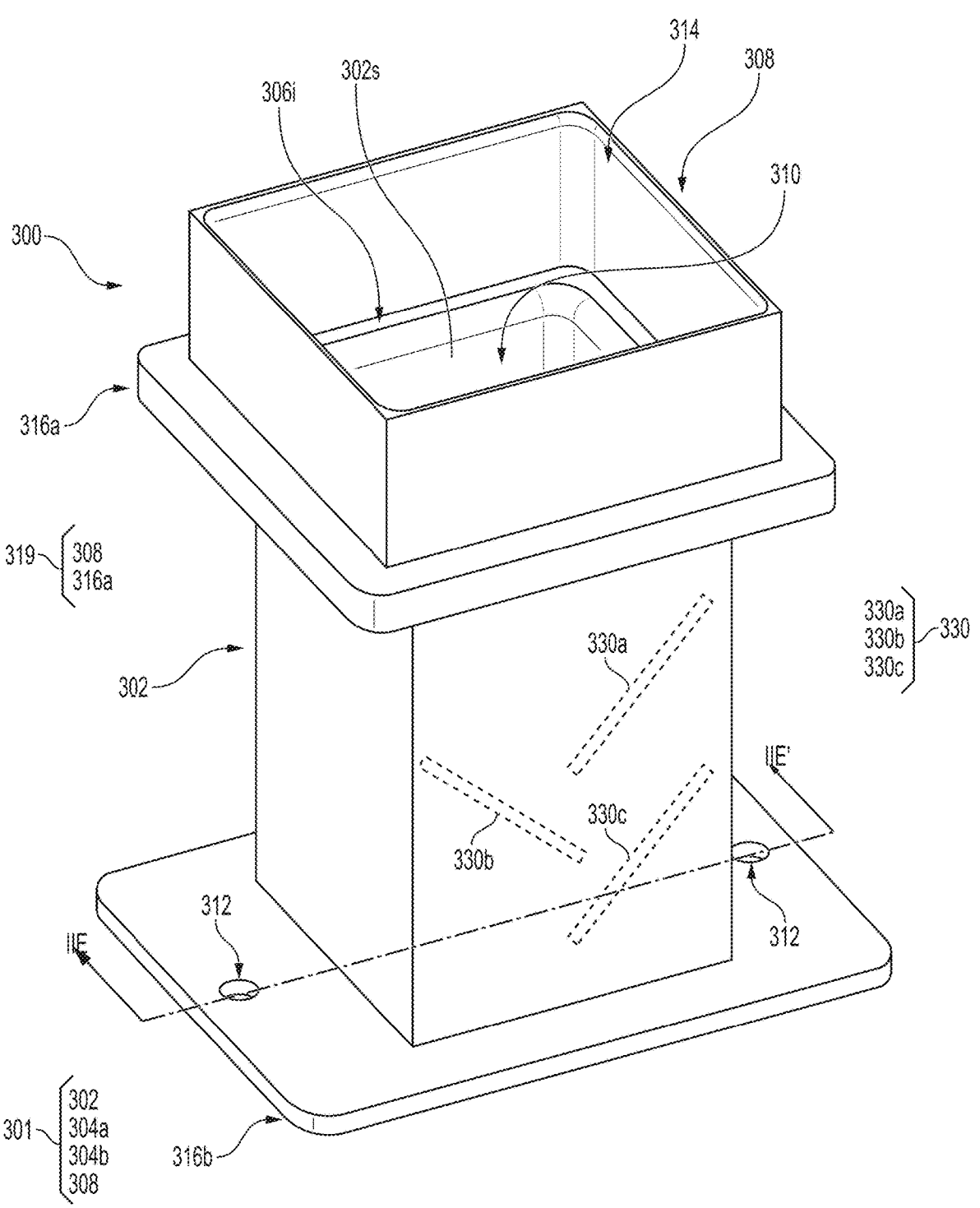
FIG. 2A is a perspective top view of a drop-down device, according to some example embodiments.
Figure 2B:
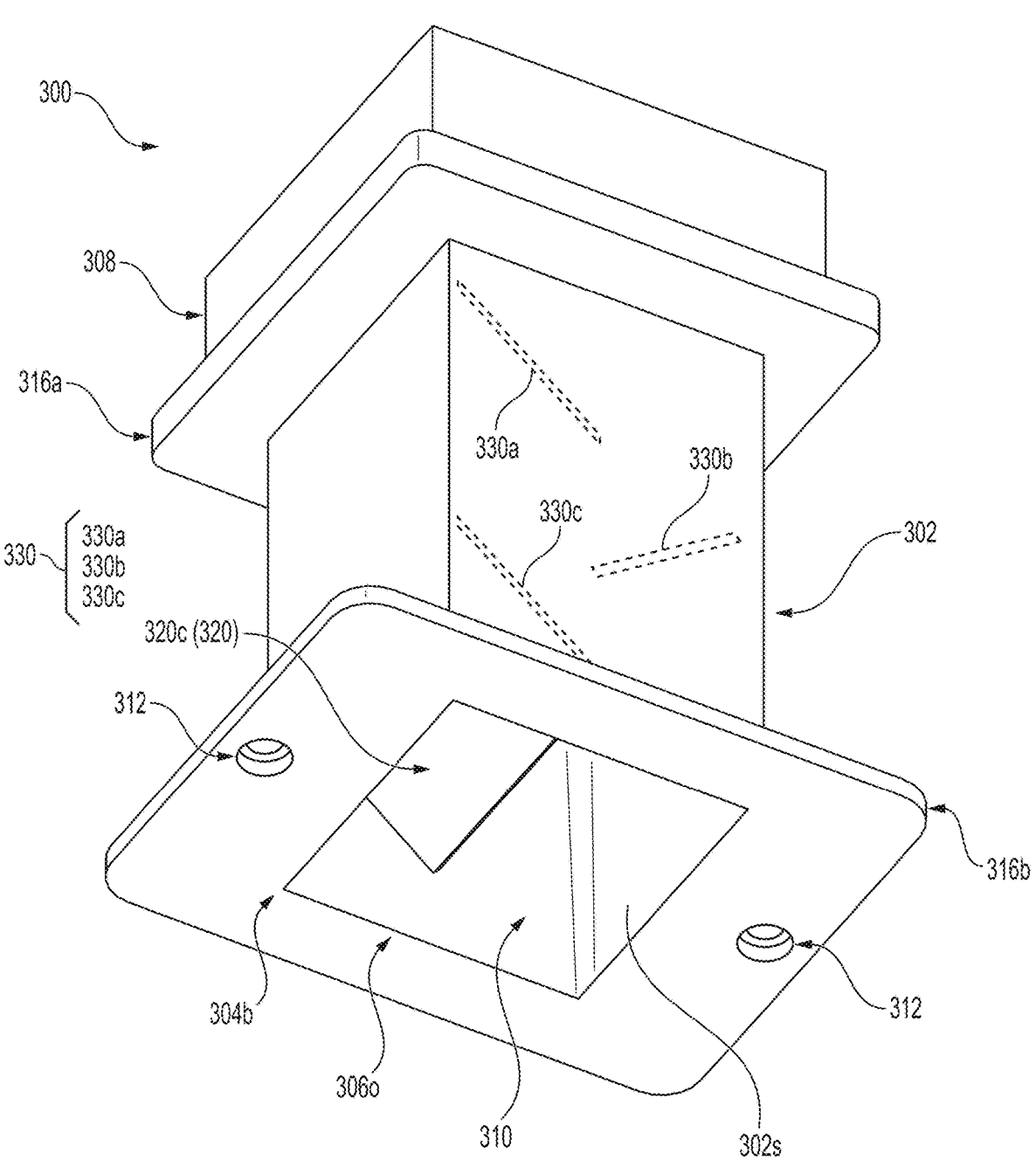
FIG. 2B is a perspective bottom view of the drop-down device of FIG. 2A, according to some example embodiments.
Figure 2C:
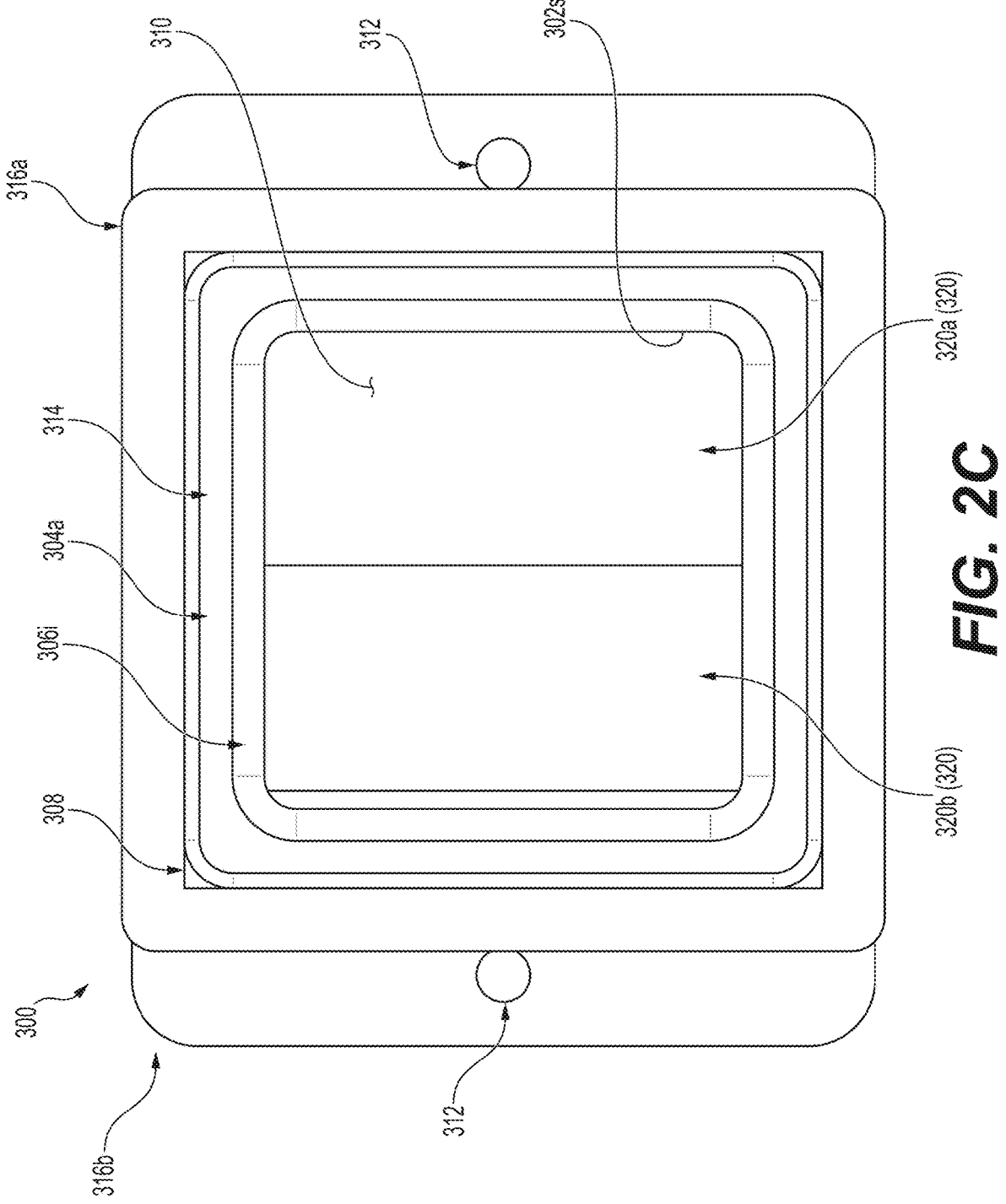
FIG. 2C is a plan top view of the drop-down device of FIG. 2A, according to some example embodiments.
Figure 2D:
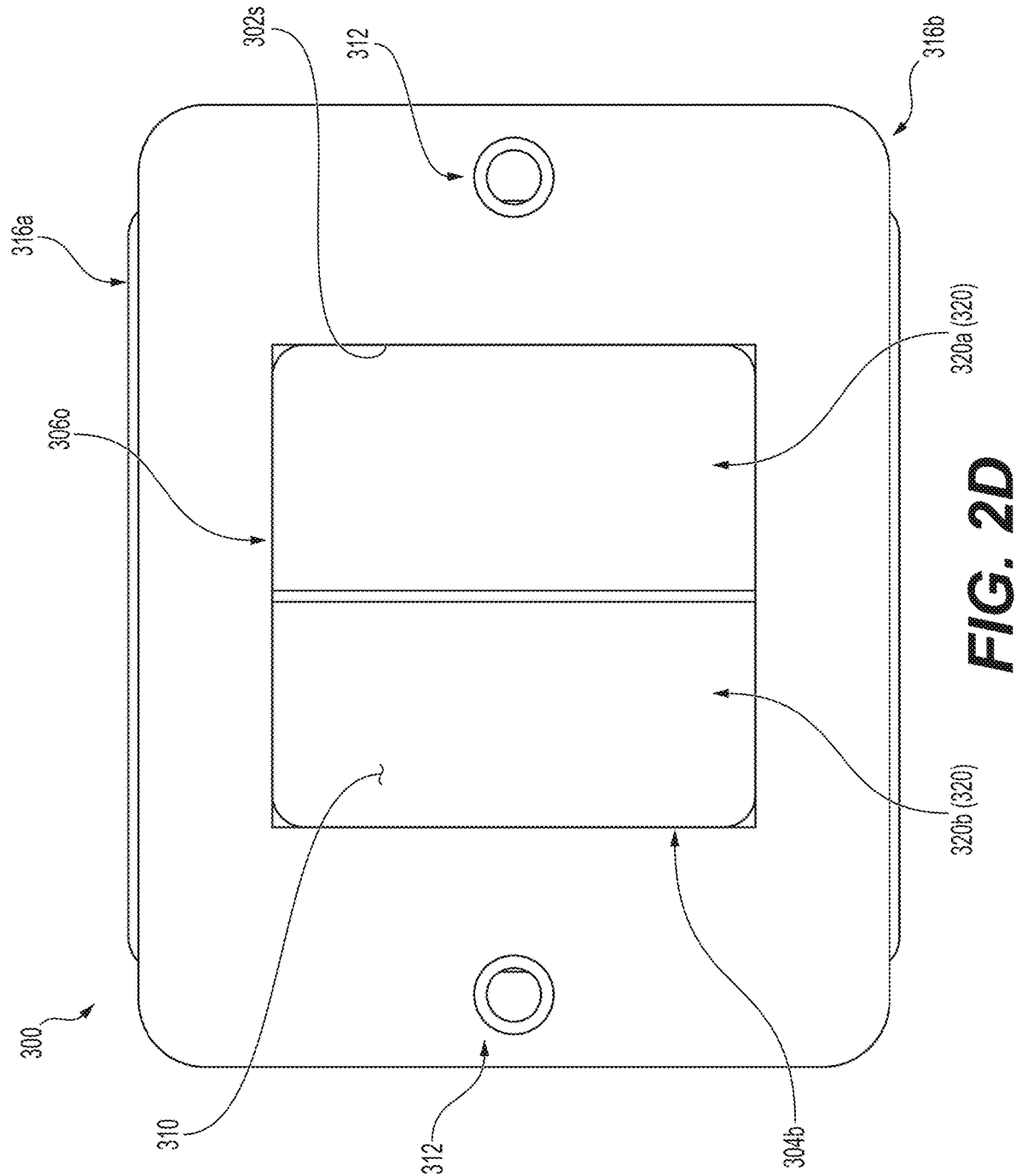
FIG. 2D is a plan bottom view of the drop-down device of FIG. 2A, according to some example embodiments.
Figure 2E:
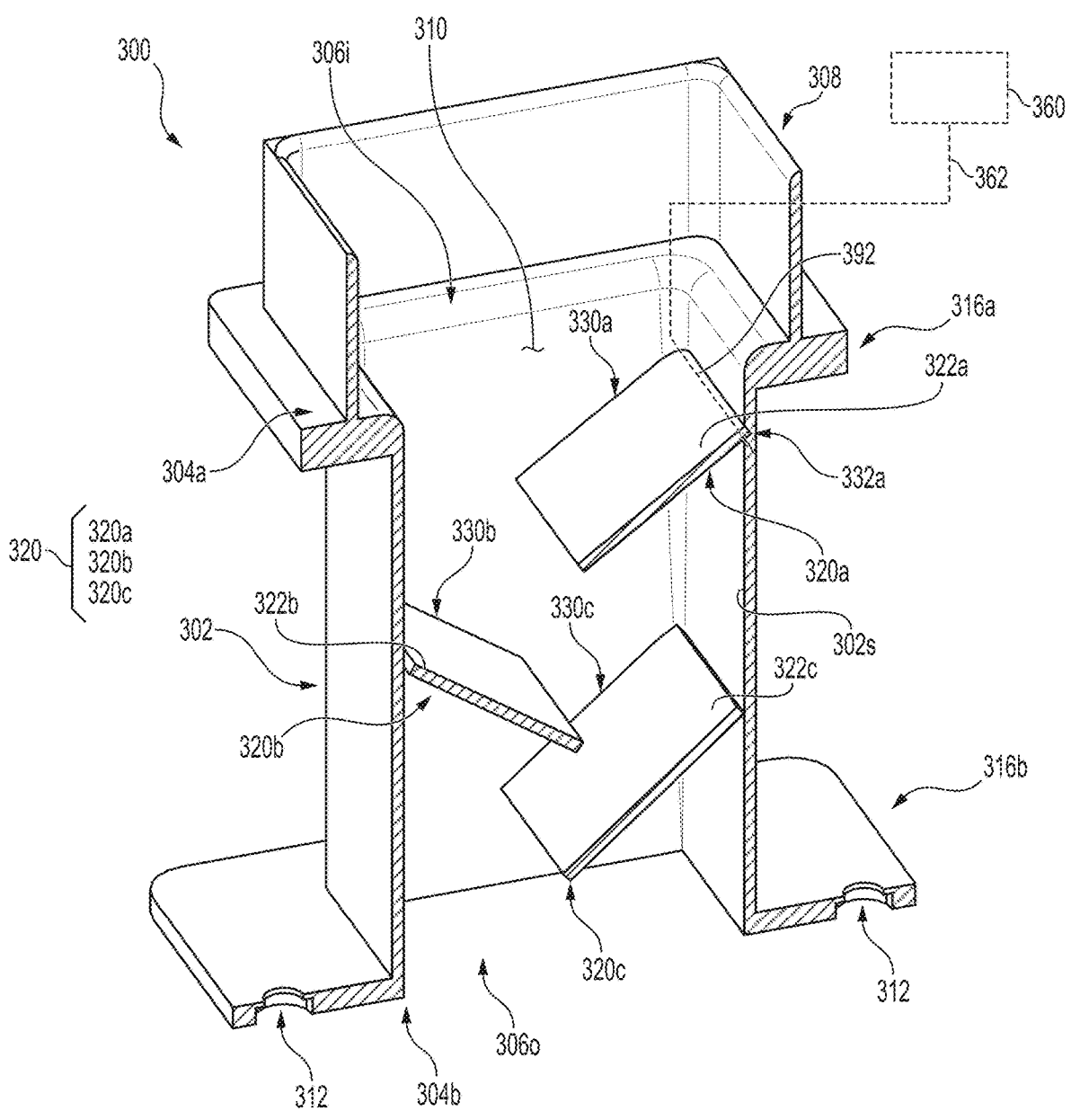
FIG. 2E is a perspective cross-sectional view of the drop-down device of FIG. 2A along cross-sectional view line IIE-IIE' of FIG. 2A, according to some example embodiments.
Figure 2F:
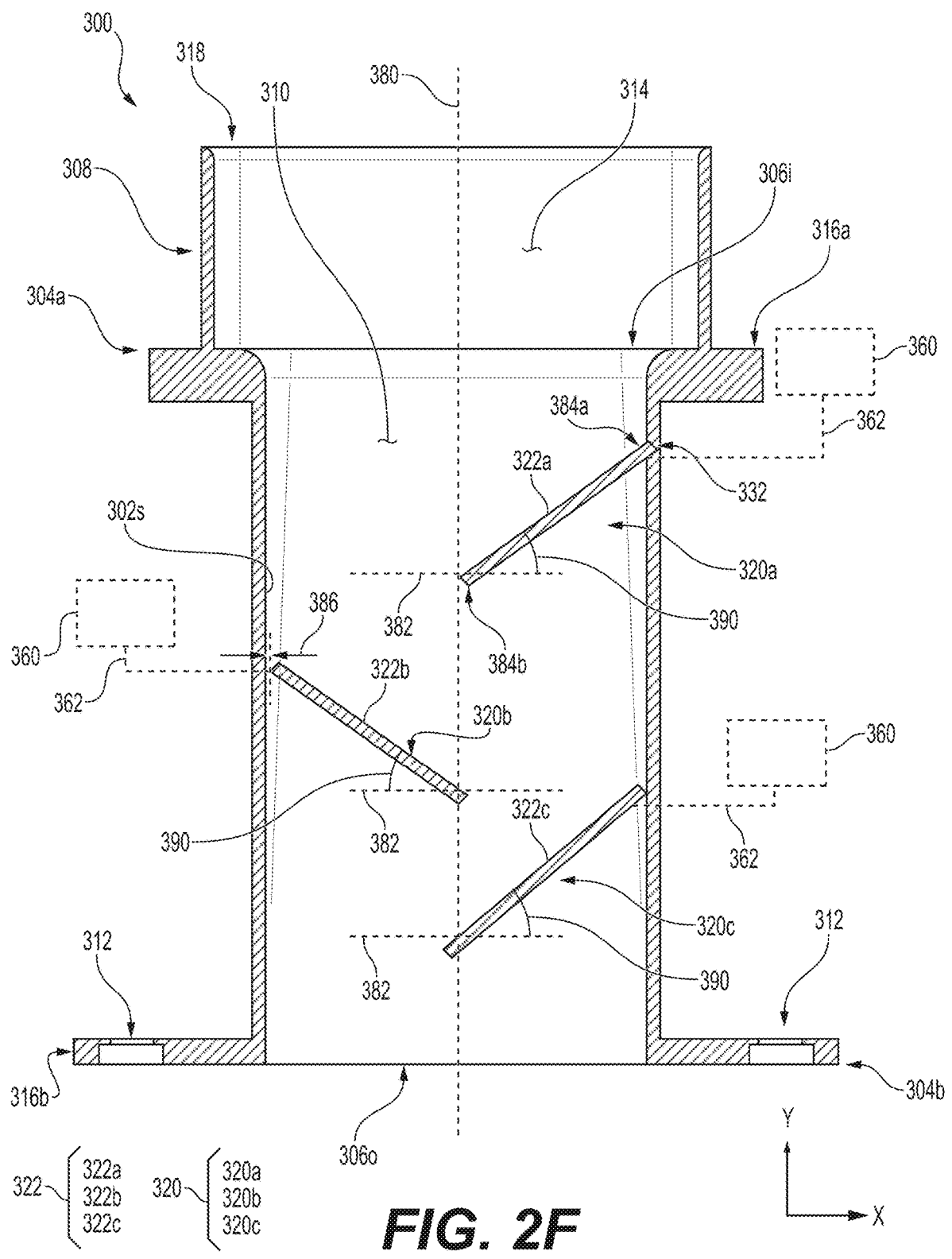
FIG. 2F is an elevation cross-sectional view of the drop-down device 300 of FIG. 2A along cross-sectional view line IIE-IIE' of FIG. 2A, according to some example embodiments.

FIG. 2A is a perspective top view of a drop-down device 300 according to some example embodiments. FIG. 2B is a perspective bottom view of the drop-down device 300 of FIG. 2A according to some example embodiments. FIG. 2C is a plan top view of the drop-down device 300 of FIG. 2A according to some example embodiments. FIG. 2D is a plan bottom view of the drop-down device 300 of FIG. 2A according to some example embodiments. FIG. 2E is a perspective cross-sectional view of the drop-down device 300 of FIG. 2A along cross-sectional view line IIE-IIE' of FIG. 2A, according to some example embodiments. FIG. 2F is an elevation cross-sectional view of the drop-down device 300 of FIG. 2A along cross-sectional view line IIE-IIE' of FIG. 2A, according to some example embodiments. The drop-down device 300 shown in FIGS. 2A-2F may be the drop-down device 300 shown in FIGS. 1A and 1B, although example embodiments are not limited thereto.

Referring to FIGS. 2A to 2F, in some example embodiments the drop-down device 300, which may also be referred to herein an a "drop-down," an "angle of repose drop-down," or the like, includes a device structure 301, also referred to herein as a housing, a housing structure, or the like. As shown, the device structure 301 includes at least a conduit structure 302. The conduit structure 302 has one or more inner surfaces 302s defining a conduit 310 (also referred to herein as a conduit space) extending along a central longitudinal axis 380 of the conduit 310 between a drop-down inlet opening 306i at a top end 304a of the conduit structure 302 and a drop-down outlet opening 3060 at a bottom end 304b of the conduit structure 302. In some example embodiments, the conduit structure 302 may include a rectangular (e.g., square) cylindrical tube defining a conduit 310 have a rectangular (e.g., square) cross section in a plane that is orthogonal to the central longitudinal axis 380, where both the drop-down inlet opening 306i and the drop-down outlet opening 3060 are a rectangular (e.g., square) opening, but example embodiments are not limited thereto. For example, as shown in FIGS. 2A to 2F, the conduit structure 302 may define the drop-down inlet opening 306i to be a rounded rectangular opening and the drop-down outlet opening 3060 to be a rectangular (e.g., square) opening. The drop-down inlet opening 306i may have a larger cross-sectional area in the horizontal plane that is orthogonal to the central longitudinal axis 380 than the cross-sectional area of the drop-down outlet opening. In some example embodiments the conduit structure 302 may define the drop-down inlet opening 306i to be a rectangular opening and the drop-down outlet opening 3060 to be a circular opening. The different shapes of the cross-sectional areas of the drop-down inlet opening 306i and the drop-down outlet opening 3060 may enable the drop-down inlet opening 306i and the drop-down outlet opening 3060 to each be shaped to increase or maximize independent alignment and overlap of the drop-down inlet opening 306i with the supply hopper outlet opening 2060 and/or increase or maximize independent alignment and overlap of the drop-down outlet opening 3060 with the intake hopper inlet opening 406i.

In some example embodiments, the conduit structure 302 may be a tubular structure (e.g., a rectangular tubular structure, a circular cylindrical structure, or the like) that may define the conduit 310 as having a cross-sectional area, extending perpendicular to the central longitudinal axis 380, which changes along the central longitudinal axis 380 between a first cross-sectional area at the drop-down inlet opening 306i to a second, different cross-sectional area at the drop-down outlet opening 3060. The cross-sectional area may change continuously (e.g., without any discontinuous changes in cross-sectional area with a change in location of the cross-sectional area along the central longitudinal axis 380) between the first cross-sectional area at the drop-down inlet opening 306i to the second, different cross-sectional area at the drop-down outlet opening 3060. For example, the conduit structure 302 may define the conduit 310 as having a cross-sectional area which continuously changes along the central longitudinal axis 380 between a rectangular cross-sectional area at the drop-down inlet opening 306i to a circular cross-sectional area at the drop-down outlet opening 3060. In another example, and as shown in FIGS. 2A to 2F, the conduit structure 302 may define the conduit 310 as having a cross-sectional area which continuously changes along the central longitudinal axis 380 between a rounded rectangular cross-sectional area at the drop-down inlet opening 306i to a rectangular cross-sectional area at the drop-down outlet opening 3060. The rounded rectangular cross-sectional area and shape of the drop-down inlet opening 306i may be configured to improve flow of granular material into the conduit 310 via the drop-down inlet opening 306i, and the rectangular cross-sectional area and shape of the drop-down outlet opening 3060 may improve the mutual alignment and overlap of the drop-down outlet opening 3060 and the intake hopper inlet opening 406i to which the drop-down device 300 is coupled.

As shown, the drop-down device 300 may include a top protrusion structure 316a and a bottom flange 316b at the respective top and bottom ends 304a and 304b of the conduit structure 302, where the bottom flange 316b may be configured to engage an outer surface of the intake hopper 400. As shown, the top protrusion structure 316a and the bottom flange 316b may extend horizontally from the respective top and bottom ends 304a and 304b of the conduit structure 302 and may be separate portions of a single unitary piece of material, together with the conduit structure. However, example embodiments are not limited thereto. As shown, the bottom flange 316b may include fastener holes 312 configured to accommodate respective fasteners to extend therethrough, and potentially further through at least a portion of a thickness 402t of the intake hopper structure 402, to fasten the bottom flange 316b, and thus the drop-down device 300, to the intake hopper 400. As shown, the top protrusion structure 316a may be included in a coupling structure 319 that includes a sleeve structure 308 that extends upwards from a top end 304a of the conduit structure 302 (e.g., upwards from ledge surface 304aa) and includes one or more inner sleeve surfaces 308is that at least partially define an inner sleeve conduit 314 extending between an upper sleeve opening 318 and the drop-down inlet opening 306i. As shown, the sleeve structure 308 may define the inner sleeve conduit 314 to have a horizontal diameter (e.g., an inner diameter of the sleeve structure 308, defined between opposing portions of one or more inner sleeve surfaces 308is in a horizontal direction that is orthogonal to the longitudinal axis 380) that is greater than that of the conduit 310, such that the conduit structure 302 defines an inner ledge surface 304aa at the top end 304a that extends between the drop-down inlet opening 306i and the one or more inner sleeve surfaces 308is of the sleeve structure 308 (e.g., extends around the drop-down inlet opening 306i as an annular ledge structure).

Figure 3:
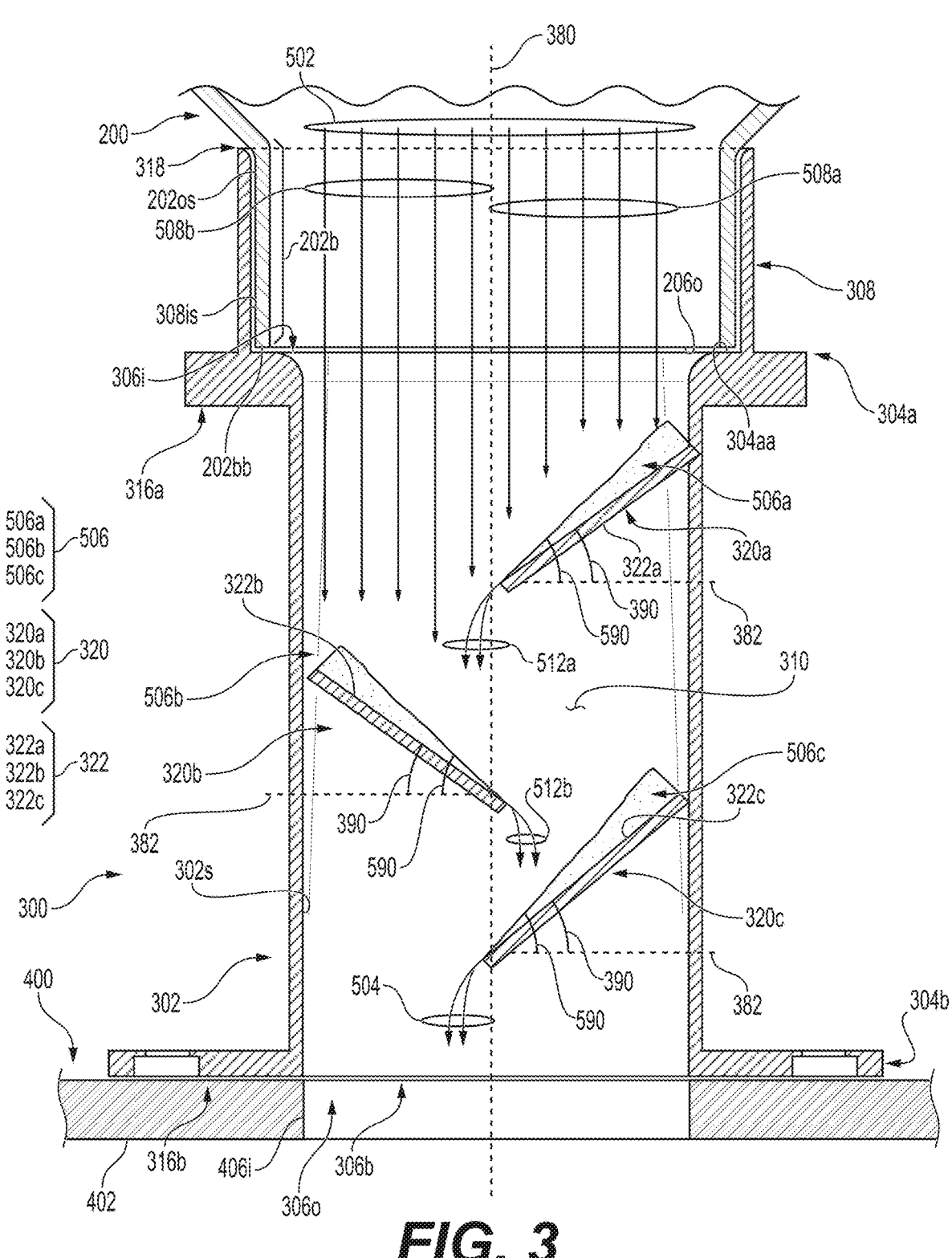
FIG. 3 is an elevation cross-sectional view of the drop-down device of FIG. 2A along cross-sectional view line IIE-IIE' of FIG. 2A, according to some example embodiments.

Referring to FIG. 3, the sleeve structure 308 may be shaped to have an inner horizontal diameter (e.g., the horizontal diameter of the conduit 314, defined by one or more inner sleeve surfaces 308is) that corresponds to (e.g., is equal to or is substantially equal to) an outer horizontal diameter of a bottom wall end 202b of the supply hopper structure 202, as defined by an outer surface 202os of the bottom wall end 202b, which may have a reduced outer horizontal diameter relative to an upper portion of the supply hopper structure 202. As a result, the sleeve structure 308 may be configured to receive and accommodate at least the bottom wall end 202b of the supply hopper structure 202 into the inner sleeve conduit 314, for example such that a bottom surface 202bb of the bottom wall end 202b contacts and rests on the inner ledge surface 304aa as shown in FIG. 3. The inner sleeve surface 308s may engage (e.g., establish sliding contact, establish a sliding fit, establish a friction fit, etc.) with the outer surface 202os of the bottom wall 202b of the supply hopper structure 202 received into the sleeve conduit 314 to establish an interface between the supply hopper 200 and the drop-down device 300 (e.g., a sleeve connection, a sliding connection, a cylindrical connection, a plug-jack connection, a sliding pair connection, a friction fit connection, or any combination thereof). Such an interface (e.g., a sleeve connection) between the sleeve structure 308 and a bottom wall end 202*b* of the supply hopper 200 structure 202 may mitigate (e.g., reduce, minimize, or prevent) outflow of granular material from the drop-down device 300 via the interface and may further mitigate (e.g., reduce, minimize or prevent) inflow of other materials (e.g., foreign objects) into the drop-down device 300 from an exterior of both the drop-down device 300 via the interface, without using other mechanical coupling devices to establish the interface between the drop-down device 300 and the supply hopper 200 (e.g., a bracket, baffles, etc.).

The interface between the sleeve structure 308 and bottom wall end 202*b* of the supply hopper structure 202 received into the inner sleeve conduit 314 as shown may be configured to reduce, minimize, or prevent outflow of granular material from the drop-down device 300 based on defining any potential pathway out of the drop-down device 300 via the interface with the supply hopper 200 as extending upwards and away from conduit 310 and between opposing surfaces 308*is* and 202*os*. Such a pathway may be a sufficiently long pathway that extends upwards and against the force of gravity to offset any pressure gradient that may exist along the pathway from the conduits 310, 314 of the drop-down device 300 to an exterior environment and thus to reduce, minimize, or prevent outflow (e.g., escape) of granular material from the drop-down device interior (e.g., conduits 310, 314) via flowing between (e.g., through an interface between) the drop-down device 300 and the supply hopper 200, thereby improving operational efficiency of the doser apparatus 10 and reducing maintenance requirements to remove granular material that might escape the dosing apparatus 10 via the aforementioned interface. In some example embodiments, the sleeve structure 308 may be configured to be a part (e.g., an extension) of the conduit structure 302 and the inner sleeve conduit 314 may be considered to be a part of the conduit 310, such that the upper sleeve opening 318 may be considered to be the drop-down inlet opening of the drop-down device 300.

As shown in FIGS. 2A to 2F, the device structure 301, including the conduit structure 302, the top protrusion structure 316*a*, the bottom flange 316*b*, and the sleeve structure 308 may be separate portions of a single, continuous and unitary piece of material (e.g., a single piece of plastic material, stainless steel material, or the like), but example embodiments are not limited thereto and the conduit structure 302, the top protrusion structure 316*a*, the bottom flange 316*b*, and the sleeve structure 308 may be separate piece of material that are coupled together. It will further be understood that one or more of the sleeve structure 308, the top protrusion structure 316*a*, or the bottom flange 316*b* may be omitted from the drop-down device 300.

Still referring to FIGS. 2A to 2F, the drop-down device 300 may include a slat 320 or a plurality of slats 320 extending into, through, and/or within at least a portion of the conduit 310. Each slat 320 may have has a first end 384*a* at a location proximate to at least one inner surface 302*s* of the conduit structure 302 (e.g., proximate to a first side end of the conduit 310 as shown in FIG. 2F) and may extend away from the at least one inner surface 302*s*, in a horizontal direction extending orthogonal to the central longitudinal axis 380, into the conduit 310 (e.g., towards an opposite side end of the conduit 310 as shown in FIG. 2F) and further downwards towards the drop-down outlet opening 3060, such that the slat 320 has a downwards-inclined upper slat surface 322 that faces upwards towards the drop-down inlet opening 306*i* and is angled downwards from the first end 384*a* towards the second end 384*b* towards an opposite side of the conduit 310 (in the horizontal direction).

For example, as shown in at least FIG. 2F, the drop-down device 300 may include a slat 320 having a first end 384*a* that is proximate to at least one inner surface 302*s* of the conduit structure 302 that defines at least a first side end of the conduit 310 and an opposite, second end 384*b* that is distal to the at least one inner surface 302*s* in relation to the first end 384*a*. The slat 320 may include an upper slat surface 322 extending from the first end 384*a* of the slat to the second end 384*b* of the slat. In addition, as shown, the second end 384*b* of a given slat 320 may be proximate to the drop-down outlet opening 3060 in relation to the first end 384*a* of the given slat 320, such that the upper slat surface 322 of the given slat 320 faces towards the drop-down inlet opening 306*i* and the upper slat surface 322 is angled toward the drop-down outlet opening 3060 from the first end 384*a* at an inclination angle 390. As shown, the inclination angle 390 of a given upper slat surface 322 may be an angle upwards from a horizontal plane 382 that is orthogonal to the central longitudinal axis 380 of the conduit structure 302 (which may also be the longitudinal axis of the conduit 310) to the given upper slat surface 322 of a given slat. As shown, the inclination angle 390 of a given upper slat surface 322 may be upwards, towards the drop-down inlet opening 306*i* from a horizontal plane 382 such that the given upper slat surface 322 of the given slat 320 extends upwards and outwards from the longitudinal axis in at least one direction (e.g., towards at least one particular side of the conduit 310).

As shown in FIGS. 2A to 2F, the upper slat surface 322 of a given slat 320 of the drop-down device 300 may be a planar surface that extends along a plane that is angled (e.g., from a horizontal plane 382) at an inclination angle that may be angled in a single direction. In the example embodiments shown in FIGS. 2A to 2F, the slats 320 are shown to be planar structures, having opposite upper and lower slat surfaces extending in parallel, but example embodiments are not limited thereto.

Still referring to FIGS. 2A to 2F, in some example embodiments a drop-down device 300 may include a plurality of slats 320, each slat having a respective first end 384*a*, second end 384*b*, upper slat surface 322 angled at an inclination angle 390, or the like as described herein according to any example embodiments. For example, as shown in FIGS. 2A to 2F, a drop-down device 300 may include a plurality of slats 320 including a first slat 320*a*, a second slat 320*b*, and a third slat 320*c* that are located at different positions in the conduit 310.

In some example embodiments, a plurality of slats 320 may include at least two slats 320 that are offset from each other in a vertical direction (e.g., the vertical direction in the elevation image of FIG. 2F) extending paraxial (e.g., parallel) to the central longitudinal axis 380 of the conduit 310. The at least two slats 320 may at least partially overlap, entirely overlap, or may not overlap at all (e.g., may be exposed from each other) in the vertical direction. For example, at least two slats 320 of the drop-down device 300 may extend horizontally (e.g., in one or more directions orthogonal to the longitudinal axis) from different side ends (e.g., opposite side ends) of the conduit 310.

For example, referring to FIGS. 2A to 2F, the drop-down device 300 may include a plurality of three slats 320, including a first slat 320*a*, a second slat 320*b*, and a third slat 320*c*. As shown, the first to third slats 320*a* to 320*b* may be vertically offset from each other in the vertical direction extending paraxial (e.g., parallel) to the central longitudinal axis 380. In addition, the first to third slats 320*a* to 320*c* may alternate between extending towards a center (e.g., the central longitudinal axis 380) of the conduit 310 from opposite side ends of the conduit 310, such that vertically adjacent slats 320, for example the first and second slats 320*a* and 320*b* and the second and third slats 320*b* and 320*c*, may extend into the conduit 310 from opposite side ends (e.g., opposite horizontal side ends) of the conduit 310. In addition, as shown, each of the slats 320*a*, 320*b*, and 320*c* may have respective upper slat surfaces 322*a*, 322*b*, and 322*c* that may each be angled from a respective horizontal plane 382 towards a proximate side end of the conduit 310 in a common horizontal axis in a same inclination angle 390.

Referring to FIG. 3, in some example embodiments, the inclination angle 390 may correspond to a particular angle of repose 590 of a particular granular material, for example the inclination angle 390 may correspond to the angle of repose 590 for a particular granular material, where the particular granular material may be the granular material 204 held in the supply hopper 200 and supplied as flow 504 to the intake hopper 400 via the conduit 310 of the drop-down device 300, to be held in the enclosure 402*e* as granular material 404 and to be drawn from the enclosure 402*e* by the doser mechanism 100 to be discharged as index amounts of granular material 194. Accordingly, in some example embodiments, a slat 320 of the drop-down device may be referred to as an "angle of repose slat".

In some example embodiments, an inclination angle 390 that "corresponds to" an angle of repose 590 of a granular material may be equal to or substantially equal to the angle of repose 590, and/or a difference between the inclination angle 390 and the angle of repose 590 may be equal to or less than a margin amount. In some example embodiments, an inclination angle 390 that "corresponds to" an angle of repose 590 of a particular granular material may be an angle, of a upper slat surface 322 from a horizontal plane 382, that is greater or smaller than the angle of repose 590 by a margin, for example a margin that is a relative difference of the inclination angle 390 from the angle of repose 590 that is equal or less than about 1%, about 2%, about 5%, about 10%, or the like. In some example embodiments, an inclination angle 390 that "corresponds to" an angle of repose 590 of a particular granular material may be an angle, of a upper slat surface 322 from a horizontal plane 382, that is greater or smaller than the angle of repose 590 by a particular angular magnitude, for example a magnitude that is equal or less than about 1 degree, about 2 degrees, about 3 degrees, about 4 degrees, about 5 degrees, or the like.

Based on the inclination angle 390 corresponding to (e.g., being within a margin as described above) the angle of repose 590 of a particular granular material, each slat 320 for the drop-down device 300 may be configured to enable an accumulation of a portion of the particular granular material 502 supplied into the conduit 310 via the drop-down inlet opening 306*i* on the respective upper slat surface 322 of the slat 320 as retention granular material 506 despite slight mechanical disturbances (e.g., vibrations) of the slat 320 while enabling the accumulated (e.g., retained) granular material on the upper slat surface 322 (e.g., retention granular material 506) to be easily removed (e.g., knocked) from the upper slat surface 322 and down the conduit 310 through the drop-down outlet opening 3060 based on a larger mechanical disturbance of the drop-down device 300 (e.g., a mechanical impact against an outer surface of the conduit structure 302), thereby enabling ease of cleaning and maintenance of the drop-down device 300, particularly when replacing the drop-down device 300 coupled between a supply hopper 200 and an intake hopper 400.

As a result of the inclination angle 390 being "substantially" an angle of repose 590 of a particular granular material, the upper slat surface 322 of each slat 320 of the drop-down device 300 may be configured to cause at least some particles (e.g., granules) of the particular granular material 502 supplied through the drop-down inlet opening 306*i* from the supply hopper 200 to accumulate on the upper slat surface 322 instead of simply sliding down the upper slat surface 322 to the second end 384*b* and off of the upper slat surface 322 and further down the conduit 310 towards the drop-down outlet opening 3060. Accordingly, the drop-down device 300 may be configured to cause a particular granular material to be supplied into the conduit 310 via the drop-down inlet opening 306*i* and to accumulate on a respective upper slat surface 322 of each slat 320 of the drop-down device 300, thereby restricting a flow 504 of the granular material through the conduit 310 and through the drop-down outlet opening 3060, based on the upper slat surface 322 of each slat 320 of the drop-down device 300 being angled at an inclination angle 390 that corresponds to the angle of repose of the particular granular material.

For example, in example embodiments where the drop-down device 300, and thus the dosing apparatus 10, is configured to supply microcrystalline cellulose (MCC) granular material, where the MCC granular material has an angle of repose 590 of about 35 degrees, the inclination angle 390 of each of the upper slat surfaces 322*a* to 322*c* of the slats 320*a* to 320*c* may be about 35 degrees (e.g., equal to 35 degrees, within a margin around 35 degrees, such as a 1% margin, a 2% margin, a 5% margin, a 10% margin, or the like). As a result, a drop-down device 300 having one or more slats 320 having an upper slat surface 322 with an inclination angle 390 that corresponds to an angle of repose of 35 degrees may be configured to restrict a flow 504 of MCC granular material from the supply hopper 200 to the intake hopper 400 via the conduit 310 of the drop-down device 300, thereby enabling reduced pressure of the MCC granular material 404 on the one or more augers 122 of the doser mechanism 100 and enabling improved performance of a dosing apparatus 10 including the drop-down device 300.

In some example embodiments, the device structure 301 (e.g., the conduit structure 302, the top protrusion structure 316*a*, the bottom flange 316*b*, the sleeve structure 308), any slats 320 of the drop-down device 300, or any portion thereof may comprise one or more materials, including one or more metal materials (e.g., stainless steel, aluminum, etc.), one or more plastic materials (e.g., Nalgene®, polyether ether ketone (PEEK) plastic, liquid crystal polymer (LCP), Acetal, etc.), or the like. As shown in FIGS. 2A to 2F, one or more slats 320 may have a first end 384*a* that is contact with an inner surface 302*s* of the conduit structure 302 (e.g., the first end 384*a* of the first slat 320*a* is engaged in a groove 332 described further below), but example embodiments are not limited thereto. For example, the first end 384*a* of a slat 320 may be spaced apart from a proximate inner surface 302*s* of the conduit structure 302. As shown in FIGS. 2A to 2F, the first end 384*a* of the second and third slats 320*b* and 320*c* may be spaced apart from the proximate inner surface 302*s* (e.g., in the horizontal left-right direction of the cross-sectional view of FIG. 2F).

Still referring to FIGS. 2A to 2F, in some example embodiments, a slat 320 may be mechanically coupled to an actuator 360 (e.g., a servo actuator) via a mechanical connection 362 (e.g., a pivot pin 392 extending through an opening through a thickness of the conduit structure 302 between the slat 320 and the actuator 360. As shown in FIG. 2E, the pivot pin may extend along the first end 384*a* of a slat 320 but example embodiments are not limited thereto. The slat 320 may thereby be pivotably coupled to the conduit structure 302 and may be configured to be adjustably pivoted (e.g., around pivot pin 392) based on operation of the actuator 360. The actuator 360 may be configured to adjustably position (e.g., to pivot around the pivot pin 392) the slat 320 to adjust the inclination angle 390 of the upper slat surface 322 of the slat 320. In some example embodiments, a plurality of slats 320 of the drop-down device 300 may be mechanically coupled to a single, common actuator 360 or to separate, respective actuators 360. One or more actuators 360 may be communicatively coupled to a control device (e.g., control device 790 shown in FIG. 5) and may be configured to, based on being controlled by the control device, adjustably control (e.g., pivot) the inclination angle 390 of some or all slats 320 of the drop-down device 300 between different inclination angles, thereby adjustably configuring the drop-down device 300 to differently restrict the flow rate of the flow 504 to a granular material through the conduit 310, to adjustably configure the drop-down device to control (e.g., constrict, restrict, etc.) the flow 504 of different granular materials through the conduit 310 between the supply hopper 200 and the intake hopper 400, or the like.

FIG. 3 is an elevation cross-sectional view of the drop-down device 300 of FIG. 2A along cross-sectional view line IIE-IIE' of FIG. 2A, according to some example embodiments.

Referring to FIG. 3, a drop-down device 300 is coupled between a supply hopper 200 and an intake hopper 400, for example such that a sleeve structure 308 of the drop-down device 300 receives a bottom portion of the supply hopper structure 202 (e.g., the bottom wall end 202*b*) that includes the supply hopper outlet opening 2060 such that the bottom portion of the supply hopper structure 202 (e.g., the bottom edge surface 202*bb*) contacts and resets and/or is supported on the inner ledge surface 304*aa* and an outer surface 202*os* of the supply hopper structure 202 received into the conduit 314 engages (e.g., establishes a friction fit) with the inner surface 308*is* of the sleeve structure 308, and a bottom flange 316*b* is fixed to the intake hopper 400 to align and overlap, in the central longitudinal axis 380 direction, the drop-down outlet opening 3060 with the intake hopper inlet opening 406*i*. The drop-down device 300 may be configured to establish fluid communication between the supply hopper enclosure 202*e* and the intake hopper enclosure 402*e* via the conduit 310 and the openings 306*i* and 3060 of the drop-down device 300. As a result, the drop-down device 300 may be configured to enable an amount of granular material 204 held in the supply hopper enclosure 202*e* to be supplied as a flow 504 into the intake hopper enclosure 402*e*, from which a doser mechanism 100 may draw at least some of the granular material 404 to convey the granular material 192 to be supplied as one or more index amounts of granular material 194.

Still referring to FIG. 3, the drop-down device 300 may include slats 320 having upper slat surfaces 322 that are angled at an inclination angle 390 that corresponds to the angle of repose 590 of the particular granular material 204 held in the supply hopper enclosure 202*e*. For example, in FIG. 2F, where the granular material is MCC having an angle of repose 590 that is 35 degrees, the inclination angle 390 of each of the upper slat surfaces 322 of the slats 320 may be 35 degrees, 34 degrees, 32 degrees, 30 degrees, or the like. As a result, when a flow of the granular material 502 into the conduit 310 via the drop-down inlet opening 306*i* is induced (e.g., based on operation of a vibration device 290 mechanically coupled to the supply hopper 200), one or more portions 508*a*, 508*b* of the initial flow of granular material 502 our of the supply hopper 200 may accumulate on one or more upper slat surfaces 322*a*, 322*b* that are exposed to the drop-down inlet opening 306*i*. As a result, respective amounts of retention granular material 506*a* and 506*b* (referred to as accumulations) of the granular material may accumulate on respective upper slat surfaces 322*a* and 322*b* of the first and second slats 320*a* and 320*b*, based on the upper slat surfaces 322*a* and 322*b* being angled at an inclination angle 390 that corresponds to an angle of repose 590 of the granular material. Additionally, while accumulations, also referred to herein as amounts of retention granular material 506*a* and 506*b* of the granular material may be present on the upper slat surfaces 322*a* and 322*b*, at least a portion of the first accumulation, or first amount of retention granular material 506*a* may fall from the upper slat surface 322*a* as flow 512*a*, which may fall onto the second accumulation, or second amount of retention granular material 506*b* and/or may fall further down the conduit 310 toward the drop-down outlet opening 3060. In addition, at least a portion of the second accumulation, or second amount of retention granular material 506*b* may fall from the upper slat surface 322*b* as flow 512*b*, which may fall further down the conduit 310 toward the drop-down outlet opening 3060. As further shown, granular material that is not retained in the first and second accumulations, or first and second amounts of retention granular material 506*a* and 506*b* may fall further down the conduit 310 (e.g., as part of one or more flows 512*a*, 512*b*, 508*a*, 508*b*, or the like) and may at least partially accumulate as a third accumulation 506*c* on an upper slat surface 322*c* of the third slat 320*c*, based on the upper slat surface 322*c* being angled at an inclination angle 390 that corresponds to an angle of repose of the granular material. In addition, at least some granular material, which may be a limited portion of the granular material that falls from one or more of the accumulations, or amounts of retention granular material 506*a* to 506*c* and/or falls through the conduit 510 without accumulating on any upper slat surfaces 322 may fall through the conduit 310 to the bottom of the conduit 310 and through the drop-down outlet opening 3060 to further fall (e.g., flow) into the intake hopper 400 as flow 504 of granular material.

Referring to FIG. 3 and further referring back to FIGS. 1A and 1B, the accumulations, or amounts of retention granular material 506*a* to 506*c* of the granular material 502 flowing into the conduit 510 from the supply hopper 200 may collectively define retention granular material 506 that is retained in the drop-down device 300 during the flow 504 of granular material into the intake hopper 400, which may cause the flow rate of the flow 504 granular material our of the conduit 310 of the drop-down device 300 (e.g., the flow rate of the flow 504 of granular material out of the conduit 510 through the drop-down outlet opening 3060) to be restricted in relation to a flow rate of a flow of the granular material through a conduit 310 in which the slat(s) 320 are absent.

For example, in some example embodiments, where a drop-down device 300 includes a conduit structure 302 defining a drop-down inlet opening 306*i* having a rounded rectangular cross section with horizontal dimensions of 2.38 inches×2.38 inches, a drop-down outlet opening 3060 having a circular cross section with radius of 2 inches extending horizontally from the central longitudinal axis 380, and a conduit 310 having a height (between the drop-down inlet opening 306*i* and the drop-down outlet opening 3060) of about 4.3 inches with a horizontal cross section that changes continuously along the central longitudinal axis 380 between the rounded rectangular ross section at the drop-down inlet opening 306*i* and the circular cross-section at the drop-down outlet opening 3060, and when the drop-down device 300 does not include any slats 320 extending into the conduit 310, a total amount of granular material that is MCC and which flows from the supply hopper 200 to the intake hopper 400 via the conduit 310 over a particular period of time may be about 57.19 grams. In another example, where the drop-down device 300 further includes slats 320*a* to 320*c* extending into the conduit in the arrangement shown in FIGS. 2E and 2F, where the slats 320*a* to 320*c* each have a length from the first end 384*a* to the second end 384 thereof of about 1.125 inches, and where the dimensions of the conduit structure 302 are the same as in the previous example, a total amount of granular material that is MCC and which flows from the supply hopper 200 to the intake hopper 400 via the conduit 310 over the same particular period of time as in the previous example, where the initial amount of granular material 204 in the supply hopper 200 is also the same as in the previous example, may be about 39.36 grams, thereby indicating that an amount of retention granular material 506 that is retained on the upper surfaces 322 of the slats 320 in the drop-down device 300 is approximately 17.83 grams, such that the flow 504 of MCC granular material through the conduit 310 and out of the drop-down device 300 via the drop-down outlet opening 3060 is restricted in relation to an example where the slats 320 are absent from the drop-down device 300.

As a result, referring to FIGS. 1A and 1B, because the flow rate of the flow 504 of granular material into the intake hopper 400 may be restricted by the drop-down device 300, the accumulation of granular material 404 in the intake hopper enclosure 402*e* may be restricted, reduced, or minimized, and where a doser mechanism 100 operates to draw (e.g., convey) granular material 404 out of the intake hopper 400, the flow rate of flow 504 may be caused to be the same as, slightly greater than, less than, or the like in relation to the average mass conveyance rate of granular material 192 out of the intake hopper 400 via the doser mechanism 100. As a result, the amount of granular material 404 in the intake hopper enclosure 402*e* may be kept at a certain (e.g., optimized) amount, thereby keeping the depth D1 of granular material above the one or more augers 122 of the doser mechanism 100 at a certain magnitude and/or within a certain range, to mitigate, reduce, minimize, or prevent excess head pressure of the granular material 404 at the depth D1 of the one or more augers 122 in the granular material 404 in the intake hopper enclosure 402*e*, and thereby reducing, minimizing, or optimizing the likelihood of ratholing-induced malfunctions or non-uniform time-rate of conveyance of granular material 192 from the intake hopper 400 via the doser mechanism 100, and thereby improving the functionality of dosing apparatus 10.

Still referring to FIGS. 2A to 3, while some example embodiments of a drop-down device 300 may include a plurality of slats 320, example embodiments are not limited thereto. For example, a drop-down device 300 may include a single slat 320 extending into, through, and/or within the conduit 310, for example such that the drop-down device 300 may not include a plurality of slats 320. The single slat 320 may extend at least partially or entirely around the outer side perimeter (e.g., circumference) of the conduit 310, for example to define an arcuate or ring-shaped upper slat surface 322 extending around the central longitudinal axis 380.

Figure 4A:
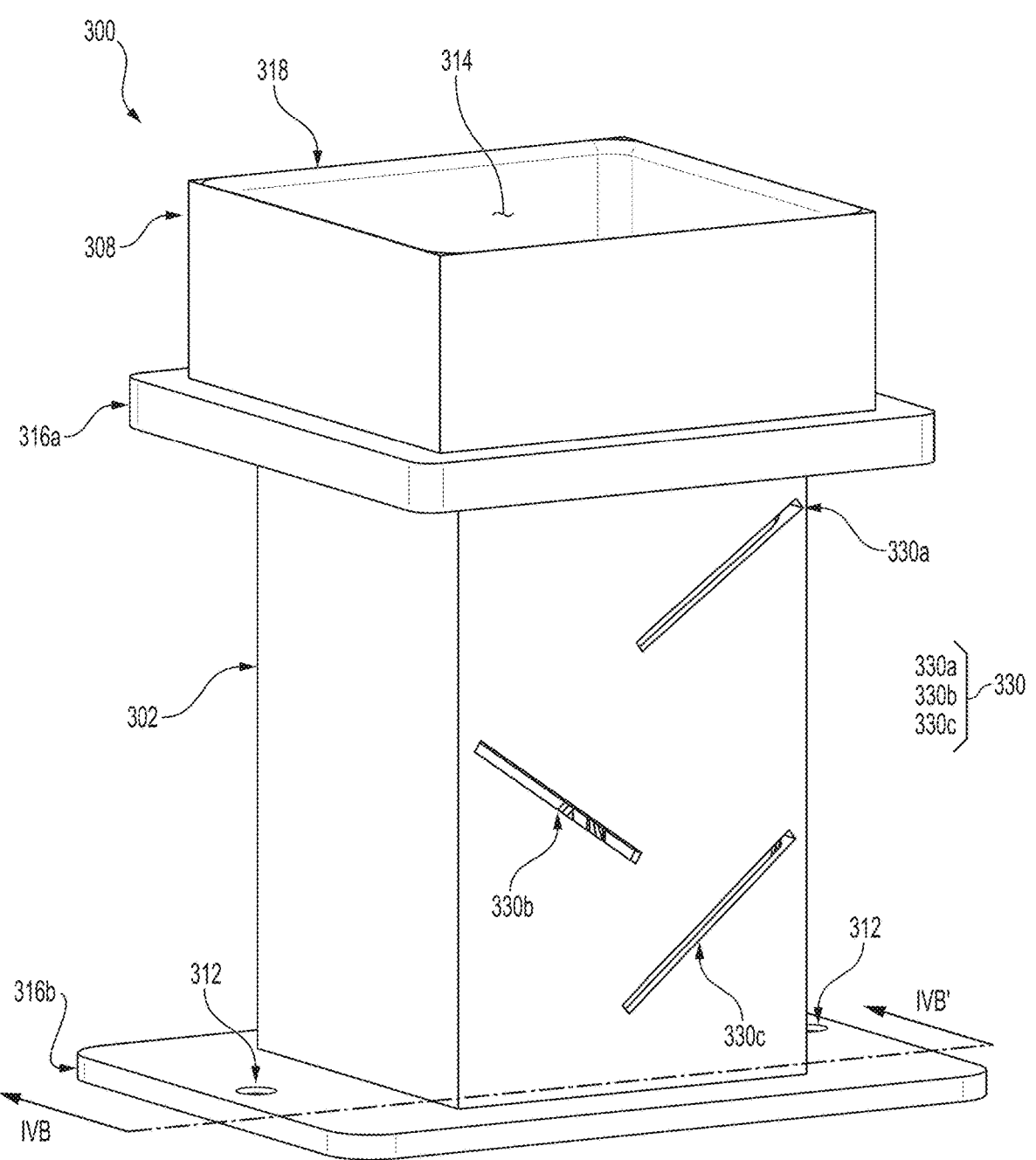
FIG. 4A is a perspective top view of a drop-down device, according to some example embodiments.
Figure 4B:
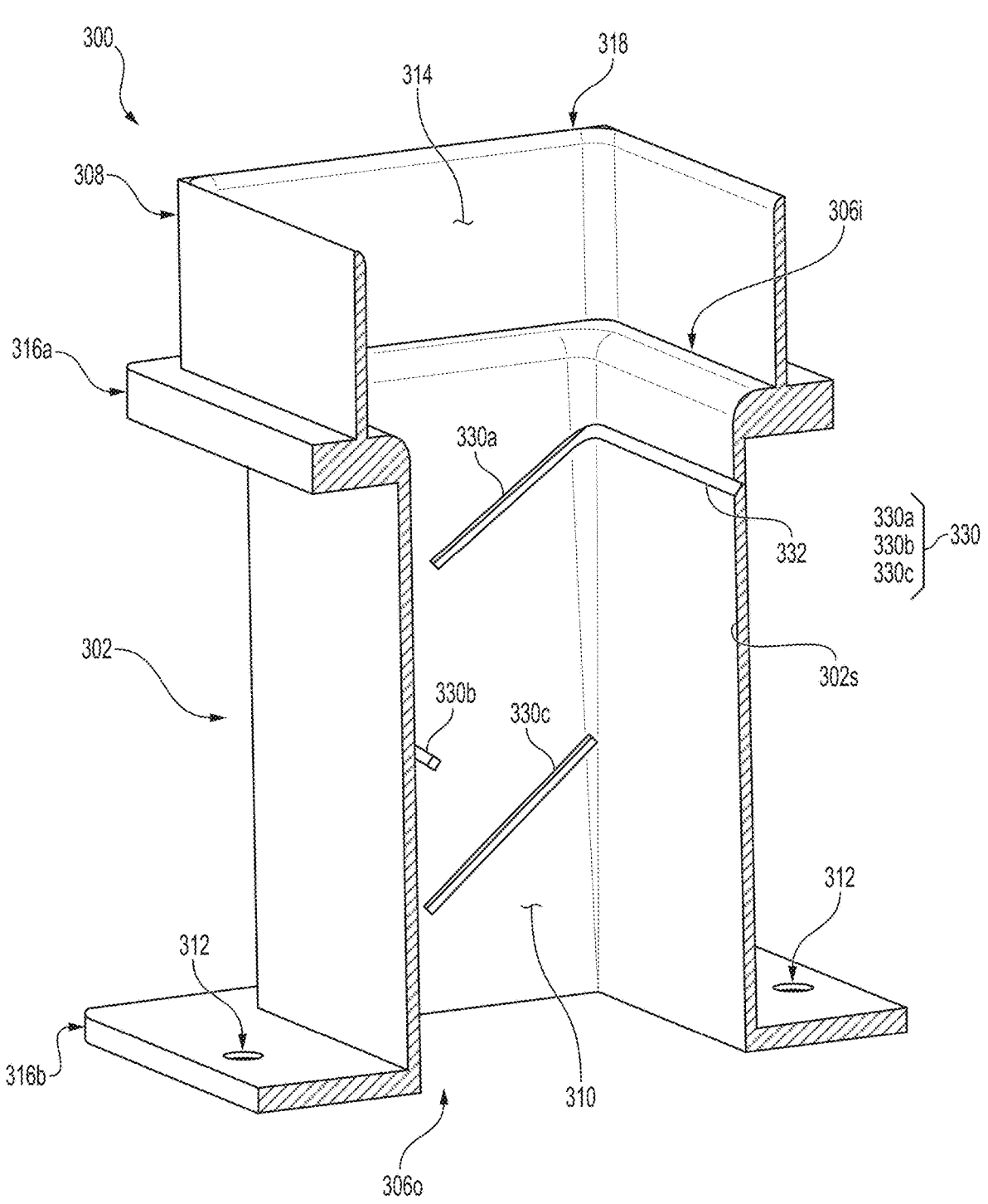
FIG. 4B is a perspective cross-sectional view of the drop-down device of FIG. 4A along cross-sectional view line IVB-IVB' of FIG. 4A, according to some example embodiments.
Figure 4C:
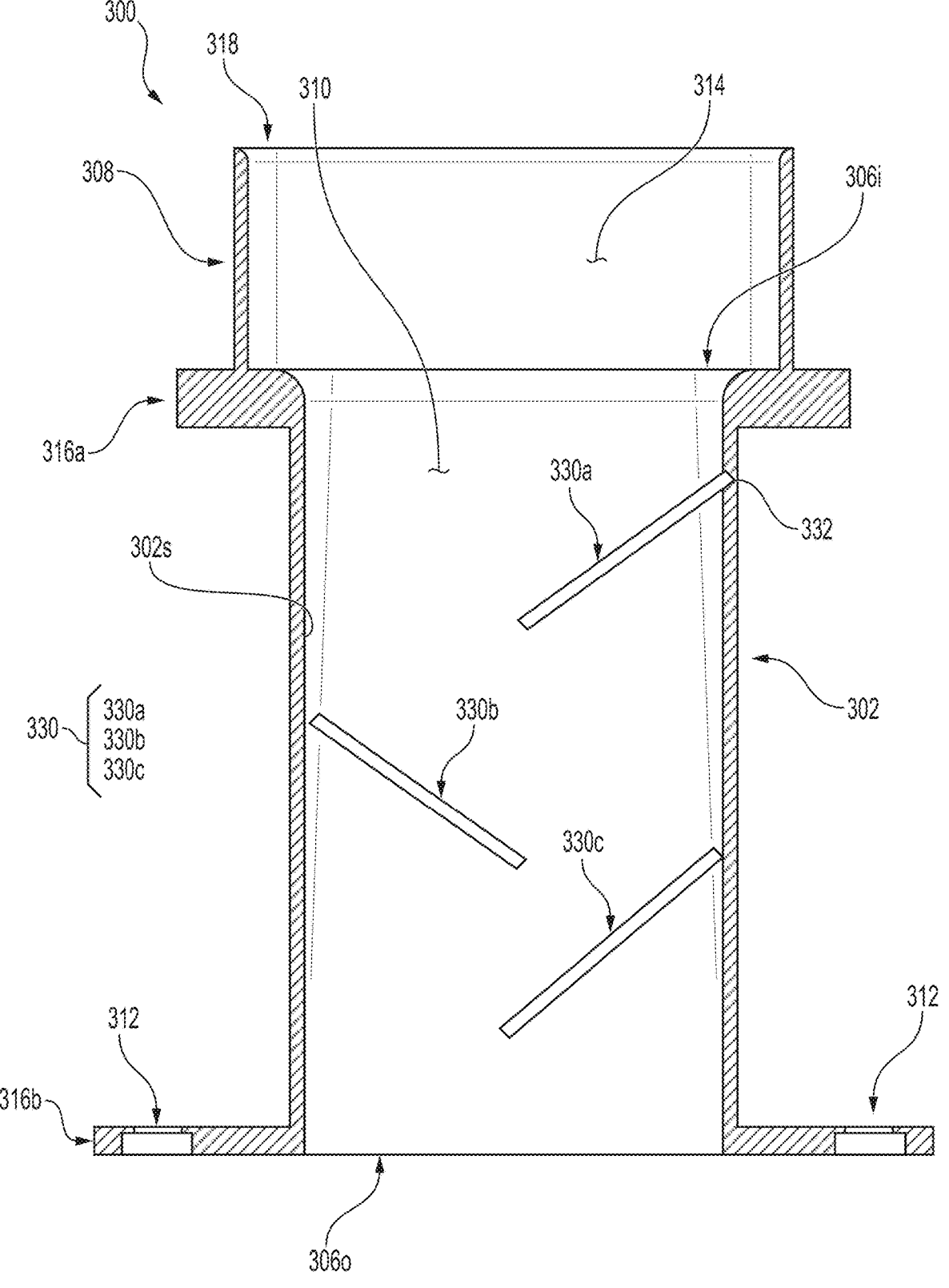
FIG. 4C is an elevation cross-sectional view of the drop-down device of FIG. 4A along cross-sectional view line IVB-IVB' of FIG. 4A, according to some example embodiments.

FIG. 4A is a perspective top view of a drop-down device 300, according to some example embodiments. FIG. 4B is a perspective cross-sectional view of the drop-down device 300 of FIG. 4A along cross-sectional view line IVB-IVB' of FIG. 4A, according to some example embodiments. FIG. 4C is an elevation cross-sectional view of the drop-down device 300 of FIG. 4A along cross-sectional view line IVB-IVB' of FIG. 4A, according to some example embodiments. The drop-down device 300 shown in FIGS. 4A-4C may be the drop-down device 300 shown in FIGS. 1A and 1B, although example embodiments are not limited thereto.

Referring to FIGS. 4A to 4C and further referring to FIGS. 2A to 2F, in some example embodiments the drop-down device 300 may include at least one slot opening 330 extending through a thickness of the conduit structure 302, where a slat 320 may extend through the at least one slot opening 330 into the conduit 310 through the thickness of the conduit structure 302.

For example, as shown in FIGS. 4A to 4C, the conduit structure 302 may define separate, respective sets (e.g., pairs) of first slot openings 330*a*, second slot openings 330*b*, and third slot openings 330*c* extending through respective thicknesses of opposite sidewalls of the conduit structure 302 defining opposite side ends of the conduit 310, and the slats 320*a*, 320*b*, and 320*c* may extend through separate, respective sets of slot openings 330*a*, 330*b*, and 330*c* to extend into the conduit 310 between opposite side walls of the conduit structure 302. Each slat 320 may be affixed to the conduit structure 302 at opposite ends at or through opposite slot openings 330, for example via an adhesive, welding, or the like. The slot openings 330 may thus enable ease of manufacture of the drop-down device 300 and ease of replacement of one or more slats 320 in the drop-down device 300, thereby improving ease of manufacture and/or maintenance of the drop-down device.

Still referring to FIGS. 4A to 4C and further to FIGS. 2A to 2F, in some example embodiments the conduit structure 302 may include a groove 332 defined in one or more inner surfaces 302*s* of the conduit structure 302. As shown, a groove 332 may be aligned with one or more slot openings 330 (e.g., the first slot openings 330*a* as shown) so that a slat 320 (e.g., first slat 320*a*) that is inserted through a slot opening 330*a* may at least partially be extended through the groove 332 to an opposite slot opening (e.g., an opposite slot opening 330*a*), so that the first end 384*a* of the slat 320 engages with the conduit structure 302 (e.g., the inner surface 302*s* thereof as shown in at least FIGS. 2E and 2F), thereby inhibiting granular material flow between the first end 384*a* of the slat 320 and the conduit structure inner surface 302*s*.

Still referring to FIGS. 4A to 4C and FIGS. 2A to 2F, in some example embodiments a slat 320 (e.g., slat 320*b*) may have a first end 384*a* that is spaced apart (e.g., isolated from direct contact) from a proximate inner surface 302*s* by a gap space 386 in the direction in which the slat 320 extends from the first end 384*a* to the second end 384*b*, such that at least some granular material may flow through the gap space 386 between the first end 384*a* and the proximate surface 302*s*. However, example embodiments are not limited thereto, and in some example embodiments, the first end 384*a* of a slat 320 and a proximate surface 302*s* of the conduit structure 302 may cooperate (e.g., may be in contact with each other)

to mitigate or prevent flow of granular material therebetween, for example such that the gap space 386 may be absent entirely. For example, as shown in FIGS. 2A-2F, slat 320*a* has a first end 384*a* that is engaged within a groove 332 of the conduit structure 302, and thus there is no gap space 386 between the first end 384*a* of slat 320*a* and the proximate inner surface 302*s* of the conduit structure 302. In some example embodiments each slat 320 of the drop-down device 300 (e.g., each of slats 320*a*-320*c*) may have a first end 384*a* that is engaged within a groove 332 in the proximate inner surface 302*s* of the of the conduit structure 302, is welded or otherwise physically coupled to the proximate inner surface 302*s*, or the like, such that a gap space 386 between the first end 384*a* of each slat 320 of the drop-down device 300 and the inner surface 302*s* that is proximate to the first end 384*a* of the slat 320 may be completely omitted. As a result, in example embodiments where the gap space 386 between a slat 320 and the proximate inner surface 302*s* is omitted, a flow of granular material through the gap space 386 may be prevented.

FIG. 5 is a schematic view of a packaging machine 700 that includes at least one dosing apparatus 10, according to some example embodiments. FIGS. 6A, 6B, 6C, 6D, and 6E are expanded perspective views of respective regions A, B, C, D, and E of the packaging machine of FIG. 5, according to some example embodiments.

Referring to FIGS. 5 and 6A to 6E, the dosing apparatus 10 according to any of the example embodiments may be included in a packaging machine 700 configured to supply granular material into one or more articles of packaging material (e.g., one or more folded strips of packaging material defining separate, respective open enclosures) may include "n" parallel process streams (e.g., process streams 1 to n) and thus may include "n" doser mechanisms 100-1 to 100-*n* that are configured to supply respective index amounts of granular material 194 into separate, respective "n" articles of packaging in separate, respective "n" parallel process streams, thereby enabling the packaging machine 700 to form packages of granular material in "n" parallel processes. While n is shown to be equal to 5 in FIGS. 6A-6E and also FIG. 7, it will be understood that "n" may be any positive integer equal to or greater than 1 (e.g., n may be equal to 1, 2, 3, 4, 5, 6, 7, 8, 9, 10, or any integer greater than 10 in a given packaging machine 700).

Each of the doser mechanisms 100-1 to 100-*n* may be a doser mechanism 100 of one or more dosing apparatuses 10 according to any of the example embodiments, including any of the example embodiments of the doser mechanism 100 of any of the example embodiments of a dosing apparatus. As further shown in FIG. 5, the dosing apparatus 10 of the packaging machine 700 may include intake hoppers 400-1 to 400-*n*, respectively coupled to the separate, respective doser mechanisms 100-1 to 100-*n*, drop-down devices 300-1 to 300-*n* coupled to separate, respective intake hoppers 400-1 to 400-*n*, and one or more supply hoppers 200 coupled to the respective drop-down inlet openings 306*i* of the drop-down devices 300-1 to 300-*n*. Each of the intake hoppers 400-1 to 400-*n* may be an intake hopper 400 of one or more dosing apparatuses 10 according to any of the example embodiments, including any of the example embodiments of the intake hopper 400 of any of the example embodiments of a dosing apparatus. Each of the drop-down devices 300-1 to 300-*n* may be a drop-down device 300 of one or more dosing apparatuses 10 according to any of the example embodiments, including any of the example embodiments of the drop-down device 300 of any of the example embodiments of a dosing apparatus.

Figure 6A:
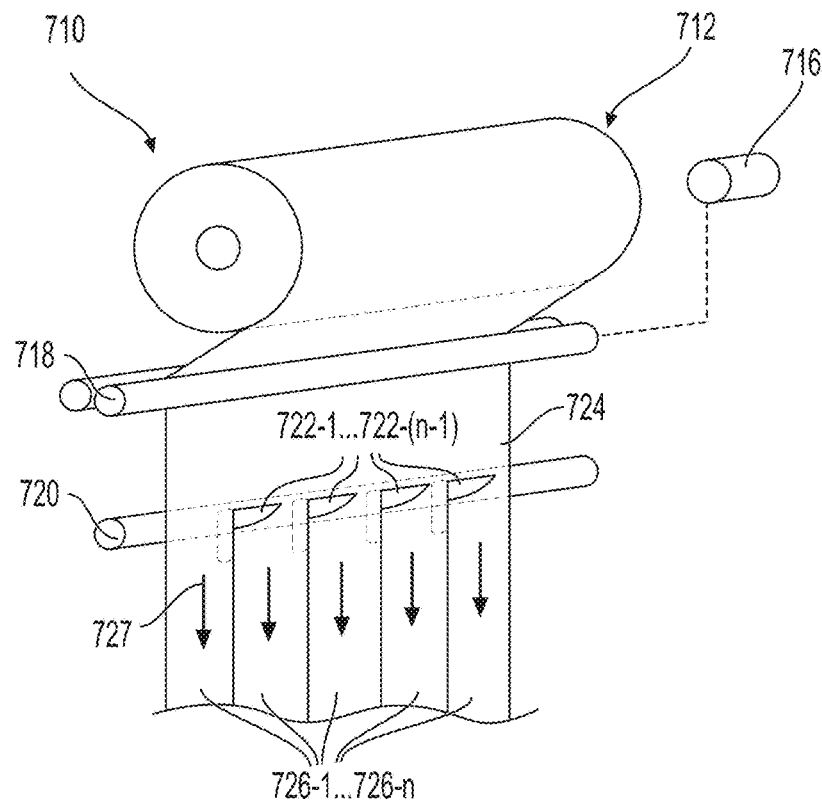
FIGS. 6A, 6B, 6C, 6D, and 6E are expanded perspective views of respective regions A, B, C, D, and E of the packaging machine of FIG. 5, according to some example embodiments.
Figure 6B:
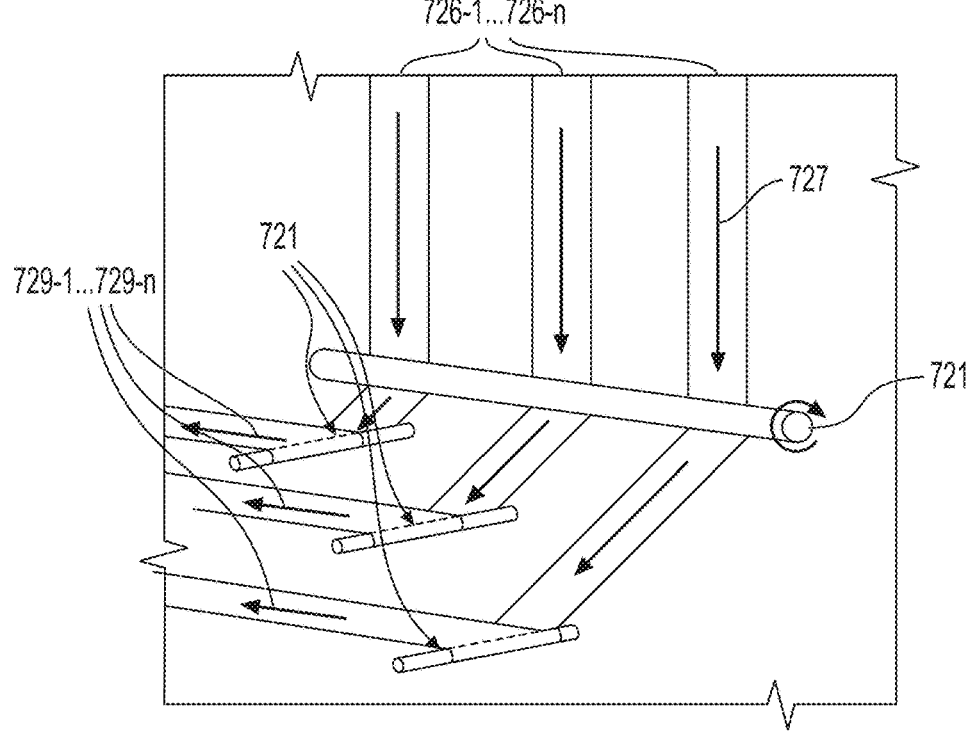

Referring now to FIG. 5 and FIGS. 6A-6B, the packaging machine 700 may include a packaging supply device 710 configured to supply an article of packaging (e.g., one or more strips of packaging material) that may define an open enclosure in which granular material is supplied by the doser mechanism 100 as granular material 194. As shown, the packaging supply device 710 may include a roll 712 of a sheet of packaging material 724, where packaging supply device 710 may include a drive motor 716 (e.g., a servo-motor) which may be configured to cause the roll 712 to rotate around its central axis (e.g., based on driving rotation of one or more rollers 718 of packaging supply device 710) and cause the sheet of packaging material 724 to be fed from the roll 712. In some example embodiments, the sheet of packaging material 724 may include a sheet of any suitable packaging material, including a sheet of paper material (e.g., cellulose), a sheet of plastic material (e.g., low density polyethylene (LDPE/LLDPE), high density polyethylene HDPE, polypropylene), a sheet of metal foil, or the like. In some example embodiments, the packaging material may be referred to as a "wrapper" material.

As shown, the one or more rollers 718, or one or more other rollers of the packaging machine 700, may be configured to redirect the sheet of packaging material 724 that is fed from the roll 712 to move to, and in contact with, a cutting assembly 720 so that the sheet of packaging material 724 is cut in a local feed direction 727 (e.g., cut lengthwise) into separate strips 726-1 to 726-*n* of packaging material (n=5 in FIG. 6A). As shown, the cutting assembly 720 includes "n–1" blades 722-1 to 722-(*n*–1) which may be metal blades (e.g., steel blades) and which may be spaced apart from each other in a direction perpendicular to the local feed direction 727 of the sheet of packaging material 724 and aligned with the respective cutting edges thereof facing opposite to the local feed direction 727. As a result, the blades 722-1 to 722-(*n*–1) may cut the sheet of packaging material 724 lengthwise into "n" strips 726-1 to 726-*n* as the sheet of packaging material 724 is fed from the roll 712 and thus fed from the packaging supply device 710 to other portions of the packaging machine 700. As shown in at least FIG. 6B, each separate strip 726-1 to 726-*n* of packaging material may be manipulated by the packaging machine 700 (e.g., by separate rollers 723) to be redirected in separate, respective local feed directions 729-1 to 729-*n* into separate, respective process streams 1 to n to form separate enclosures into which separate streams and/or amounts of granular material 194 may be supplied by separate doser mechanisms 100-1 to 100-*n*.

It will be understood that, when "n" equals 1, the cutting assembly 720 (and thus the blades 722-1 to 722-(*n*–1) may be absent from the packaging machine 700.

Referring now to FIG. 5 and FIG. 6B, the packaging machine 700 may include rollers 721 (e.g., multiple rollers 721 as shown in FIG. 6B) that are configured to redirect the respective feed directions of the strips 726-1 to 726-*n* of packaging material into separate, respective local feed directions 729-1 to 729-*n* to be fed into separate, respective "n" process streams to be aligned with separate, respective doser mechanisms 100-1 to 100-*n* of the dosing apparatus 10 of the packaging machine 700. As shown, the packaging machine 700 may include multiple rollers 721 arranged to redirect (e.g., change the local feed direction by 90 degrees in various directions) separate strips 726-1 to 726-*n* to align (e.g., overlap in the vertical direction) with separate, respective doser mechanisms 100-1 to 100-*n* of the respective process streams 1 to n in the packaging machine 700.

Figure 6C:
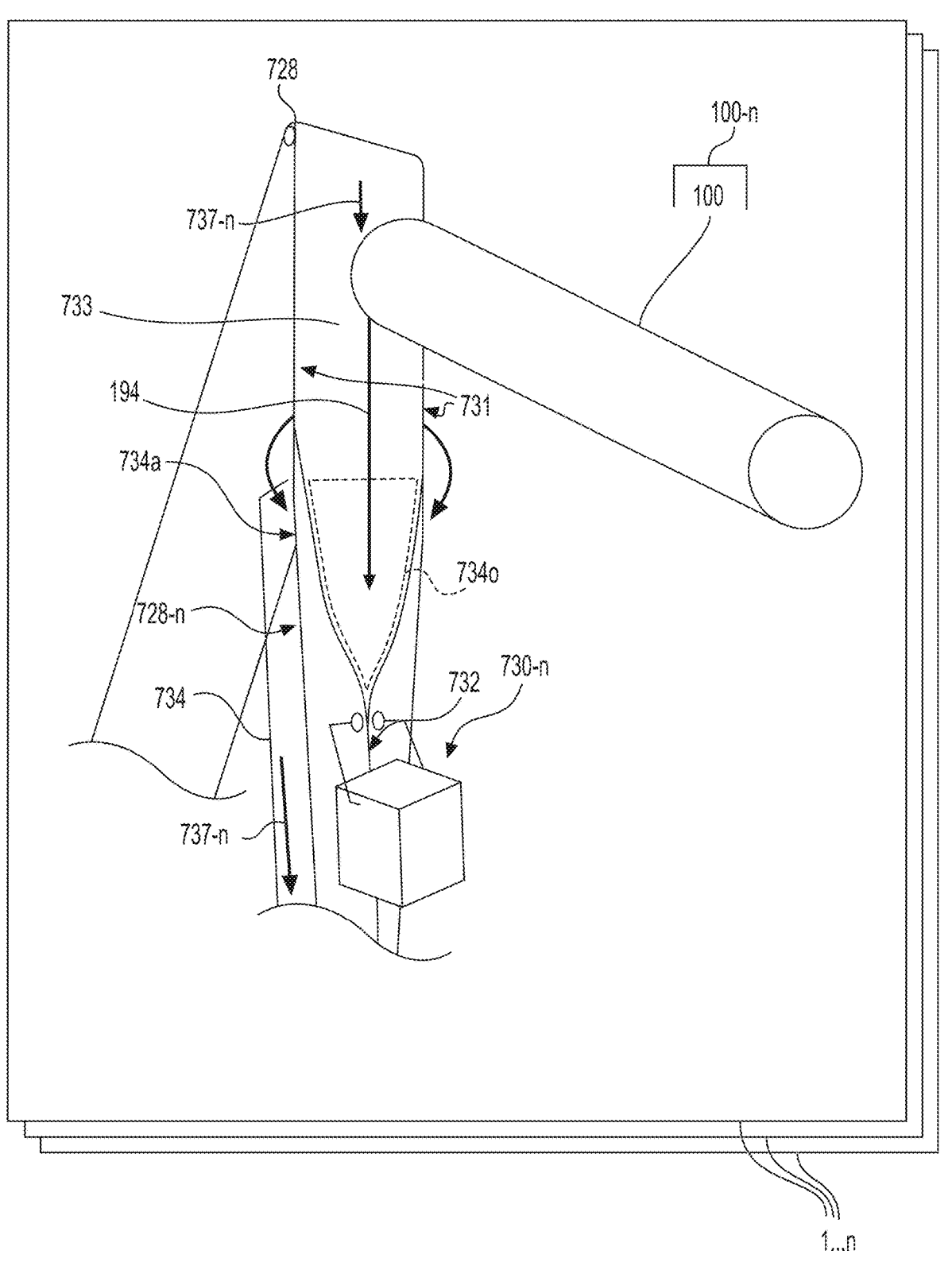
Figure 6D:
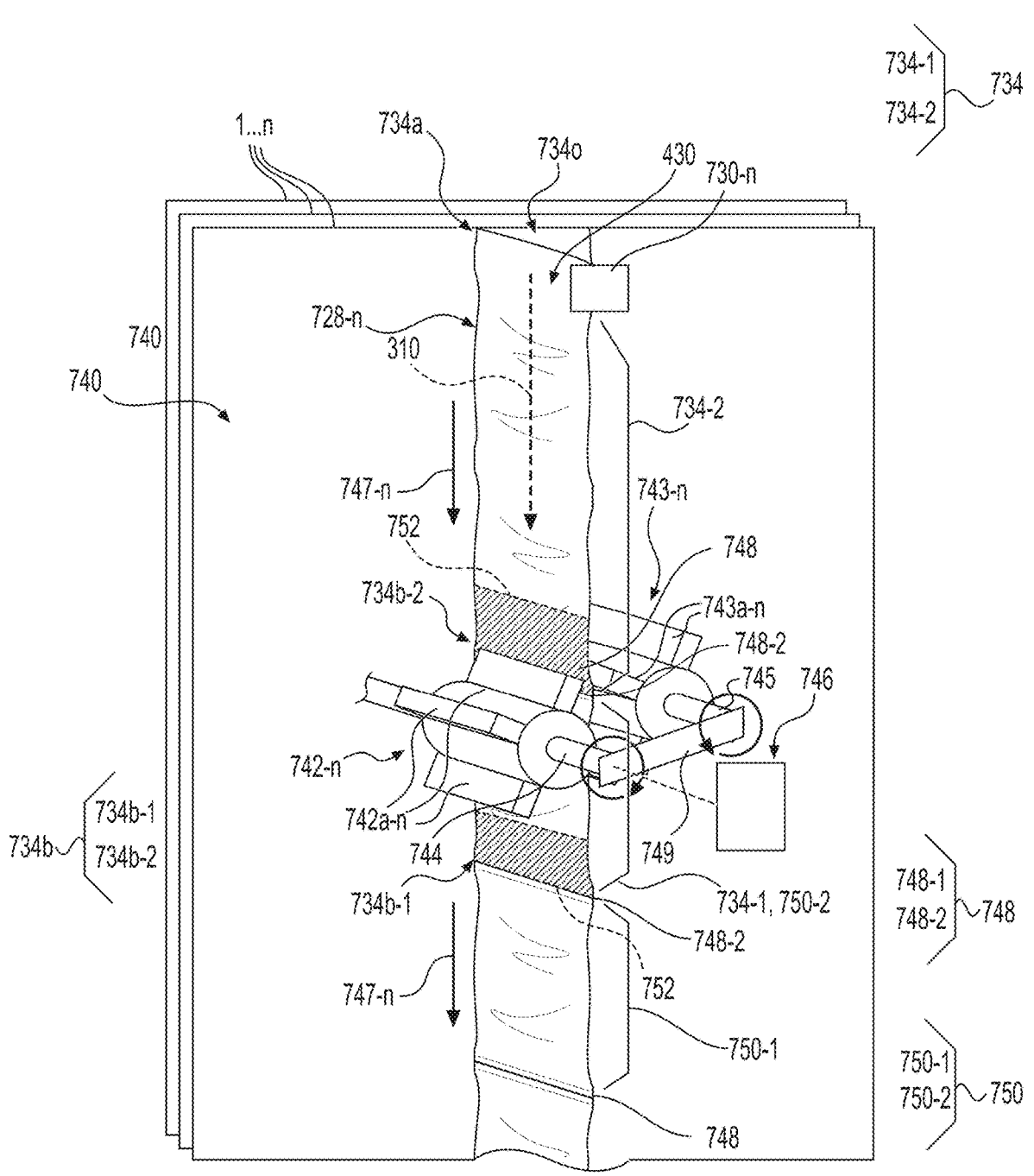
Figure 6E:
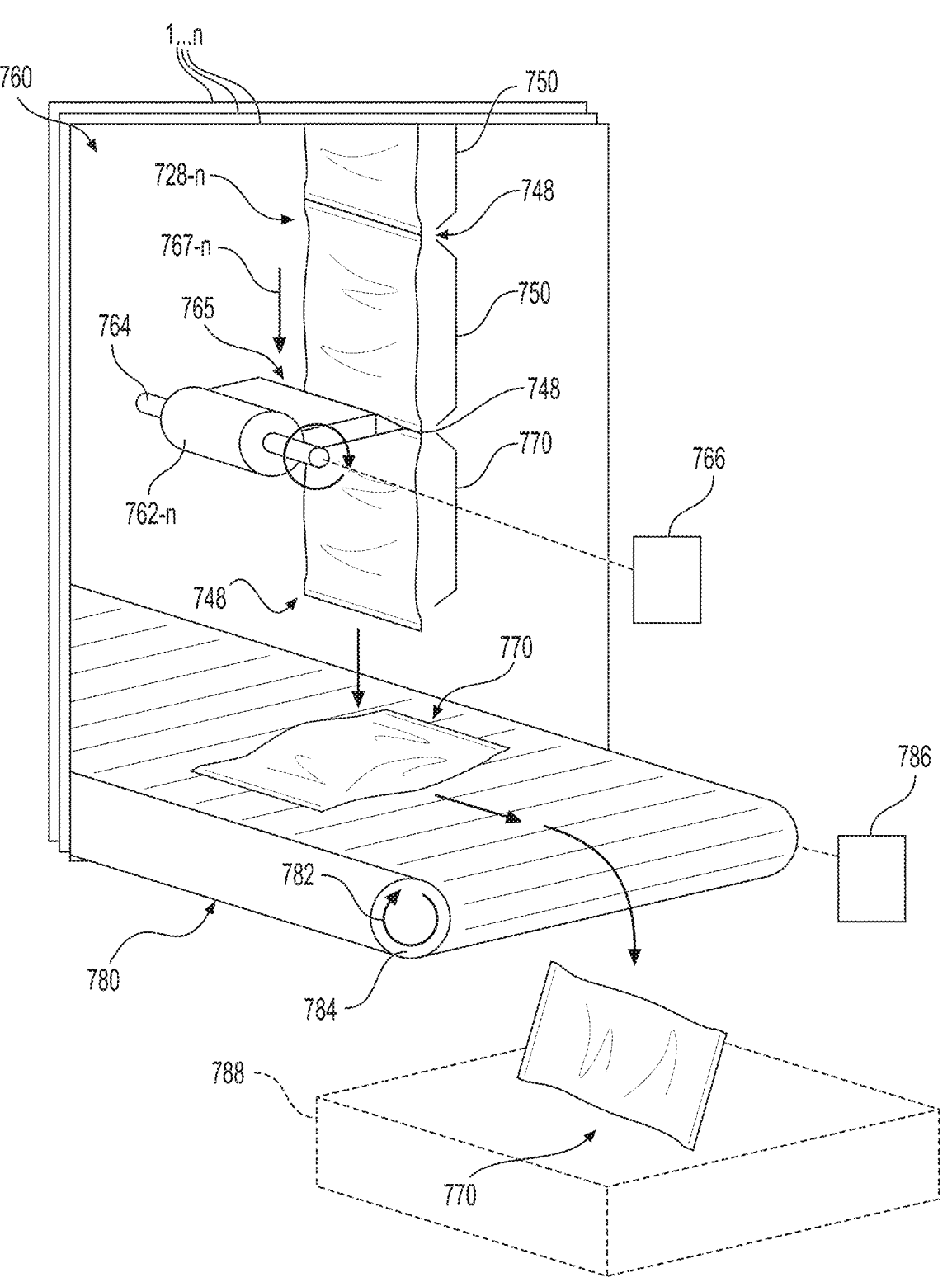

Referring now to FIGS. 6C-6E, the packaging machine 700 may be configured to define process streams 1 to n ("n" being any positive integer) that may be operated in parallel. Accordingly, elements of the "nth" process stream are described in detail with reference to at least FIGS. 6C-6E, but it will be understood that elements of the packaging machine 700 with regard to the 1 to (n–1)th process streams may be identical or substantially identical to elements of the elements of the packaging machine 700 described with regard to the nth process stream in reference to at least FIGS. 6C-6E.

Referring now to FIG. 5 and FIG. 6C, each separate strip of packaging material, of the strips 726-1 to 726-*n*, may be fed in a separate respective process stream of process streams 1 to n to be folded by a separate folding device 730-1 to 730-*n* to form a folded strip 728-1 to 728-*n* defining an open enclosure 734 (e.g., to form an open wrapper, article of packaging, etc.), and to be at least partially filled with a particular amount (e.g., index 752) of granular material 194 that is supplied by a separate doser mechanism 100-1 to 100-*n*.

Each separate folding device 730-1 to 730-*n* may be aligned (e.g., vertically aligned) with a separate process stream of the 1 to n process streams of the packaging machine 700 and thus only the nth folding device 730-*n* with regard to the nth strip 726-*n* in the nth process stream is described, but it will be understood that elements of the folding devices 730-1 to 730-(*n*–1) with regard to strips 726-1 to 726-(*n*–1) in the 1 to (n–1)th process streams may be identical or substantially identical to elements of the nth folding device 730-*n* described with regard to the nth process stream.

Each separate doser mechanism 100-1 to 100-*n* may be aligned (e.g., vertically aligned) with a separate process stream of the 1 to n process streams of the packaging machine 700 and thus only the nth doser mechanism 100-*n* with regard to the nth strip 726-*n* in the nth process stream is described, but it will be understood that elements of the doser mechanisms 100-1 to 100-(*n*–1) with regard to strips 726-1 to 726-(*n*–1) in the 1 to (n–1)th process streams may be identical or substantially identical to elements of the nth doser mechanism 100-*n* described with regard to the nth process stream.

As shown in FIG. 6C, the nth folding device 730-*n* is configured to fold the nth strip 726-*n* of packaging material that is fed into the nth process stream to form an nth folded strip 728-*n* of packaging material that defines an open enclosure 734 defined by one or more surfaces 733 of the given nth folded strip 728-*n*. As shown in FIG. 6C, a given nth folding device 730-*n* may be configured to bring opposite side edges 731 of the given nth strip 726-*n* together and join and/or seal the opposite side edges 731 together as the given nth strip 726-*n* moves in a nth local feed direction 737-*n* past the nth folding device 730-*n* to thereby form a fin seal 732 of the opposite side edges 731 that extends in the nth local feed direction 737-*n*. The nth folding device 730-*n* may include a device configured to cause the opposite side edges 731 of the nth strip 726-*n* to be brought in contact with each other and pressed together to at least partially facilitate the formation of the fin seal 732 that extends in the nth local feed direction 737-*n*, as the nth strip 726-*n* moves past the nth folding device 730-*n* in the nth local feed direction 737-*n*, to form the nth folded strip 728-*n*. The nth folding device 730-*n* may include a device configured to attach the opposite side edges 731 of the nth strip 726-*n* together (e.g., to press the opposite side edges 731 together) to seal the opposite side edges 731 together to form the fin seal 732 that establishes the nth folded strip 728-*n* defining the open enclosure 734 therein. The nth folding device 730-*n* may include a heater (e.g., an electrically-powered resistive heater) that is configured to heat a portion of the nth folding device 730-*n* (e.g., to about 300 F) that contacts at least a portion of the nth strip 726-*n* in order to heat the opposite side edges 731 that are pressed together to cause the contacted opposite side edges 731 to adhere to each other to facilitate the formation of the fin seal 732 that extends in the nth local feed direction 737-*n*.

As shown, the open enclosure 734 of the nth folded strip 728-*n* may be closed in side directions perpendicular to the nth local feed direction 737-*n* based on the established fin seal 732 that extends parallel to the nth local feed direction 737-*n* along a side of the nth folded strip 728-*n*. The open enclosure 734 of the nth folded strip 728-*n* may be open at a proximate end that is proximate to the nth doser mechanism 100-*n* and may be closed at a distal end that is distal to the nth doser mechanism 100-*n*. In FIGS. 5 and 6C, the nth local feed direction 737-*n* is downwards in the direction of gravity, such that the open enclosure 734 of the nth folded strip 728-*n* that is formed based on folding the nth strip 726-*n* to join opposite side edges 731 thereof is open at a top end thereof and thus is understood to have a top opening 7340 at the proximate end of the open enclosure 734. As described further with reference to FIGS. 5 and 6D, the open enclosure 734 may be closed at the distal end that is opposite the top opening 7340 (e.g., at a bottom of the open enclosure 734) by an end seal 748.

Still referring to FIGS. 5 and 6C, and further referring to FIG. 6D, each given doser mechanism 100 of doser mechanisms 100-1 to 100-*n* of dosing apparatus 10 of the packaging machine 700 may be configured to execute an index operation to supply a particular index amount (e.g., index 752) of granular material 194 through the doser outlet opening 180-2 of the given doser mechanism 100 based on the auger conveyor 120 of the given doser mechanism 100 being in the "on" operating state for a particular period of time at a particular rate such that the one or more augers 122 thereof are rotating 196 at particular respective rates of rotation for the particular period of time. As shown in FIGS. 5, 6C and 6D, the nth doser mechanism 100-*n* executing an index operation supplies (e.g., discharges) the particular index amount (e.g., index 752) of granular material 194 out of the nth doser mechanism 100-*n* and into the open enclosure 734 of the nth folded strip 728-*n*.

As shown in FIGS. 5, 6C, and 6D, the nth doser mechanism 100-*n* may be positioned to be vertically above (e.g., vertically aligned with) the top opening 7340 at the proximate end 734*a* of the open enclosure 734 of the nth folded strip 728-*n*, such that the given nth doser mechanism 100-*n* is configured to supply granular material 194 that falls from the nth doser mechanism 100-*n*, through the top opening 7340 of the open enclosure 734 at the proximate end 734*a* thereof, and to the distal end 734*b* of the open enclosure 734 adjacent to the end seal 748 that closes the distal end 734*b* of the open enclosure 734.

The given nth doser mechanism 100-*n* may have a drive motor 124 as described with regard to the doser mechanism 100 of the dosing apparatus 10, and the drive motor 124 may be a servomotor that is controlled by a control device (e.g., control device 790 as described below) to, at particular intervals of time, rotate a driveshaft thereof at a particular rate of rotation for a particular period of time, to cause the one or more augers 122 of the nth doser mechanism 100-*n* to rotate 196 at respective rates of rotation for the particular period of time, in order to execute an index operation that causes the nth doser mechanism 100-*n* to supply a particular index amount (e.g., index 752) of granular material 194 into the open enclosure 734 of the nth folded strip 728-*n*. Each separate period of operation of the nth doser mechanism 100-*n* to supply a separate index 752 of granular material may be understood to be a separate index operation performed by the nth doser mechanism 100-*n*. The n-th doser mechanism 100-*n* may be controlled (e.g., by control device 790) to perform index operations that each have a particular start time, period of time, end time, and/or associated rate of rotation of the drive motor 124 at a particular time interval or "time spacing" between adjacent index operations.

When the auger conveyor 120 of the given nth doser mechanism 100-*n* is stopped (e.g., is in the "off" operating state, at the end of an index operation and/or between index operations), the supply of granular material from the nth doser mechanism 100-*n* into the open enclosure 734 may be stopped.

As shown in FIGS. 5, 6C, and 6D, based on a particular index amount (e.g., index 752) of granular material 194 being supplied by the given nth doser mechanism 100-*n* into an open enclosure 734 of the nth folded strip 728-*n* of packaging material, said open enclosure 734 may be at least partially filled at the distal end 734b thereof by the index 752 of granular material. For example, as shown, open enclosure 734 of the folded strip 728-*n* may be open (e.g., have opening 7340) at the proximate end 734a (e.g., top end) and may be sealed at the distal end 734b (e.g., bottom end) by an end seal 748. A distal (e.g., bottom) portion of the open enclosure 734 that is adjacent to the distal end 734b (e.g., adjacent to and at least partially defined by the end seal 748 that seals the distal end 734b of the open enclosure 734) may be at least partially filled with the index 752 of granular material that is supplied into the open enclosure 734 from the nth doser mechanism 100-*n*.

It will be understood, as described herein, that the nth doser mechanism 100-*n* of the dosing apparatus 10 may be controlled to perform "index" operations to supply a particular amount (e.g., index 752) of granular material into the open enclosure 734 of the folded strip 728-*n*, via the opening 7340 at the proximate end 734a of the open enclosure 734, at a particular time interval that may be controlled by the control device 790, where the index operation includes the control device 790 causing the drive motor 124 of the nth doser mechanism 100-*n* to rotate for a particular period of time and at a particular rate of rotation that is associated with the one or more augers 122 of the nth doser mechanism 100-*n* causing the particular amount (e.g., index 752) of granular material to be supplied into the distal portion of the open enclosure 734 of the nth folded strip 728-*n* that is adjacent to the distal end 734b thereof. As described herein, the drop-down device 300 of the dosing apparatus 10 may be configured to control a depth of granular material 404 in the nth intake hopper 400-*n* and thus to control a pressure on one or more augers 122 of the n-th doser mechanism 100 that is exposed to the enclosure 402e of the nth intake hopper 400, thereby improving performance of the doser mechanism 100-*n* to supply indexes 752 with improved uniformity and consistency based on the pressure acting on the one or more augers 122 in the nth intake hopper 400-*n* being controlled (e.g., reduced, minimized, maintained within a certain range, optimized, or the like) based on the drop-down device 300 restricting the flow 504 of granular material into the intake hopper 400.

Referring now to FIG. 5 and FIG. 6D, the packaging machine 700 may include a sealing device 740 that is configured to join opposing inner surfaces 739 defining opposite sides of the open enclosures 734 of the folded strips 728-1 to 728-*n* to establish respective new end seals 748-2 that each isolate at least a distal portion 734-1 of the open enclosures 734 defined by the folded strips 728-1 to 728-*n* of packaging material and adjacent to a previously-established end seal 748-1 from a remainder, proximate portion 734-2 of the open enclosures 734 to partition, in the local feed directions 747-1 to 747-*n*, the portions of the open enclosures 734 of the folded strips 728-1 to 728-*n* that each contain an index 752 of granular material into isolated sealed enclosures 750 each containing a separate, particular amount (e.g., index 752) of granular material.

As shown, the sealing device 740 may include a set of first projection devices 742-1 to 742-*n* connected via a central rod 744 and a set of second projection devices 743-1 to 743-*n* connected via a separate central rod 745 mechanically coupled to the first projection devices 742-1 to 742-*n* via meshed gears 749 to synchronize rotation of the first projection devices 742-1 to 742-*n* with the rotation (e.g., counter-rotation) of the second projection devices 743-1 to 743-*n*. The central rod 744 may be mechanically connected to a drive motor 746 (e.g., directly or via a drive transmission such as meshed gears 749) and thus may be configured to rotate around its longitudinal axis based on operation of the drive motor 746 to further cause the first projection devices 742-1 to 742-*n* to rotate around the longitudinal axis of the central rod 744. The central rod 745 may be mechanically connected to the drive motor 746 (e.g., directly or via a drive transmission such as meshed gears 749) and thus may be configured to rotate around its longitudinal axis based on operation of the drive motor 746 to further cause the second projection devices 743-1 to 743-*n* to rotate around the longitudinal axis of the central rod 745, for example in an opposite rotational direction than the first projection devices 742-1 to 742-*n*.

Each separate first projection device 742-1 to 742-*n* and second projection device 743-1 to 743-*n* may be aligned (e.g., vertically aligned and/or horizontally overlapped) with a separate nth process stream of the packaging machine 700 and thus only the portions of the sealing device 740 with regard to the nth process stream are described, but it will be understood that elements of the sealing device 740 with regard to the 1 to (n−1)th process streams may be identical or substantially identical to elements of the sealing device 740 described with regard to the nth process stream.

As shown in at least FIG. 6D, the nth first and second projection devices 742-*n* and 743-*n* may be arranged to be aligned with (e.g., horizontally overlap with) opposite sides of the nth folded strip 728-*n* that defines an open enclosure 734 containing an index 752 of granular material at a distal portion 734-1 thereof, adjacent to a distal end 734b of the open enclosure 734 that is closed by an end seal 748. The sealing device 740 may be located vertically below the nth doser mechanism 100-*n* of the nth process stream so that the nth folded strip 728-*n* moves downwards from the nth doser mechanism 100-*n* and nth folding device 730-*n* towards the nth first and second projection devices 742-*n* and 743-*n* of the sealing device 740 in the nth local feed direction 747-*n*.

The nth first projection device 742-*n* may include multiple pad projections 742a-*n* extending radially from a central axis of rotation of the nth first projection device 742-*n* (e.g., may extend radially from the central rod 744). The nth second projection device 743-*n* may include multiple pad projections 743a-*n* extending radially from a central axis of rotation of the nth second projection device 743-*n* (e.g., may extend radially from the central rod 745).

The nth first projection device 742-*n* may include a heater (e.g., a resistive heater) configured to heat the pad projections 742*a*-*n* (e.g., to about 300 F). The nth second projection device 743-*n* may or may not include a similar or identical heater.

The pad projections 742*a*-*n* may comprise a metal material (e.g., stainless steel, carbon steel, aluminum, or the like) a rubber material, a plastic material, or the like. The pad projections 743*a*-*n* may comprise a metal material (e.g., stainless steel, carbon steel, aluminum, or the like) a rubber material, a plastic material, or the like. The pad projections 742*a*-*n* and 743*a*-*n* may comprise a same material (e.g., pad projections 742*a*-*n* and 743*a*-*n* may both comprise stainless steel) or different materials (e.g., pad projections 742*a*-*n* may comprise stainless steel and pad projections 743*a*-*n* may comprise rubber).

As shown in at least FIGS. 5 and 6D, the nth first and second projection devices 742-*n* and 743-*n* may rotate (e.g., counter rotate in synchronized rates of rotation) around their respective longitudinal axes and in synchronization with each other as the nth folded strip 728-*n* is fed in the nth local feed direction 747-*n* in proximity to the nth first and second projection devices 742-*n* and 743-*n*. The rate of movement of the nth folded strip 728-*n* in the nth local feed direction 747-*n* may be synchronized with the rates of rotation of the nth first and second projection devices 742-*n* and 743-*n* around their respective longitudinal axes. The first and second projection devices 742-*n* and 743-*n* may be configured to rotate in synchronization and in opposite rotational directions, so that opposing pad projections 742*a*-*n* and 743*a*-*n* of the nth first and second projection devices 742-*n* and 743-*n* rotate into closest proximity with each other and with the nth folded strip 728-*n* (such that clearance between proximate pad projections 742*a*-n and 743*a*-*n* reaches a minimum) after a particular (e.g., fixed, constant, and/or predetermined) length of the nth folded strip 728-*n* has moved in the nth local feed direction 747-*n* past the nth first and second projection devices 742-*n* and 743-*n*.

Still referring to FIGS. 5 and 6D, as the nth first and second projection devices 742-*n* and 743-*n* rotate respective pad projections 742*a*-*n* and 743*a*-*n* thereof to a position of closest proximity to each other and to the nth folded strip 728-*n*, the proximate pad projections 742*a*-n and 743*a*-*n* may contact and press into opposite outer surfaces of the folded strip 728-*n* to cause opposing inner surfaces 739 of the open enclosure 734 of the nth folded strip 728-*n* to be joined (e.g., pressed together) and sealed to each other to form an end seal 748 (e.g., end seal 748-2), that extends across a width of the nth folded strip 728-*n* in a direction that is different from (e.g., perpendicular to) the nth local feed direction 747-*n*, thereby partitioning (e.g., isolating) a feed direction-leading portion (e.g., distal portion 734-1) of the open enclosure 734 of the nth folded strip 728-*n* from a remainder, proximate portion 734-2 (e.g., proximate portion) of the open enclosure 734 of the nth folded strip 728-*n*. The nth first projection device 742-*n* may include a heater configured to heat the pad projections 742*a*-*n* (e.g., to about 300 F) so that, when proximate pad projections 742*a*-*n* and 743*a*-*n* press opposing inner surfaces 739 of the open enclosure 734 together, the heated pad projections 742*a*-*n* may cause the pressed-together inner surfaces 739 of the open enclosure 734 to adhere to each other to form the end seal 748.

When the nth local feed direction 747-*n* of a given nth folded strip 728-*n* at the sealing device 740 is vertically downwards, the feed direction leading portion (e.g., distal portion 734-1) of the open enclosure 734 is a bottom portion of the open enclosure 734 that is below the nth first and second projection devices 742-*n* and 743-*n* when respective pad projections 742*a*-*n* and 743*a*-*n* thereof are rotated into closest proximity to each other and the nth folded strip 728-*n* and the remainder, proximate portion 734-2 of the open enclosure 734 is an upper portion of the open enclosure 734 that is above the sealing device 740 when the respective pad projections 742*a*-*n* and 743*a*-*n* are rotated into closest proximity to each other and to the nth folded strip 728-*n*. Prior to respective pad projections 742*a*-*n* and 743*a*-*n* being rotated into closest proximity to each other and to the nth folded strip 728-*n*, the end seal 748-2 shown in FIG. 6D may be absent such that the distal and proximate portions 734-1 and 734-2 are separate, continuous portions of a single open enclosure 734 that are not partitioned or sealed from each other. As shown, the distal portion 734-1 of the open enclosure 734 may be adjacent to, and at least partially defined by, the end seal 748-1 that defines distal end 734*b*-1 of the open enclosure 734 prior to end seal 748-2 being formed. In some example embodiments, when opposing pad projections 742*a*-*n* and 743*a*-*n* are at closest proximity to each other and to the nth folded strip 728-*n*, the pad projections 742*a*-*n* and 743*a*-*n* may form an end seal 748-2 that partitions the distal portion 734-1 (e.g., bottom portion) of the open enclosure 734 (that contains an index 752 of granular material from the remainder, proximate portion 734-2 (e.g., upper portion) of the open enclosure 734.

As a result, the open enclosure 734 of the nth folded strip 728-*n* may be partitioned, at end seal 748-2, by the sealing device 740 into separate sealed enclosures 750, isolated (e.g., partitioned) from each other in the nth local feed direction 747-*n* by respective end seals 748. For example, distal portion 734-1 and proximate portion 734-2 may be partitioned from each other by end seal 748-2 as shown in FIG. 6D so that distal portion 734-1 is partitioned to form sealed enclosure 750-2 and end seal 748-2 defines a new distal end 734-*b*2 of the open enclosure 734 that may be empty or substantially empty of granular material.

Each separate sealed enclosure 750 includes (e.g., contains, holds, etc.) a separate, particular amount (e.g., index 752) of granular material and is closed at opposite ends in the nth local feed direction 747-*n* by separate end seals (e.g., sealed enclosure 750-2 is closed at opposite ends by end seals 748-1 and 748-2). The sealed enclosures 750 may have a same or substantially same length in the nth local feed direction 747-*n*. As a result, each separate sealed enclosure 750 that is formed by the sealing device 740 may contain same or substantially same amounts of granular material (e.g., same-sized indexes 752).

The rate of movement of the nth folded strip 728-*n* in the nth local feed direction 747-*n* and the rates of rotation of the nth first and second projection devices 742-*n* and 743-*n* may be synchronized with the intervals and/or durations of index operations performed by the nth doser mechanism 100-*n* so that the nth doser mechanism 100-*n* begins an index operation to supply a single index 752 of granular material into the distal portion 734-1 of the open enclosure 734 after the nth first and second projection devices 742-*n* and 743-*n* have formed a first end seal 748-1 to partition (e.g., seal) a previously-supplied index 752 into a first sealed enclosure 750-1. Thus, the single index 752 is supplied into an empty distal portion 734-1 of the open enclosure 734 having an open proximate end 734*a* and a distal end 734*b*-1 closed by the first end seal 748-1. The nth doser mechanism 100-*n* ends the index operation prior to the particular length of the folded strip 728-*n* being moved past the nth first and second projection devices 742-*n* and 743-*n*. The nth first and second projection devices 742-*n* and 743-*n* may form a next end seal 748-2, above the fill line of the single index 752 in the distal portion 734-1, to seal the single index 752 into a next sealed enclosure 750-2 and to establish a new, closed distal end 734*b*-2 of the open enclosure 734 that is closed by next end seal 748-2 and is devoid or substantially devoid of granular material.

In some example embodiments, the first to nth second projection devices 743-1 to 743-*n* may be absent from the packaging machine 700.

Referring now to FIG. 5 and FIG. 6E, the packaging machine 700 may include a cutting device 760 that is configured to separate sealed enclosures 750 of each given folded strip 728-1 to 728-*n* of packaging material into separate packages 770 (also referred to herein as articles of packaging) that each contain a separate index 752 of granular material, where each index 752 may be a same or substantially same amount of granular material.

As shown, the cutting device 760 may include a plurality of blades 762-1 to 762-*n*, also referred to herein as "blades", connected via a central rod 764. The central rod 764 may be mechanically connected to a drive motor 766 (e.g., a servomotor) and thus may be configured to rotate around its longitudinal axis based on operation of the drive motor 766 to further cause the blades 762-1 to 762-*n* to rotate around the longitudinal axis of the central rod 764.

Each separate blade 762-1 to 762-*n* may be aligned (e.g., vertically and/or horizontally overlapped) with a separate nth process stream of the packaging machine 700 and thus only the portions of the cutting device 760 with regard to the nth process stream are described, but it will be understood that elements of the cutting device 760 with regard to the 1 to (n–1)th process streams may be identical or substantially identical to elements of the cutting device 760 described with regard to the nth process stream.

As shown in at least FIG. 6E, the nth blade 762-*n* may be arranged to be aligned with (e.g., horizontally overlap with) the nth folded strip 728-*n* that defines at least one sealed enclosure 750 containing a particular amount (e.g., index 752) of granular material. The cutting device 760 may be located vertically below the sealing device 740 of the nth process stream so that the nth folded strip 728-*n* moves in an nth local feed direction 767-*n* (e.g., downwards) from the nth first and second projection devices 742-*n* and 743-*n* towards the nth blade 762-*n* of the cutting device 760.

As shown in at least FIGS. 5 and 6E, the nth blade 762-*n* may rotate around the longitudinal axis of the central rod 764 as the nth folded strip 728-*n* is fed in the nth local feed direction 767-*n* (e.g., downwards) in proximity to the nth blade 762-*n*. The rate of movement of the nth folded strip 728-*n* in the nth local feed direction 767-*n* may be synchronized with the rate of rotation of the nth blade 762-*n* around the central rod 764 so that the nth blade 762-*n* rotates into closest proximity with the nth folded strip 728-*n* after a particular (e.g., fixed, constant, and/or predetermined) length of the strip 728-*n*, which may be the length of each sealed enclosure 750 between opposite adjacent end seals 748, has moved in the nth local feed direction 767-*n* past the cutting device 760. As a result, the packaging machine 700 may be configured to move the nth folded strip 728-*n* and further rotate the nth blade 762-*n* in synchronization with such movement such that, when the nth blade 762-*n* rotates into closest proximity with the nth folded strip 728-*n*, the nth blade 762-*n* contacts and cuts through (e.g., bisects) an end seal 748 of the nth folded strip 728-*n* in the direction in which the seal 748 extends (e.g., perpendicular to the nth local feed direction 767-*n*). The aforementioned rotation and movements may be synchronized so that the nth blade 762-*n* cuts through the centerline (or approximately the centerline) of each end seal 748 extending in the direction perpendicular to the nth local feed direction 767-*n* to exactly or substantially exactly (e.g., ±10%) cut the end seal 748 in half in the direction perpendicular to the nth local feed direction 767-*n*. The rotation of the nth blade 762-*n* may be further synchronized with movement of the nth folded strip 728-*n* so that each sequential end seal 748 of the nth folded strip 728-*n* is contacted by the nth blade 762-*n*, and the nth blade 762-*n* only contacts end seals 748 of the nth folded strip 728-*n* when the nth blade 762-*n* is at a closest proximity to the nth folded strip 728-*n*, as the nth blade 762-*n* and strip 728-*n* move in synchronization with each other. For example, the movement of a given strip 728-*n* in the nth local feed direction 767-*n* may be synchronized with the rotation of a corresponding nth blade 762-*n* around the central rod 764 so the distal edge 765 of the nth blade 762-*n* rotates into contact with a seal 748 of the nth folded strip 728-*n* after each rotation of the nth blade 762-*n* around the central rod 764 and a length of a single sealed enclosure 750 between adjacent end seals 748 of the strip 728-*n* has moved past the cutting device 760 in the nth local feed direction 767-*n* during a single rotation of the nth blade 762-*n* around the central rod 764.

Still referring to FIGS. 5 and 6E, as the nth blade 762-*n* rotates to a position of closest proximity to the nth folded strip 728-*n*, the nth blade 762-*n* (e.g., distal edge 765 thereof) may contact and cut through the proximate end seal 748 of the nth folded strip 728-*n* to cause a feed direction-leading sealed enclosure 750 of the nth folded strip 728-*n* to be separated from a remainder of the nth folded strip 728-*n* as a discrete article of packaging, which is interchangeably referred to herein as a package 770 that includes a discrete (e.g., particular) amount (e.g., index 752) of granular material.

For example, when the nth local feed direction 767-*n* of a given nth folded strip 728-*n* at the cutting device 760 is vertically downwards, the feed direction leading sealed enclosure 750 is a bottom sealed enclosure 750 of the nth folded strip 728-*n* that is below the distal edge 765 of the nth blade 762-*n* when the nth blade 762-*n* is at closest proximity to the nth folded strip 728-*n* and the remainder portion of the nth folded strip 728-*n* is above the distal edge 765 of the nth blade 762-*n* when the nth blade 762-*n* is at closest proximity to the nth folded strip 728-*n*. In such example embodiments, when the nth blade 762-*n* is at closest proximity to the nth folded strip 728-*n*, the nth blade 762-*n* may cut through (e.g., bisect) an end seal 748 that joins the bottom sealed enclosure 750 to a remainder of the nth-folded strip 728-*n* into two physically separate sealed portions, thereby separating the bottom sealed enclosure 750, as a package 770, from the remainder of the nth folded strip 728-*n*.

As a result, the sealed enclosures 750 of the nth folded strip 728-*n* may be cut by the cutting device 760 into separate packages 770 (e.g., separate articles of packaging) containing separate, respective indexes 752 of granular material, where the separate packages 770 have a same or substantially same length between opposite end seals 748 at opposite longitudinal ends thereof. As a result, each separate package 770 may contain same or substantially same amounts (e.g., indexes 752) of granular material.

FIG. 6E shows a single nth blade 762-*n* horizontally aligned with the nth process stream and rotating around the central rod 764, but example embodiments are not limited thereto. For example, similarly to the nth projection device 742-*n* shown in FIG. 6D, the cutting device 760 may include multiple nth blades 762-*n* extending radially from the central rod 764 and spaced apart (e.g., equally apart) from each other, and the nth blades 762-*n* may be rotated around central rod 764 to cut separate end seals 748 as the nth folded strip 728-*n* is fed to the cutting device 760 in the nth local feed direction 767-*n*.

Still referring to FIGS. 5 and 6E, each newly established (e.g., newly formed) package 770, having been separated from the rest of the nth folded strip 728-*n* by the cutting device 760, may fall to a conveyor 780 or a collection area/bin. In FIGS. 5 and 6E, where the packaging machine 700 includes a conveyor 780, packages 770 established by the cutting device 760 may fall onto an upper surface of the conveyor 780. As shown, the conveyor 780 may have a driven shaft 784 that is driven by a drive motor 786 (e.g., a servomotor) to rotate 782 to cause the conveyor 780 to move packages 770 thereon towards a collection area 788, which may be a collection bin.

Accordingly, packages 770 containing respective indexes 752 of granular material may be formed by the packaging machine 700 in "n" process streams that each include a dosing apparatus 10 according to any of the example embodiments, where the packages 770 may be formed with improved precision, accuracy, and consistency of the amount of granular material supplied from each doser mechanism 100 to form each separate index 752 in each separate package 770 based on one or more drop-down devices 300-1 to 300-*n* of the dosing apparatus 10 improving the functionality of "n" doser mechanisms 100-1 to 100-*n* of the dosing apparatus 10 based on reducing, minimizing, maintaining (within a certain range), optimizing, etc. the head pressure of the depth D1 of granular material 404 at the respective augers 122 of the doser mechanisms 100-1 to 100-*n* extending into one or more intake hoppers 400-1 to 400-*n* based on the one or more drop-down devices 300-1 to 300-*n* restricting a flow 504 of granular material into the one or more intake hoppers 400-1 to 400-*n* from one or more supply hoppers 200. As a result, a packaging machine 700 that includes said one or more doser mechanisms 100 of the dosing apparatus 10, the one or more intake hoppers 400, one or more supply hoppers 200, and one or more drop-down devices 300 may be configured to improve the precision, accuracy, and consistency of the amounts of granular material included in each package 770.

In some example embodiments, the control device 790 is configured to control the various drive motors of the packaging machine 700 to cause the sheet and strips 726-1 to 726-*n*, 728-1 to 728-*n* of packaging material to be fed through the packaging machine 700 at a particular rate of movement, and for the rotation of the projection devices 742-1 to 742-*n* and 743-1 to 743-*n* of the sealing device 740 and the blades 762-1 to 762-*n* of the cutting device 760 and the intervals of the index operations of the doser mechanisms 100-1 to 100-*n* to be synchronized with the rate of motion of the sheet and/or strips 726-1 to 726-*n*, 728-1 to 728-*n* of packaging material through the packaging machine 700.

The control device 790 may control the doser mechanisms 100-1 to 100-*n* of the dosing apparatus 10 to perform index operations at a particular interval that is synchronized with movement of the packaging material and with operation of the sealing device 740 so that each index operation supplies an index 752 of granular material into an open enclosure 734 that has been newly formed due to the sealing device 740 forming a new end seal 748 in the folded strip 728-*n* that seals a previous distal portion 734-1 containing a previously-supplied index 752 into a separate sealed enclosure 750 and establishes a new, empty distal portion 734-1 of the open enclosure 734. The control device 790 may be configured to adjust the interval between index operations, the duration of each index operation, the rate of rotation of the one or more augers 122 of any of the doser mechanisms 100-1 to 100-*n* during the index operation, or the like in order to control the amount of granular material in each index 752 and to control the time spacing between the supplying of each index 752. The control device 790 may be configured to account for differing flow rates of different granular materials out of the doser mechanisms 100-1 to 100-*n*.

The control device 790 may store a look-up table, which may be empirically established, which associates different index 752 amounts of various types of granular material with corresponding operational parameters of the packaging machine 700, including corresponding drive motor 124 index rotation rates, index durations, index time spacings (e.g., duration between time-adjacent indexes), rate of movement of the sheet/strips of packaging material, rate of rotation of the projections 742/743 and/or blades 762, some combination thereof or the like. Operations of drive motors may be represented based on timings, amounts, and/or rates of electrical power to be applied (e.g., supplied) to said drive motors. Based on a determined amount of a determined type of granular material to be included in each index 752 (which may be provided to the control device 790 via a communication interface, user interface such as a touchscreen and/or keyboard interface, or the like), the control device 790 may access the look-up table, determine the corresponding operational parameters associated with the determined index amount and type of granular material and control one or more portions of the packaging machine 700, including for example the drive motor 124 of each doser mechanism 100-1 to 100-*n* but also or alternatively including some or all of the drive motors of the packaging machine 700, to ensure that the packaging machine creates packages 770 each containing a constant or substantially constant (e.g., ±10%) amount (e.g., index 752) of granular material across a range of granular materials and/or desired index 752 amounts.

Referring back to FIG. 5, the control device 790 may be configured to control some or all of the packaging machine 700, including some or all of the dosing apparatus 10. As shown in FIG. 5, the control device 790 may be communicatively coupled to the drive motors 716, 124, 746, 766, 786 that may be separate servomotors and may cause various portions of the packaging machine 700 to operate. The control device 790 may control some or all of the drive motors of the packaging machine 700 to cause the packaging machine 700 to operate in order to form packages 770 each containing a particular amount (e.g., index 752) of granular material. The control device 790 may be communicatively coupled to vibration device 290 and may be configured to control the vibration device 290 to control vibration of the supply hopper 200 and thus to control the supply of granular material from the supply hopper 200 to the one or more intake hoppers 400 via the one or more drop-down devices 300 based on vibrating at least a portion of the supply hopper 200. The control device 790 may be communicatively coupled to one or more actuators 360 and may be configured to adjust a position (e.g., adjustably pivot) one or more slats 320 of the drop-down device 300 to adjustably control a flow rate of a flow 504 of a granular material through the drop-down device 300 from the supply hopper 200 to the intake hopper 400. The control device 790 may be communicatively coupled to one or more pressure sensors 600 included in one or more intake hoppers 400-1 to 400-*n* and may be configured to determine a head pressure of the depth D1 of granular material 404 on the one or more augers 122 of the one or more doser mechanisms 100-1 to 100-$n$ based on processing sensor data received from the one or more pressure sensors 600. The control device 790 may be configured to adjustably control the vibration device 290, one or more actuators 360, or any combination thereof based on processing sensor data received from one or more pressure sensors 600 to control a head pressure of the depth D1 of the granular material 404 at one or more augers 122 in one or more intake hoppers 400-1 to 400-$n$.

The control device 790 may store a look-up table, which may be empirically established, which associates different magnitudes of pressure sensed by one or more pressure sensors 600 with one or more vibration magnitudes and/or frequencies of vibration induced by the vibration device 290 and/or one or more actuation positions of one or more slats 320 of the drop-down devices 340 as controlled by the one or more actuators 360. Based on a determined pressure sensed by one or more pressure sensors 600 in one or more intake hoppers 400, the control device 790 may access the look-up table, determine the corresponding operational parameters of the vibration device 290 and/or one or more actuators 360 associated with the determined pressure, to ensure that the packaging machine creates packages 770 each containing a constant or substantially constant (e.g., ±10%) amount (e.g., index 752) of granular material across a range of granular materials and/or desired index 752 amounts based on maintaining the head pressure of the depth D1 of granular material 404 on the one or more augers 122 of the doser mechanism 100-1 to 100-$n$ by the granular material in the intake hoppers 400-1 to 400-$n$ to be maintained within a certain range, optimized, or the like.

It will be understood that, in some example embodiments, the control device 790 may be configured to independently control multiple actuators 360 that are mechanically coupled to different slats 320 in a drop-down device 300 to independently adjust the respective inclination angles 390 of the different slats 320 to be different angles.

In some example embodiments, some or all of any of the control device 790 may include, may be included in, and/or may be implemented by one or more instances (e.g., articles, pieces, units, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or any other device or devices capable of responding to and executing instructions in a defined manner. As shown in FIG. 5, the control device 790 may include some or all of a processor 792 (e.g., a CPU), a memory 794 (e.g., a solid-state drive, or SSD), and a communication interface 796 that are communicatively coupled together via a bus connection 798. It will be understood that any type of non-transitory computer readable storage device may be used as the memory 794 in addition or alternative to an SSD. In some example embodiments, the processing circuitry may include a non-transitory computer readable storage device, or memory (e.g., memory 794), for example a solid state drive (SSD), storing a program of instructions, and a processor (e.g., processor 792) that is communicatively coupled to the non-transitory computer readable storage device (e.g., via a bus connection 798) and configured to execute the program of instructions to implement the functionality of some or all of any of the devices and/or mechanisms of any of the example embodiments and/or to implement some or all of any of the methods of any of the example embodiments. It will be understood that, as described herein, an element (e.g., processing circuitry, digital circuits, etc.) that is described as "implementing" an element (e.g., packaging machine 700) will be understood to implement the functionality of said implemented element (e.g., the functionality of the packaging machine 700).

In FIGS. 5 and 6A-6E, the packaging machine 700 is shown to include multiple separate drive motors 716, 124, 746, 766, 786 coupled to separate, respective portions of devices of the packaging machine 700. However, example embodiments are not limited thereto. In some example embodiments, some or all portions of the packaging machine 700 may be driven by a single, same drive motor (e.g., drive motor 124) that is controlled by the control device 790. In some example embodiments, the packaging machine 700 includes a single drive motor 124 that is mechanically coupled (e.g., via one or more drive transmission mechanisms, including one or more drive belts, meshed gear set, or the like) to each of the packaging supply device 710, doser mechanisms 100-1 to 100-$n$, sealing device 740, cutting device 760, and conveyor 780 and is configured to drive each of said devices under control of the control device 790 and also such that the operation of said devices (and movements of elements thereof) are at least partially synchronized with respect to each other to enable the movement synchronization of various elements as described herein.

In some example embodiments, one or more of the described devices of the packaging machine 700 may be absent. For example, in some example embodiments the packaging machine 700 may move pre-formed open packages of packaging material, defining respective open enclosures 734, into alignment with separate, respective doser mechanisms 100-1 to 100-$n$ to be filled with granular material by the doser mechanisms 100-1 to 100-$n$, and the packaging machine 700 may include a sealing device 740 that seals the open enclosures 734 of said open packages to form packages 770 containing respective indexes 752 of granular material supplied into the open enclosures 734 from one or more of the doser mechanisms 100-1 to 100-$n$. The doser mechanisms 100-1 to 100-$n$ may each be controlled (e.g., based on controlling operation of the respective auger conveyors 120 via control of the drive motor(s) 124) to initiate supplying granular material out of the respective second openings 180-2 for a particular period of time in response to an open package being moved to be vertically underneath the given doser mechanism and/or to not supply granular material when an open packet is not vertically underneath the given doser mechanism, such that the doser mechanisms 100-1 to 100-$n$ may each supply a particular amount (e.g., index 752) of granular material into separate open packages. In some example embodiments, the cutting device 760, folding devices 730-1 to 730-$n$, and at least a portion of the packaging supply device 710 may be absent from the packaging machine 700.

Figure 7:
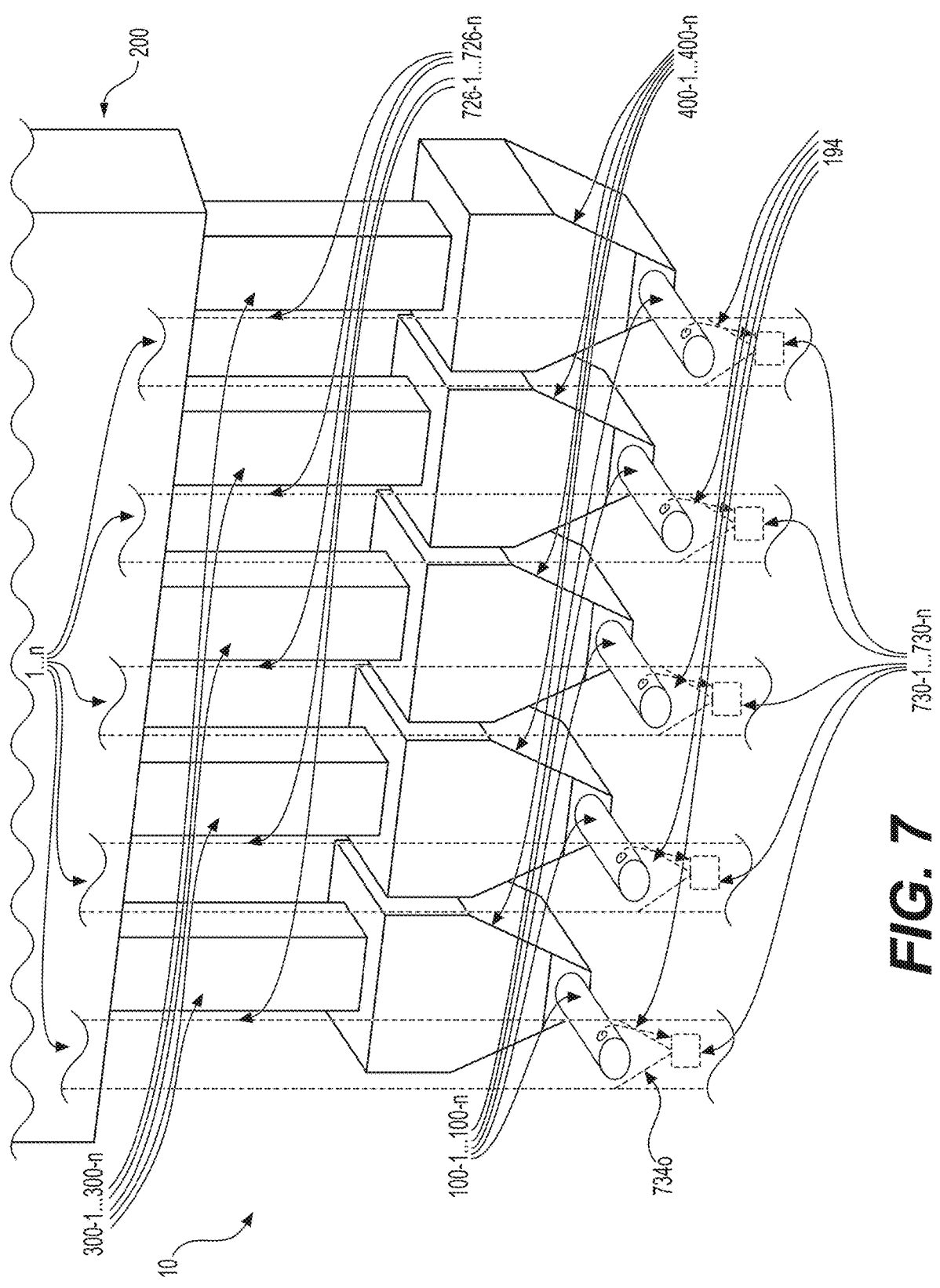
FIG. 7 is a perspective view of region C of the packaging machine of FIG. 5, according to some example embodiments.

FIG. 7 is a perspective view of region C of the packaging machine 700 of FIG. 5, according to some example embodiments.

Referring to FIG. 7, in some example embodiments a dosing apparatus 10 may include multiple doser mechanisms 100-1 to 100-$n$ configured to supply separate, respective amounts of granular material 194 in parallel, a plurality of intake hoppers 400-1 to 400-$n$ coupled to separate, respective doser mechanisms 100-1 to 100-$n$, and a plurality of drop-down devices 300-1 to 300-$n$ coupled between the supply hopper 200 and separate, respective intake hoppers 400-1 to 400-$n$, such that separate, respective parallel flows of a granular material 204 held in the supply hopper 200 may be directed via separate, respective drop-down devices 300-1 to 300-$n$ to separate intake hoppers 400-1 to 400-$n$ to be conveyed by separate, respective doser mechanisms 100-1 to 100-$n$ to supply parallel lanes of index amounts of granular material 194.

In some example embodiments, and as shown in FIG. 7, "$n$" may be greater than 1 (e.g., in FIG. 7 may equal 5), and the packaging machine 700 may include a dosing apparatus 10 that includes a plurality of doser mechanisms 100-1 to 100-$n$, each separate doser mechanism configured to be aligned with a separate folded strip 728-1 to 728-$n$ of packaging material and a separate folding device 730-1 to 730-$n$ that is configured to fold the respective aligned strip 726 of packaging material to form a separate open enclosure 734 that is vertically aligned with the respective doser mechanism 100-1 to 100-$n$.

Accordingly, and as shown in FIG. 7 in relation to FIGS. 5 and 6A-6E, the plurality of doser mechanisms 100-1 to 100-$n$ may be configured to supply separate, respective amounts (e.g., indexes 752) of the granular material 194 in parallel, "$n$" process streams, and the packaging supply device 710 may be configured to supply a plurality of articles of packaging (e.g., strips 726-1 to 726-$n$) in parallel to the plurality of doser mechanisms 100-1 to 100-$n$ to be folded into a plurality of separate folded strips 728-1 to 728-$n$ that define separate, respective open enclosures 734 that may be filled in parallel with granular material 194 from separate, respective doser mechanisms 100-1 to 100-$n$.

Still referring to FIG. 7, the plurality of doser mechanisms 100-1 to 100-$n$ may be coupled to separate, respective intake hoppers 400-1 to 400-$n$ and configured to draw respective amounts of granular material from respective intake hoppers 400-1 to 400-$n$. The plurality of intake hoppers 400-1 to 400-$n$ may be coupled to a single supply hopper 200 via separate, respective drop-down devices 300-1 to 300-$n$, such that the dosing apparatus 10 may be configured to direct separate, respective flows of granular material in parallel from the single supply hopper 200 to multiple separate intake hoppers 400-1 to 400-$n$ via separate, respective drop-down devices 300-1 to 300-$n$. While the drop-down devices 300-1 to 300-$n$ in FIG. 7 are shown to have circular cylindrical outer shapes, it will be understood that example embodiments are not limited thereto. For example, in some example embodiments each of the drop-down devices 300-1 to 300-$n$ may have the same shape and structure as the drop-down device 300 shown in at least FIGS. 2A to 2F and FIG. 3. While the dosing apparatus 10 shown in FIG. 7 illustrates a single supply hopper 200 coupled to separate, respective sets of drop-down devices 300-1 to 300-$n$, example embodiments are not limited thereto. For example, in some example embodiments, a dosing apparatus 10 may include multiple supply hoppers 200 that are each configured to supply granular material into one or more drop-down devices 300, such that at least two of the intake hoppers 400-1 to 400-$n$ of the dosing apparatus 10 are configured to receive granular material from separate, respective supply hoppers 200 via one or more drop-down devices 300.

Figure 8C:
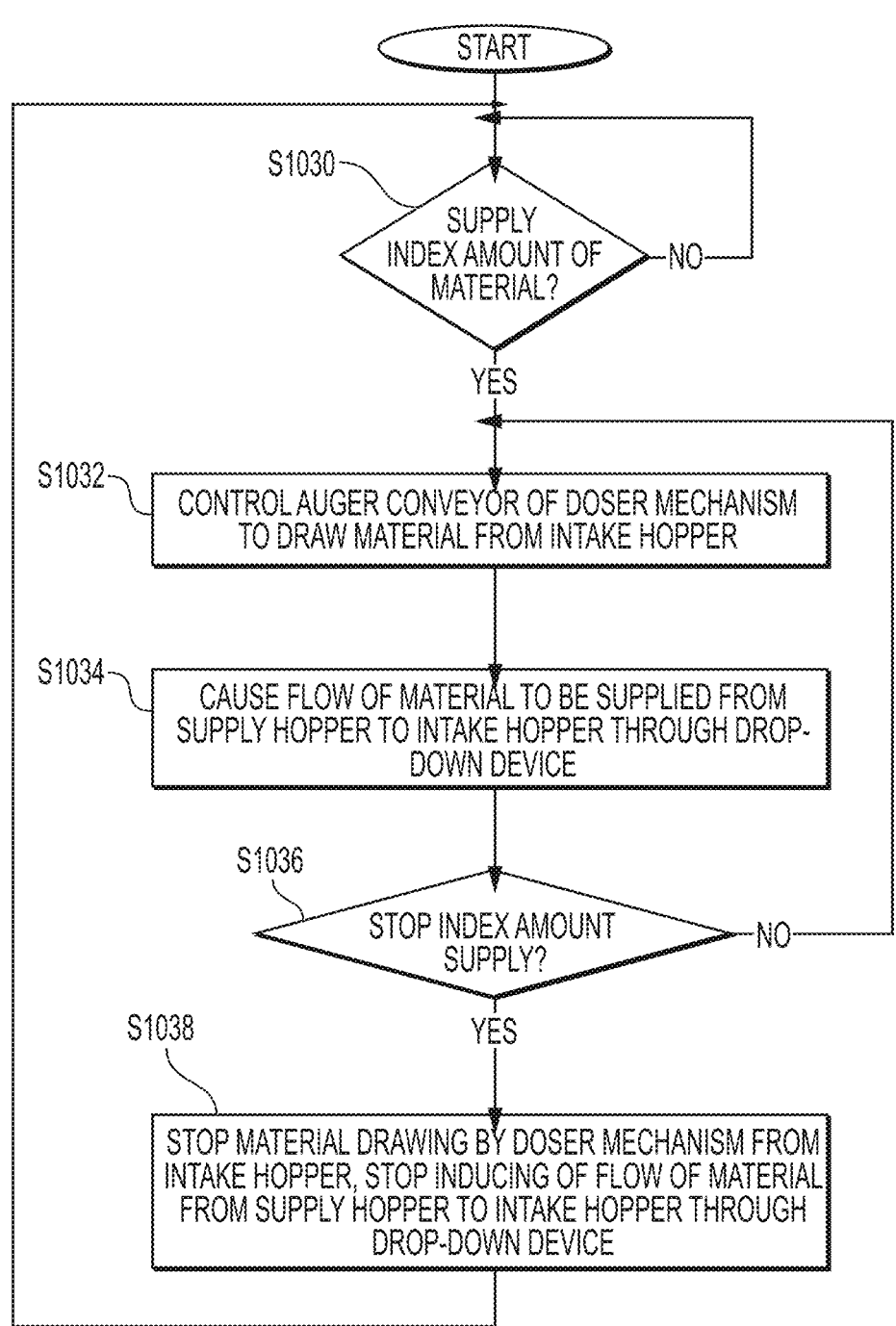
FIG. 8C is a flowchart illustrating a method of operating a dosing apparatus, according to some example embodiments.

FIG. 8A is a flowchart illustrating a method of operating a doser mechanism of a dosing apparatus to implement a single index operation, according to some example embodiments. FIG. 8B is a flowchart illustrating a method of controlling a flow of granular material from a supply hopper to an intake hopper through a drop-down device, according to some example embodiments. FIG. 8C is a flowchart illustrating a method of operating a dosing apparatus, according to some example embodiments. The methods shown in FIGS. 8A, 8B, and 8C may be implemented with regard to any of the dosing apparatuses according to any of the example embodiments, including for example a control device configured to control one or more portions of the one or more dosing apparatuses 10 (e.g., control device 790). The methods shown in FIGS. 8A, 8B, and 8C may be performed in parallel, simultaneously, independently of each other, sequentially, or any combination thereof. It will be understood that operations of each of the methods shown in FIGS. 8A, 8B, and 8C may be performed in a different order than shown in FIGS. 8A, 8B, and 8C. It will further be understood that some operations shown in FIGS. 8A, 8B, and 8C may be omitted from the respective methods thereof in some example embodiments and/or some additional operations not shown in FIGS. 8A, 8B, and 8C may be added to any of the methods shown in FIGS. 8A, 8B, and 8C. It will be further understood that operations performed in any one of the methods shown in FIGS. 8A, 8B, and 8C may be included in any other one of the methods shown in FIGS. 8A, 8B, and 8C.

Referring to FIG. 8A, at S1002, a determination is made (e.g., based on processing programming of the control device 790, based on processing user input commands received at the control device 790 from an interface, or the like) whether to initiate driving of the auger conveyor 120 of a doser mechanism (e.g., doser mechanism 100-1 to 100-$n$). If not (S1002=NO), the process repeats. If so (e.g., S1002=YES), at S1004 the auger conveyor of the doser mechanism (e.g., auger conveyor 120) is controlled (e.g., based on controlling the operation of a drive motor 124 thereof) to be caused to be driven, for example to "operate" and/or to be in an "on" operating state, to cause the one or more augers of the auger conveyor (e.g., one or more augers 122) to rotate to move granular material (e.g., out of an intake hopper 400). At S1006, the auger conveyor draws granular material from granular material held in an intake hopper enclosure of an intake hopper, based on the driven rotation of the one or more augers thereof, into an internal enclosure (e.g., enclosure 102e) of the doser mechanism through a first opening (e.g., doser inlet opening 180-1) at a first end (e.g., 102-1) of the doser mechanism and further moves (e.g., conveys) the granular material through the enclosure towards a second opening (e.g., doser outlet opening 180-2) that is closer to an opposite end of the doser mechanism than the first opening is to the opposite end.

At S1008, the auger conveyor is controlled (e.g., based on controlling the operation of a drive motor 124 thereof) to cause the one or more augers to rotate to cause granular material (e.g., 308) to be moved through the internal enclosure from the first end of the doser mechanism (e.g., 102-2) toward the second end (e.g., 102-2) of the doser mechanism along a central longitudinal axis (e.g., 199) of the doser mechanism. At S1008, the rotating one or more augers further move the granular material out of the internal enclosure through the second opening (e.g., 180-2). The granular material is moved by the auger conveyor through the second opening so that the granular material is caused to move (e.g., flow) through the second opening and out of the doser mechanism (e.g., exit the doser mechanism through the doser outlet opening 180-2 as a supplied index amount of granular material 194).

At S1010 a determination is made regarding whether to stop operation of the auger conveyor so that the one or more augers of the auger conveyor is in an "off" operating state and is no longer moving and thus is not moving granular material. If not (S1010-NO), the method continues. If so, (S1010=YES), at S1012, the auger conveyor is controlled to be stopped (e.g., switch from the "on" operating state to the "off" operating state) such that the one or more augers are caused to stop rotating (e.g., based on causing the drive motor 124 to stop rotating).

In some example embodiments, the auger conveyor is determined to stop operation at S1012 based on a determination of whether the auger conveyor has been in the "on" state (e.g., that the drive motor 124 has been rotating the driveshaft thereof) for at least a particular (e.g., threshold) period of time. For example, an operation timer for auger conveyor operation may be initialized and/or reset to t=0 seconds at S1004 when the auger conveyor is caused to be switched to the "on" operating state at S1004. The auger conveyor may be associated with a threshold operating time (e.g., t=1.2 seconds), which may be stored at a control device controlling the auger conveyor 120 (e.g., in a memory 794 of control device 790). The control device may determine at S1010 whether the elapsed time "t" since performance of S1004 equals or exceeds the threshold operating time (e.g., whether t≥1.2). If not, S1010=NO. If so, S1010=YES and the method proceeds to S1012 where the auger conveyor is caused to stop.

As described herein, the control device 790 may determine a particular duration of an index operation and/or a rate of rotation of the one or more augers (e.g., based on the operation of the drive motor 124) based on a determined (e.g., desired, commanded, etc.) granular material type and/ or granular material index amount. The control device 790 may access a database (e.g., empirically-generated look-up table) to determine the particular duration (e.g., threshold operating time) of an index operation (e.g., duration of rotation of the drive motor 124, which may be represented by a duration that electrical power is controlled to be supplied to the drive motor), amount and/or rate of electrical power supplied to the drive motor 124, and/or a rate of rotation of the driveshaft of the drive motor 124 during the index operation (which may be represented by amount and/or rate of power applied to drive motor 124) that is associated with the determined (e.g., desired, commanded, etc.) granular material type and/or granular material index amount and may control the drive motor at S1004-S1010 to operate at the determined rate and for the determined duration (e.g., supply the determined amount and/or rate of power for the determined duration), to cause the one or more augers to rotate at a particular corresponding rate for the determined duration, to cause the doser mechanism to supply a particular amount of an index (e.g., 752) of granular material. The aforementioned look-up table may be empirically generated using a doser mechanism that is the same type of doser mechanism as the doser mechanism being controlled by the control device to perform the index operation, such that the index duration (e.g., drive motor operation duration) and drive motor rate of rotation (e.g., amount and/or rate of supplied electrical power, driveshaft rate of rotation, etc.) stored in the look-up table correspond accurately to the corresponding index amount and type of the granular material.

It will be understood that controlling the auger conveyor (e.g., starting and/or stopping the auger conveyor) may be implemented based on controlling a supply of electrical power to a drive motor (e.g., 124) to transmit power to the auger of the auger conveyor and/or controlling a drive transmission to control the transmission of power from a drive motor to the one or more augers. Such control may be implemented by a control device (e.g., 790) which may implement such control based on controlling (e.g., adjusting, initializing, inhibiting, etc.) the supply of electrical power to one or more drive motors and/or actuators associated with one or more drive transmissions.

Referring to FIG. 8B, at S1022, a determination is made whether to adjust an inclination angle (e.g., inclination angle 390) of one or more slats in a drop-down device. If so, at S1023 one or more actuators that are mechanically coupled to the one or more slats are controlled to adjust the inclination angle of the one or more slats. Where the drop-down device includes multiple slats that are mechanically coupled to one or more actuators, the one or more actuators may be controlled at S1023 to control the respective inclination angles of the slats collectively or independently of each other. The determination at S1022 may be made based on processing sensor data received from a pressure sensor 600 included in an intake hopper 400 that is coupled to the drop-down device 300 to determine a pressure at the pressure sensor 600. In some example embodiments, a relative position of the pressure sensor 600 in relation to one or more augers 122 of an auger conveyor 120 extended into the intake hopper 400 (e.g., distance D2) and information indicating a density of the granular material may be stored at the control device 790 (e.g., a memory thereof). Such information may be accessed to determine a static pressure (e.g., head pressure) of the granular material 404 at the one or more augers 122 in the intake hopper enclosure 402e (e.g., at depth D1) based on the accessed information and the determined pressure sensed by the pressure sensor 600 (e.g., the pressure at depth D1+D2). The control device 790 implementing the method shown in FIG. 8B may access an empirically-generated look-up table that associates the determined static pressure value with a corresponding position of the one or more slats 320 of the drop-down device 300, a command signal to be transmitted to one or more actuators 360 to cause the one or more slats 320 to be adjusted to the corresponding position (e.g., changed inclination angle 390), or the like.

At S1024, a determination is made whether to supply granular material from the supply hopper to the intake hopper via the drop-down device. If so (S1024=YES), a vibration device may be controlled to induce vibration of at least a portion of the supply hopper to cause at least a portion of the granular material to be moved through the supply hopper outlet opening into the conduit of the drop-down device to be directed through the conduit thereof into the intake hopper. In some example embodiments, S1024 may include the control device using the determined static pressure value to access an empirically generated look-up table that associates the static pressure with a corresponding magnitude and/or frequency of vibration generated by the vibration device and/or an indication of properties of a control signal to be transmitted to the vibration device to induce such a corresponding magnitude and/or frequency of vibration. At S1026, granular material may be supplied into the supply hopper via the supply hopper inlet opening (e.g., based on activating a light source to emit light, based on activating an audio speaker to emit a noise, or the like to prompt manual supplying of granular material into the supply hopper 200 by a human operator, based on operation of a conveyor device controlled by the control device 790, or the like).

At S1028, the control device may control the vibration device to generate such particular corresponding magnitude and/or frequency of vibration (e.g., based on transmitting the control signal), thereby causing granular material to be supplied, at S1028, through the drop-down device into the intake hopper, where the drop-down device may restrict the flow of granular material into the intake hopper based on a position (e.g., inclination angle 390) of the slats of the drop-down device.

It will be understood that the vibration device 290 may be controlled to vibrate for a particular amount of time, such that vibration is caused to cease after an elapse of a particular amount of time after S1026 is initiated (e.g., 10 seconds, 30 seconds, etc.). In some example embodiments, referring to FIG. 8A, a determination to supply material at S1024 may be based on a determination that an auger conveyor of a doser mechanism 100 coupled to the intake hopper 400 is being driven in the method shown in FIG. 8A at S1004). In some example embodiments, the determination to drive the auger at S1002 in the method shown in FIG. 8A may be based on a determination that granular material is being supplied into the supply hopper at S1026 and/or from the supply hopper at S1028 in the method shown in FIG. 8B.

It will be understood that any look-up table as described herein may be stored in a memory of the control device 790 and accessed therefrom by a processor of the control device 790 to perform at least a portion of any of the methods of any of the example embodiments.

It will be understood that the determinations at S1022 may be made based on processing sensor data received from a pressure sensor 600 included in an intake hopper 400 that is coupled to the drop-down device 300 to determine a pressure at the pressure sensor 600. In some example embodiments, a relative position of the pressure sensor 600 in relation to one or more augers 122 of an auger conveyor 120 extended into the intake hopper 400 (e.g., distance D2) and information indicating a density of the granular material may be stored at the control device 790 (e.g., a memory thereof), and such information may be accessed to determine a static head pressure of the granular material 404 on the one or more augers 122 in the intake hopper enclosure 402e (e.g., at depth D1) based on the accessed information and the determined pressure sensed by the pressure sensor 600 (e.g., the pressure at depth D1+D2). The control device 790 implementing the method shown in FIG. 8B may access an empirically generated look-up table that associates the determined static pressure value with a corresponding inclination angle of the one or more slats 320 of the drop-down device 300, a command signal to be transmitted to one or more actuators 360 to cause the one or more slats 320 to be adjusted to the corresponding inclination angle, or the like.

Accordingly, referring to FIGS. 8A and 8B, it will be understood that a method of operating a dosing apparatus may include controlling an auger conveyor of the doser mechanism to operate to draw granular material out of an intake hopper and to discharge an index amount of the granular material via a doser mechanism outlet opening (e.g., at S1004 to S1008); and causing a flow of the granular material to be supplied from the supply hopper to the intake hopper via the conduit of the drop-down device (e.g., at S1028), wherein the one or more slats of the drop-down device restrict a flow rate of the flow through the conduit based on at least a portion of the flow of the granular material to accumulate on the upper slat surface of the one or more slats. As further shown, the method may include adjusting the angle of inclination of the one or more slats to adjust the flow rate of the flow through the conduit (e.g., at S1022), which may be based on processing pressure sensor data received from a pressure sensor included in the intake hopper.

Referring to FIG. 8C, at S1030 a determination is made whether to supply an index amount of granular material (e.g., an amount of granular material 194) from one or more doser mechanisms of a dosing apparatus. Such a determination may be made based on processing a command signal received at a communication interface and/or a user interface of a packaging machine that includes the dosing apparatus). If not (S1030=NO), the process repeats. If so (e.g., S1030=YES), at S1032 the auger conveyor of the doser mechanism (e.g., auger conveyor 120) is controlled (e.g., based on controlling the operation of a drive motor 124 thereof) to be caused to be driven, for example to "operate" and/or to be in an "on" operating state, to cause the one or more augers of the auger conveyor (e.g., one or more augers 122) to rotate to draw granular material (e.g., as granular material 192) from an intake hopper to be conveyed through the doser mechanism and supplied (e.g., discharged) from the doser mechanism as supplied granular material that may form an "index" of granular material in an enclosure.

At S1034, a flow of granular material from a supply hopper to the intake hopper may be induced (e.g., based on controlling a vibration device that is mechanically coupled to the supply hopper) so that the flow of granular material is supplied from the supply hopper to the intake hopper through a drop-down device, where the drop-down device may restrict the flow of granular material into the intake hopper based on at least a portion of the granular material being accumulated and retained on an upper slat surface of one or more slats extending within and/or through the conduit.

At S1036 a determination is made regarding whether to stop operation of the auger conveyor so that the one or more augers of the auger conveyor is in an "off" operating state and is no longer moving and thus is not moving granular material. If not (S1036=NO), the method continues. If so, (S1036=YES), at S1038 the auger conveyor is controlled to be stopped (e.g., switch from the "on" operating state to the "off" operating state) such that the one or more augers are caused to stop rotating (e.g., based on causing the drive motor 124 to stop rotating) so that the doser mechanism is caused to stop drawing granular material from the intake hopper, and the supply of granular material from the supply hopper to the intake hopper may be stopped (e.g., based on causing the vibration device 290 to stop vibrating).

In some example embodiments, the drawing of material from the intake hopper by the doser mechanism and the supply of granular material from the supply hopper to the intake hopper may be determined to be stopped (S1036=YES) based on a determination of whether the auger conveyor of the doser mechanism has been in the "on" state (e.g., that the drive motor 124 has been rotating the driveshaft thereof) for at least a particular (e.g., threshold) period of time. For example, an operation timer for auger conveyor operation may be initialized and/or reset to t=0 seconds at S1032 when the auger conveyor is caused to be switched to the "on" operating state at S1032. The auger conveyor may be associated with a threshold operating time (e.g., t=1.2 seconds), which may be stored at a control device controlling the auger conveyor 120 (e.g., in a memory 794 of control device 790). The control device may determine at S1036 whether the elapsed time "t" since performance of S1032 equals or exceeds the threshold operating time (e.g., whether t≥1.2). If not, S1036=NO. If so, S1036=YES and the method proceeds to S1038 where the auger conveyor (and, in some example embodiments, a vibration device) is caused to stop.

As described herein, the control device 790 may determine a particular duration of an index operation and/or a rate of rotation of the one or more augers (e.g., based on the operation of the drive motor 124) based on a determined (e.g., desired, commanded, etc.) granular material type and/or granular material index amount. The control device 790 may access a database (e.g., empirically-generated look-up table) to determine the particular duration (e.g., threshold operating time) of an index operation (e.g., duration of rotation of the drive motor 124, which may be represented by a duration that electrical power is controlled to be supplied to the drive motor), amount and/or rate of electrical power supplied to the drive motor 124, and/or a rate of rotation of the driveshaft of the drive motor 124 during the index operation (which may be represented by amount and/or rate of power applied to drive motor 124) that is associated with the determined (e.g., desired, commanded, etc.) granular material type and/or granular material index amount and may control the drive motor 124 (and, in some example embodiments, the vibration device 290) at S1032-S1038 to operate at the determined rate and for the determined duration (e.g., supply the determined amount and/or rate of power for the determined duration), to cause the one or more augers to rotate at a particular corresponding rate for the determined duration, to cause the doser mechanism 100 to supply a particular amount of an index (e.g., 752) of granular material. The aforementioned look-up table may be empirically generated using a same type of doser mechanism as the doser mechanism being controlled by the control device to perform the index operation, such that the index duration (e.g., drive motor operation duration) and drive motor rate of rotation (e.g., amount and/or rate of supplied electrical power, driveshaft rate of rotation, etc.) stored in the look-up table correspond accurately to the corresponding index amount and type of the granular material.

Figure 9:
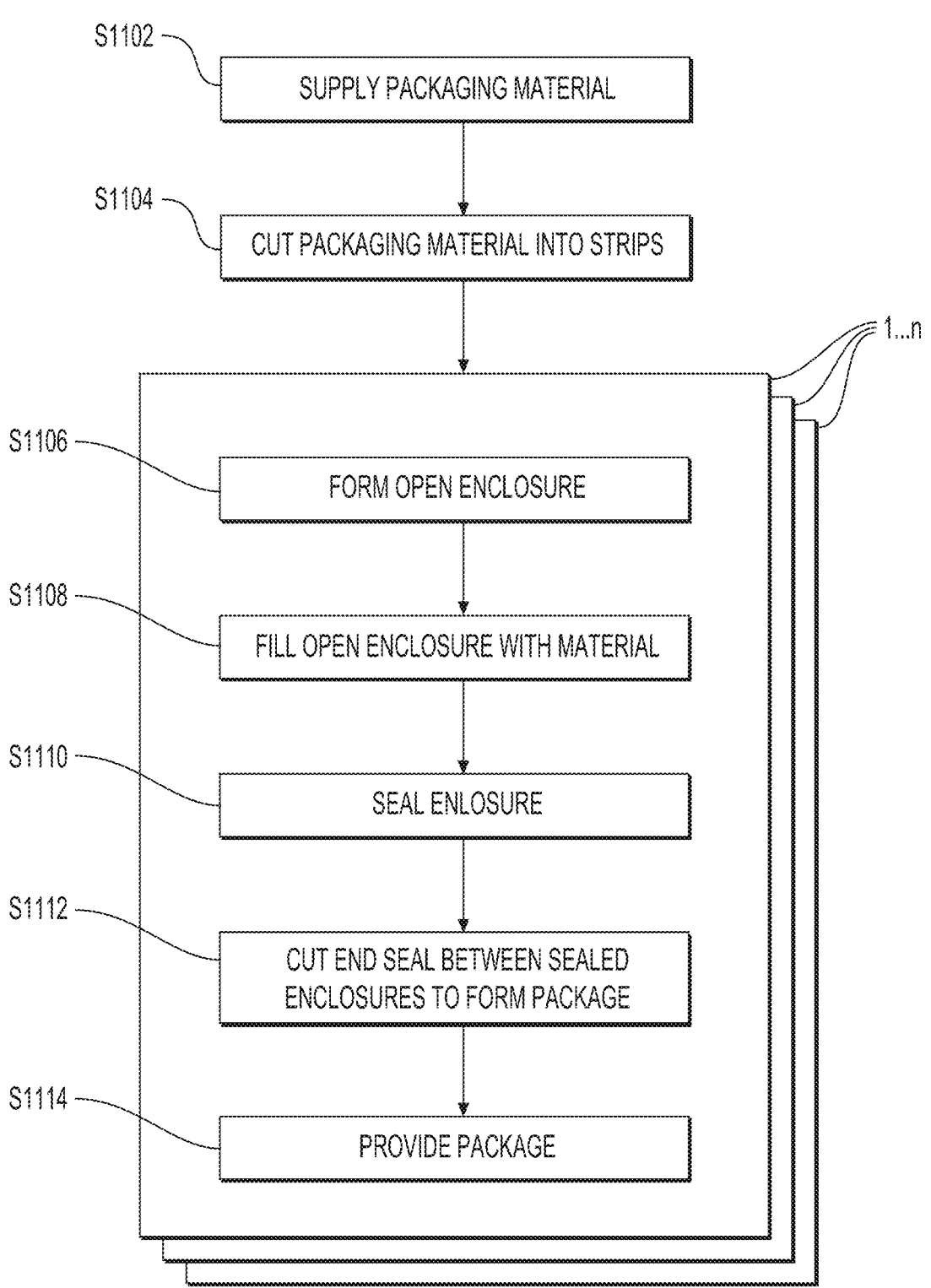
FIG. 9 is a flowchart illustrating a method of operating a packaging machine that includes a dosing apparatus that further includes a drop-down device, according to some example embodiments.

FIG. 9 is a flowchart illustrating a method of operating a packaging machine that includes a dosing apparatus that further includes a drop-down device, according to some example embodiments. The method shown in FIG. 9 may be implemented with regard to any of the packaging machines according to any of the example embodiments (e.g., implemented by a control device controlling the packaging machine and/or doser mechanism). The method shown in FIG. 9 may be implemented with regard to any of the packaging machines according to any of the example embodiments, including for example a control device configured to control one or more portions of the packaging machines (e.g., control device 790). It will be understood that operations of the method shown in FIG. 9 may be performed in a different order than shown in FIG. 9. It will further be understood that some operations shown in FIG. 9 may be omitted from the method in some example embodiments and/or some additional operations not shown in FIG. 9 may be added to the method.

At S1102, a packaging supply device of the packaging machine (e.g., packaging supply device 710) is operated (e.g., based on controlling a drive motor and/or drive transmission) to supply a sheet of packaging material (e.g., from a roll of packaging material).

At S1104, the sheet of packaging material is supplied into contact with an array of cutting devices (e.g., blades 722-1 to 722-(n−1)) which may divide the sheet of packaging material into a plurality of separate strips of packaging material (e.g., strips 726-1 to 726-n).

At S1106-S1114, each separate strip of packaging material may be directed to be fed through a separate process stream of "n" process streams of the packaging machine

700. Step S1104 may be absent when the packaging machine 700 includes a single process stream. Steps S1106-S1114 may be each described with reference to an nth process stream, but it will be understood that steps S1106-S1114 may be performed at least partially in parallel in the 1 to nth process streams.

At S1106, each separate strip of packaging material may be folded, for example by a separate folding device (e.g., 730-n), into a separate folded strip (e.g., 728-n) defining an open enclosure (e.g., 734) having an opening (e.g., 7340) at a proximate end (e.g., 734a) and an end seal (e.g., 748) at a distal end (e.g., 734b). The strip may be fed to the folding device (e.g., 730-n) so that the nth folded strip defines an open enclosure that is enclosed perpendicularly to the local feed direction of the strip and is open at a top end that faces upwards as the folded strip is continued to be fed in the given process stream and is closed (e.g., by an end seal 748) at a bottom end.

At S1108, each separate doser mechanism of the dosing apparatus of the packaging machine (e.g., 100-n) may supply a particular amount (e.g., index 752) of granular material into a separate open enclosure (e.g., 734) defined by a separate folded strip of packaging material (e.g., 728-n) through the open end thereof to at least partially fill the distal end of the open enclosure of the folded strip (e.g., fill at least a distal portion of the open enclosure that is adjacent to the end seal (e.g., 748) that closes the distal end of the open enclosure) with at least a particular amount (e.g., index 752) of granular material. As shown in FIGS. 5 and 6C, each doser mechanism of each respective process stream may be at least partially vertically aligned (e.g., at least partially vertically overlapped) with the open top end of a separate open enclosure of a separate folded strip of packaging material. Each doser mechanism may be controlled to implement an index operation that supplies a flow of granular material (e.g., granular material 194) at a particular rate, for a particular duration, before stopping the flow, to cause the particular amount (e.g., index 752) of granular material to be supplied into the open enclosure. Such control may be implemented based on controlling a duration, applied power, and/or rate of rotation of a drive motor (e.g., servomotor) of the doser mechanism.

At S1110, a folded strip having an open enclosure at least partially filled (e.g., at least the distal portion 734-1 is filled) with an index (e.g., 752) of granular material supplied from a doser mechanism is fed in a local feed direction (e.g., downwards) to a sealing device (e.g., sealing device 740) that seals at least the filled portion (e.g., distal portion 734-1) of the open enclosure to partition the distal portions (e.g., 734-1) of the open enclosure, and the index of granular material contained therein, into a separate sealed enclosure (e.g., 750), also referred to as a sealed article of packaging, sealed pouch, sealed package, sealed packet, or the like, that is defined to extend between adjacent and opposite end seals in the folded strip and contains a particular amount of granular material therein (e.g., index 752), the sealed enclosure being partitioned in the nth local feed direction by an end seal (e.g., 748) formed by sealing opposing inner surfaces of the open enclosure. The packaging machine 700 may be configured to partition the folded strips 728-1 to 728-n into sealed enclosures 750 that each contain an index 752 of granular material that is a same or substantially same amount (e.g., dose) of granular material. The operation of the sealing device may be synchronized with the operation of a doser mechanism so that the sealing device forms an end seal to seal a given distal portion of the open enclosure, and index contained therein, after the completion of an index operation by the doser mechanism and prior to the starting of a next index operation (e.g., the doser mechanism is in an "off" operating state and is not presently supplying granular material). As a result, the operation of the sealing device, by sealing a given distal portion of the open enclosure and contained index from a proximate portion of the open enclosure, forms a new end seal that establishes a new distal end and distal portion of the open enclosure that is devoid (e.g., empty) or substantially devoid of granular material prior to the start of a new index operation by the doser mechanism to at least partially fill the new distal portion of the open enclosure with a new index of granular material. As a result, such synchronization may improve the accuracy and precision of the amount of each index of granular material in each sealed enclosure and may further reduce or prevent granular material from being trapped in a formed end seal.

At S1112, each nth folded strip having isolated (e.g., partitioned) sealed enclosures separated by end seals is fed in an nth local feed direction (e.g., downwards) from the sealing device to a cutting device (e.g., cutting device 760) that cuts through each separate end seal of the nth folded strip to separate distal (e.g., bottom) sealed enclosures of the nth folded strip from a remainder of the nth folded strip to thus establish (e.g., form) packages (e.g., packages 770, also referred to herein as articles of packaging) that each contain a particular amount (e.g., index 752, dose, etc.) of granular material. At S1114, the packages are provided, or supplied, to a collection area or bin. The packages may be allowed to fall from the cutting device to a collection area or bin. The packages may be directed to a conveyor that transports the packages to a collection area or bin.

In some example embodiments, any of the methods shown in FIG. 8A, 8B, or 8C may include any of the operations of any other methods shown in FIG. 8A, 8B, or 8C, in any order. For example, the method shown in FIG. 8C may further include, at any time during the method, performing any of S1022, S1023, S1024, S1026, S1028.

Some Example Embodiments of the inventive concepts are as follows below:

Example Embodiment 1: A dosing apparatus (10), comprising:

an intake hopper (400) that is configured to hold an amount of a granular material, the intake hopper configured to receive the granular material through an intake hopper inlet opening (406i) at a top end of the intake hopper;

a doser mechanism (100) coupled to the intake hopper, the doser mechanism including an auger conveyor (120) extending into the intake hopper, the doser mechanism configured to discharge an index amount of the granular material based on operation of the auger conveyor to draw a portion of the granular material from the intake hopper;

a supply hopper (200) configured to hold a supply amount of the granular material, the supply hopper configured to supply the granular material through a supply hopper outlet opening (2060) at a bottom end of the supply hopper; and a drop-down device (300) coupled between the supply hopper and the intake hopper, the drop-down device including a conduit structure (302) configured to define a conduit (310) extending along a central longitudinal axis (380) in flow communication between the supply hopper outlet opening and the intake hopper inlet opening to enable a flow of the granular material from the supply hopper to the intake hopper through the conduit, wherein the drop-down device is configured to restrict a flow rate of the flow of granular material through the conduit based on directing the flow of the granular material around a slat (320) extending into the conduit, the slat having an upper slat surface (322) that is angled downwards from a first end (384a) that is proximate to an inner surface (302s) of the conduit structure to a second end (384b) that is distal to the inner surface at an inclination angle (390), the inclination angle corresponds to an angle of repose of the granular material.

Example Embodiment 2: The dosing apparatus of Example Embodiment 1, wherein the upper slat surface is a planar surface that extends along a plane that is angled at the inclination angle.

Example Embodiment 3: The dosing apparatus of Example Embodiment 1, wherein the drop-down device includes a plurality of slats (320a-320c) extending into the conduit, the plurality of slats including the slat.

Example Embodiment 4: The dosing apparatus of any of Example Embodiment 3, wherein the plurality of slats includes at least two slats (320b, 320c) that are offset from each other in a vertical direction extending parallel to the central longitudinal axis of the conduit.

Example Embodiment 5: The dosing apparatus of Example Embodiment 4, wherein the at least two slats at least partially overlap in the vertical direction.

Example Embodiment 6: The dosing apparatus of Example Embodiment 4, wherein the at least two slats extend into the conduit from opposite side ends of the conduit.

Example Embodiment 7: The dosing apparatus of Example Embodiment 6, wherein the at least two slats are exposed from each other in the vertical direction.

Example Embodiment 8: The dosing apparatus of Example Embodiment 4, wherein the plurality of slats are offset from each other in the vertical direction, and vertically adjacent slats (320b, 320c) of the plurality of slats extend into the conduit from opposite side ends of the conduit.

Example Embodiment 9: The dosing apparatus of Example Embodiment 1, wherein the slat is configured to adjustably pivot to adjustably control the inclination angle of the upper slat surface.

Example Embodiment 10: The dosing apparatus of Example Embodiment 1, wherein the slat is pivotably coupled to the conduit structure.

Example Embodiment 11: The dosing apparatus of Example Embodiment 1, wherein the drop-down device includes at least one slot opening 330 extending through a thickness of the conduit structure, the slat extending through the slot opening into the conduit through the thickness of the conduit structure.

Example Embodiment 12: The dosing apparatus of Example Embodiment 1, wherein the conduit structure defines the conduit as having a cross-sectional area, extending perpendicular to the central longitudinal axis and which continuously changes in area magnitude along the central longitudinal axis between a rectangular cross-sectional area to a circular cross-sectional area.

Example Embodiment 13: The dosing apparatus of Example Embodiment 1, further comprising:

a plurality of doser mechanisms (100-1 to 100-n), the plurality of doser mechanisms including the doser mechanism, the plurality of doser mechanisms configured to supply separate, respective amounts of the granular material in parallel, a plurality of intake hoppers (400-1 to 400-*n*) coupled to separate, respective doser mechanisms of the plurality of doser mechanisms, the plurality of intake hoppers including the intake hopper, and a plurality of drop-down devices (300-1 to 300-*n*) coupled between the supply hopper and separate, respective intake hoppers of the plurality of intake hoppers, the plurality of drop-down devices including the drop-down device, the plurality of drop-down devices configured to supply multiple, parallel flows of the granular material from the supply hopper to separate, respective intake hoppers of the plurality of intake hoppers.

Example Embodiment 14: A packaging machine (700), comprising:

the dosing apparatus of Example Embodiment 1;

a packaging supply device (710) configured to supply a strip of packaging material (726-1) that is folded to establish a folded strip of packaging material (728-1) that defines an open enclosure (734) having an enclosure opening (7340), wherein the dosing apparatus is configured to discharge the index amount of the granular material into the open enclosure through the enclosure opening to at least partially fill a distal portion (734-1) of the open enclosure with the index amount of the granular material;

a sealing device (740) configured to join opposing surfaces (739) of the folded strip of packaging material to isolate the distal portion of the open enclosure from a remainder (734-2) of the open enclosure that includes the enclosure opening such that the isolated distal portion of the open enclosure establishes a sealed enclosure (750) that contains the index amount of the granular material in the folded strip of packaging material; and a cutting device (760) configured to separate the sealed enclosure from a remainder of the folded strip of packaging material to establish an article of packaging (770) that contains the index amount of the granular material.

Example Embodiment 15: A method of operating the dosing apparatus of Example Embodiment 1, the method comprising:

controlling the auger conveyor of the doser mechanism to operate to draw the granular material out of the intake hopper and to discharge the index amount of the granular material via a doser mechanism outlet opening (180-2); and causing a flow of the granular material to be supplied from the supply hopper to the intake hopper via the conduit of the drop-down device, wherein the slat of the drop-down device restricts the flow rate of the flow through the conduit based on at least the portion of the flow of the granular material accumulating on the upper slat surface of the slat.

Example Embodiment 16: The method of Example Embodiment 15, further comprising:

adjusting the angle of inclination of the slat to adjust the flow rate of the flow through the conduit.

Example Embodiment 17: A dosing apparatus (10), comprising:

a doser mechanism (100) including a cylindrical shell (110) and an auger conveyor (120), the cylindrical shell having a doser inlet opening (180-1) and a doser outlet opening (180-2), the auger conveyor extending through the cylindrical shell and further extending through the doser inlet opening;

an intake hopper (400), the intake hopper including an intake hopper structure (402) defining an intake hopper enclosure (402*e*), an intake hopper inlet opening (406*i*) extending through a top wall (402*a*) of the intake hopper structure, and an intake hopper outlet opening (4060) extending through the intake hopper structure at a location that is below the intake hopper inlet opening, wherein the doser mechanism is coupled to the intake hopper such that the auger conveyor extends through both the doser inlet opening and the intake hopper outlet opening into the intake hopper enclosure;

a supply hopper (200) including a supply hopper structure (202) defining a supply hopper enclosure (202*e*), a supply hopper outlet opening (2060) extending through a bottom wall (202*b*) of the supply hopper structure; and a drop-down device (300) coupled between the supply hopper outlet opening and the intake hopper inlet opening, wherein the drop-down device includes a conduit structure (302) defining a conduit (310) having a central longitudinal axis (380) and extending along the central longitudinal axis between a drop-down inlet opening (306*i*) at a top end (304*a*) of the conduit structure and a drop-down outlet opening (3060) at a bottom end (304*b*) of the conduit structure, and a slat (320) having a first end (384*a*) that is proximate to at least one inner surface (302*s*) of the conduit structure and a second end (384*b*) that is distal to the at least one inner surface of the conduit structure in relation to the first end and is proximate to the drop-down outlet opening in relation to the first end, the slat including an upper slat surface (322) extending from the first end to the second end such that the upper slat surface is angled toward the drop-down outlet opening from the first end at an inclination angle (390).

Example Embodiment 18: The dosing apparatus of Example Embodiment 17, wherein the upper slat surface is a planar surface that extends along a plane that is angled at the inclination angle.

Example Embodiment 19: The dosing apparatus of Example Embodiment 17, wherein the inclination angle is about 35 degrees.

Example Embodiment 20: The dosing apparatus of Example Embodiment 17, wherein the drop-down device includes a plurality of slats (320*a*, 320*b*, 320*c*) extending from one or more inner surfaces (302*s*) of the conduit structure into the conduit, the plurality of slats including the slat.

Example Embodiment 21: The dosing apparatus of Example Embodiment 20, wherein the plurality of slats includes at least two slats (320*b*, 320*c*) that are offset from each other in a vertical direction extending parallel to the central longitudinal axis of the conduit.

Example Embodiment 22: The dosing apparatus of Example Embodiment 21, wherein the at least two slats at least partially overlap in the vertical direction.

Example Embodiment 23: The dosing apparatus of Example Embodiment 21, wherein the at least two slats extend into the conduit from opposite side ends of the conduit.

Example Embodiment 24: The dosing apparatus of Example Embodiment 23, wherein the at least two slats are exposed from each other in the vertical direction.

Example Embodiment 25: The dosing apparatus of Example Embodiment 21, wherein the plurality of slats are offset from each other in the vertical direction, and vertically adjacent slats (320*b*, 320*c*) of the plurality of slats extend into the conduit from opposite side ends of the conduit.

Example Embodiment 26: The dosing apparatus of Example Embodiment 17, wherein the slat is pivotally coupled to the conduit structure.

Example Embodiment 27: The dosing apparatus of Example Embodiment 17, wherein the drop-down inlet opening is a rectangular opening and the drop-down outlet opening is a circular opening.

Example Embodiment 28: The dosing apparatus of Example Embodiment 17, wherein the drop-down device includes a slot opening (330) extending through a thickness of the conduit structure, the slat extending through the slot opening into the conduit through the thickness of the conduit structure.

Example Embodiment 29: The dosing apparatus of Example Embodiment 17, wherein the conduit structure defines the conduit as having a cross-sectional area, extending perpendicular to the central longitudinal axis and which continuously changes in area magnitude along the central longitudinal axis between a rectangular cross-sectional area at the drop-down inlet opening to a circular cross-sectional area at the drop-down outlet opening.

Example Embodiment 30: The dosing apparatus of Example Embodiment 17, further comprising:

a plurality of doser mechanisms (100-1 to 100-*n*), the plurality of doser mechanisms including the doser mechanism, a plurality of intake hoppers (400-1 to 400-*n*) coupled to separate, respective doser mechanisms of the plurality of doser mechanisms, the plurality of intake hoppers including the intake hopper, and a plurality of drop-down devices (300-1 to 300-*n*) coupled between the supply hopper and separate, respective intake hoppers of the plurality of intake hoppers, the plurality of drop-down devices including the drop-down device.

Example Embodiment 31: The dosing apparatus of Example Embodiment 17, wherein the drop-down device further includes a sleeve structure (308) configured to receive and horizontally surround the supply hopper outlet opening to establish fluid communication between the conduit of the drop-down device and the supply hopper.

Example Embodiment 32: A packaging machine (700), comprising:

the dosing apparatus of Example Embodiment 17;

a packaging supply device (710) configured to supply a strip of packaging material (726-1) that is folded to establish a folded strip of packaging material (728-1) that defines an open enclosure (734) having an enclosure opening (7340), wherein the dosing apparatus is configured to discharge an index amount of a granular material into the open enclosure through the enclosure opening to at least partially fill a distal portion (734-1) of the open enclosure with the index amount of the granular material;

a sealing device (740) configured to join opposing surfaces (739) of the folded strip of packaging material to isolate the distal portion of the open enclosure from a remainder (734-2) of the open enclosure that includes the enclosure opening such that the isolated distal portion of the open enclosure establishes a sealed enclosure (750) that contains the index amount of the granular material in the folded strip of packaging material; and a cutting device (760) configured to separate the sealed enclosure from a remainder of the folded strip of packaging material to establish an article of packaging (770) that contains the index amount of the granular material.

Example Embodiment 33: A method of operating the dosing apparatus of Example Embodiment 17, the method comprising:

controlling the auger conveyor of the doser mechanism to operate to draw a granular material out of the intake hopper via the doser inlet opening and to be discharged via the doser outlet opening; and causing a flow of the granular material to be supplied from the supply hopper to the intake hopper via the conduit of the drop-down device, wherein the slat of the drop-down device restricts a flow rate of the flow through the conduit based on at least a portion of the flow of the granular material accumulating on the upper slat surface of the slat.

Example Embodiment 34: The method of Example Embodiment 33, further comprising:

adjusting the inclination angle of the slat to adjust the flow rate of the flow through the conduit.

Some example embodiments have been disclosed herein; it should be understood that other variations may be possible. Such variations are not to be regarded as a departure from the spirit and scope of the present inventive concepts, and all such modifications as would be obvious to one skilled in the art are intended to be included within the scope of the following claims.

What is claimed:

1. A dosing apparatus, comprising:

an intake hopper that is configured to hold an amount of a granular material, the intake hopper configured to receive the granular material through an intake hopper inlet opening at a top end of the intake hopper;

a doser mechanism coupled to the intake hopper, the doser mechanism including an auger conveyor extending into the intake hopper, the doser mechanism configured to discharge an index amount of the granular material based on operation of the auger conveyor to draw a portion of the granular material from the intake hopper;

a supply hopper configured to hold a supply amount of the granular material, the supply hopper configured to supply the granular material through a supply hopper outlet opening at a bottom end of the supply hopper; and a drop-down device coupled between the supply hopper and the intake hopper, the drop-down device including a conduit structure configured to define a conduit extending along a central longitudinal axis in flow communication between the supply hopper outlet opening and the intake hopper inlet opening to enable a flow of the granular material from the supply hopper to the intake hopper through the conduit, wherein the drop-down device is configured to restrict a flow rate of the flow of granular material through the conduit based on directing the flow of the granular material around a slat extending into the conduit, the slat having an upper slat surface that is angled downwards from a first end that is proximate to an inner surface of the conduit structure to a second end that is distal to the inner surface at an inclination angle, the inclination angle corresponds to an angle of repose of the granular material.

2. The dosing apparatus of claim 1, wherein the upper slat surface is a planar surface that extends along a plane that is angled at the inclination angle.

3. The dosing apparatus of claim 1, wherein the drop-down device includes a plurality of slats extending into the conduit, the plurality of slats including the slat.

4. The dosing apparatus of claim 3, wherein the plurality of slats includes at least two slats that are offset from each other in a vertical direction extending parallel to the central longitudinal axis of the conduit.

5. The dosing apparatus of claim 4, wherein the at least two slats at least partially overlap in the vertical direction.

6. The dosing apparatus of claim 4, wherein the at least two slats extend into the conduit from opposite side ends of the conduit.

7. The dosing apparatus of claim 4, wherein
the plurality of slats are offset from each other in the vertical direction, and
vertically adjacent slats of the plurality of slats extend into the conduit from opposite side ends of the conduit.

8. A packaging machine, comprising:
the dosing apparatus of claim 1;
a packaging supply device configured to supply a strip of packaging material that is folded to establish a folded strip of packaging material that defines an open enclosure having an enclosure opening, wherein the dosing apparatus is configured to discharge the index amount of the granular material into the open enclosure through the enclosure opening to at least partially fill a distal portion of the open enclosure with the index amount of the granular material;
a sealing device configured to join opposing surfaces of the folded strip of packaging material to isolate the distal portion of the open enclosure from a remainder of the open enclosure that includes the enclosure opening such that the isolated distal portion of the open enclosure establishes a sealed enclosure that contains the index amount of the granular material in the folded strip of packaging material; and
a cutting device configured to separate the sealed enclosure from a remainder of the folded strip of packaging material to establish an article of packaging that contains the index amount of the granular material.

9. A dosing apparatus, comprising:
a doser mechanism including a cylindrical shell and an auger conveyor, the cylindrical shell having a doser inlet opening and a doser outlet opening, the auger conveyor extending through the cylindrical shell and further extending through the doser inlet opening;
an intake hopper, the intake hopper including an intake hopper structure defining an intake hopper enclosure, an intake hopper inlet opening extending through a top wall of the intake hopper structure, and an intake hopper outlet opening extending through the intake hopper structure at a location that is below the intake hopper inlet opening, wherein the doser mechanism is coupled to the intake hopper such that the auger conveyor extends through both the doser inlet opening and the intake hopper outlet opening into the intake hopper enclosure;
a supply hopper including a supply hopper structure defining a supply hopper enclosure, a supply hopper outlet opening extending through a bottom wall of the supply hopper structure; and
a drop-down device coupled between the supply hopper outlet opening and the intake hopper inlet opening, wherein the drop-down device includes
a conduit structure defining a conduit having a central longitudinal axis and extending along the central longitudinal axis between a drop-down inlet opening at a top end of the conduit structure and a drop-down outlet opening at a bottom end of the conduit structure, and
a slat having a first end that is proximate to at least one inner surface of the conduit structure and a second end that is distal to the at least one inner surface of the conduit structure in relation to the first end and is proximate to the drop-down outlet opening in relation to the first end, the slat including an upper slat surface extending from the first end to the second end such that the upper slat surface is angled toward the drop-down outlet opening from the first end at an inclination angle.

10. The dosing apparatus of claim 9, wherein the upper slat surface is a planar surface that extends along a plane that is angled at the inclination angle.

11. The dosing apparatus of claim 9, wherein the inclination angle is about 35 degrees.

12. The dosing apparatus of claim 9, wherein the drop-down device includes a plurality of slats extending from one or more inner surfaces of the conduit structure into the conduit, the plurality of slats including the slat.

13. The dosing apparatus of claim 12, wherein the plurality of slats includes at least two slats that are offset from each other in a vertical direction extending parallel to the central longitudinal axis of the conduit.

14. The dosing apparatus of claim 13, wherein the at least two slats at least partially overlap in the vertical direction.

15. The dosing apparatus of claim 13, wherein the at least two slats extend into the conduit from opposite side ends of the conduit.

16. The dosing apparatus of claim 13, wherein
the plurality of slats are offset from each other in the vertical direction, and
vertically adjacent slats of the plurality of slats extend into the conduit from opposite side ends of the conduit.

17. The dosing apparatus of claim 9, wherein the drop-down device includes a slot opening extending through a thickness of the conduit structure, the slat extending through the slot opening into the conduit through the thickness of the conduit structure.

18. The dosing apparatus of claim 9, wherein the drop-down device further includes a sleeve structure configured to receive and horizontally surround the supply hopper outlet opening to establish fluid communication between the conduit of the drop-down device and the supply hopper.

19. A packaging machine, comprising:
the dosing apparatus of claim 9;
a packaging supply device configured to supply a strip of packaging material that is folded to establish a folded strip of packaging material that defines an open enclosure having an enclosure opening, wherein the dosing apparatus is configured to discharge an index amount of a granular material into the open enclosure through the enclosure opening to at least partially fill a distal portion of the open enclosure with the index amount of the granular material;
a sealing device configured to join opposing surfaces of the folded strip of packaging material to isolate the distal portion of the open enclosure from a remainder of the open enclosure that includes the enclosure opening such that the isolated distal portion of the open enclosure establishes a sealed enclosure that contains the index amount of the granular material in the folded strip of packaging material; and a cutting device configured to separate the sealed enclosure from a remainder of the folded strip of packaging material to establish an article of packaging that contains the index amount of the granular material.

20. A method of operating the dosing apparatus of claim 9, the method comprising:

controlling the auger conveyor of the doser mechanism to operate to draw a granular material out of the intake hopper via the doser inlet opening and to be discharged via the doser outlet opening; and causing a flow of the granular material to be supplied from the supply hopper to the intake hopper via the conduit of the drop-down device, wherein the slat of the drop-down device restricts a flow rate of the flow through the conduit based on at least a portion of the flow of the granular material accumulating on the upper slat surface of the slat.

\* \* \* \* \*